US010063560B2

(12) United States Patent
Gordon et al.

(10) Patent No.: US 10,063,560 B2
(45) Date of Patent: Aug. 28, 2018

(54) GAZE-BASED AUTHENTICATION

(71) Applicants: John C. Gordon, Newcastle, WA (US); Cem Keskin, Seattle, WA (US)

(72) Inventors: John C. Gordon, Newcastle, WA (US); Cem Keskin, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 159 days.

(21) Appl. No.: 15/143,295

(22) Filed: Apr. 29, 2016

(65) Prior Publication Data
US 2017/0318019 A1   Nov. 2, 2017

(51) Int. Cl.
*G06F 21/00* (2013.01)
*H04L 29/06* (2006.01)
*G06F 3/01* (2006.01)
*G06K 9/00* (2006.01)
*G06F 21/36* (2013.01)
(Continued)

(52) U.S. Cl.
CPC ............ *H04L 63/102* (2013.01); *G06F 3/013* (2013.01); *G06F 21/36* (2013.01); *G06K 9/00604* (2013.01); *G06K 9/00617* (2013.01); *G06K 9/00885* (2013.01); *G06K 9/00912* (2013.01); *G06K 9/22* (2013.01); *H04L 9/3226* (2013.01); *H04L 63/083* (2013.01)

(58) Field of Classification Search
CPC . H04L 63/102; H04L 63/083; G06K 9/00604; G06F 3/013
See application file for complete search history.

(56) References Cited

U.S. PATENT DOCUMENTS 7,986,816 B1    7/2011   Hoanca et al.
8,594,374 B1   11/2013   Bozarth
9,280,652 B1 *  3/2016   Bozarth ................. G06F 21/36
(Continued)

FOREIGN PATENT DOCUMENTS

EP         2503479 A1     9/2012

OTHER PUBLICATIONS

PCT Application No. PCT/US2017/029985—International Search Report and Written Opinion, dated Jun. 29, 2017, 15 pages.
(Continued)

*Primary Examiner* — Jeffrey C Pwu
*Assistant Examiner* — William A Corum, Jr.
(74) *Attorney, Agent, or Firm* — Newport IP, LLC; Jacob P. Rohwer

(57) ABSTRACT

A user may be authenticated to access an account, computing device, or other resource using gaze tracking. A gaze-based password may be established by prompting a user to identify multiple gaze targets within a scene. The gaze-based password may be used to authenticate the user to access the resource. In some examples, when the user attempts to access the resource, the scene may be presented on a display. In some examples, the scene may be a real-world scene including the user's real-world surroundings, or a mixed reality scene. The user's gaze may be tracked while the user is viewing the scene to generate login gaze tracking data. The login gaze tracking data may be compared to the gaze-based password and, if the login gaze tracking data satisfies the gaze-based password, the user may be authenticated to access the resource.

19 Claims, 24 Drawing Sheets

(51) Int. Cl.
*G06K 9/22* (2006.01)
*H04L 9/32* (2006.01)

(56) References Cited

U.S. PATENT DOCUMENTS

| | | | |
|---|---|---|---|
| 9,697,649 B1* | 7/2017 | Shepard | G06T 19/20 |
| 2005/0129286 A1 | 6/2005 | Hekimian | |
| 2013/0044055 A1 | 2/2013 | Karmarkar et al. | |
| 2014/0020091 A1 | 1/2014 | Pasquero | |
| 2014/0125574 A1 | 5/2014 | Scavezze et al. | |
| 2014/0126782 A1 | 5/2014 | Takai et al. | |
| 2014/0351926 A1 | 11/2014 | McCloskey | |
| 2014/0361996 A1* | 12/2014 | Eden | G06F 3/013 345/173 |
| 2015/0135309 A1 | 5/2015 | Karmarkar | |
| 2015/0227735 A1 | 8/2015 | Chappell | |
| 2015/0302252 A1 | 10/2015 | Herrera | |
| 2017/0109513 A1* | 4/2017 | Skogo | G06F 21/32 |
| 2017/0132399 A1* | 5/2017 | Pawluk | G06F 3/013 |
| 2017/0135577 A1* | 5/2017 | Komogortsev | A61B 3/113 |
| 2017/0140222 A1* | 5/2017 | Zhou | G06F 21/32 |
| 2017/0154177 A1* | 6/2017 | Tsou | G06F 21/32 |
| 2017/0263017 A1* | 9/2017 | Wang | G06T 7/73 |
| 2017/0300686 A1* | 10/2017 | Shyu | G06F 21/36 |

OTHER PUBLICATIONS

Brooks et al., "Gaze Prints: User Centered Design and Evaluation of an Eye Movement-based Biometric Authentication System," Published on Dec. 2012, Available at <<https://students.washington.edu/mjbrooks/wp-content/uploads/2012/12/Poster.SOUPS_.7-14-2011.pdf>> 1 page.

Kumar et al., "Reducing Shoulder-surfing by Using Gaze-based Password Entry," In Proceedings of Symposium on Usable Privacy and Security, Jul. 18, 2007, 7 pages.

Tomasz et al., "Gaze Pattern Lock for Elders and Disabled," In Proceedings of the Third international conference on Information Technologies in Biomedicine, Jun. 11, 2012, 15 pages.

* cited by examiner

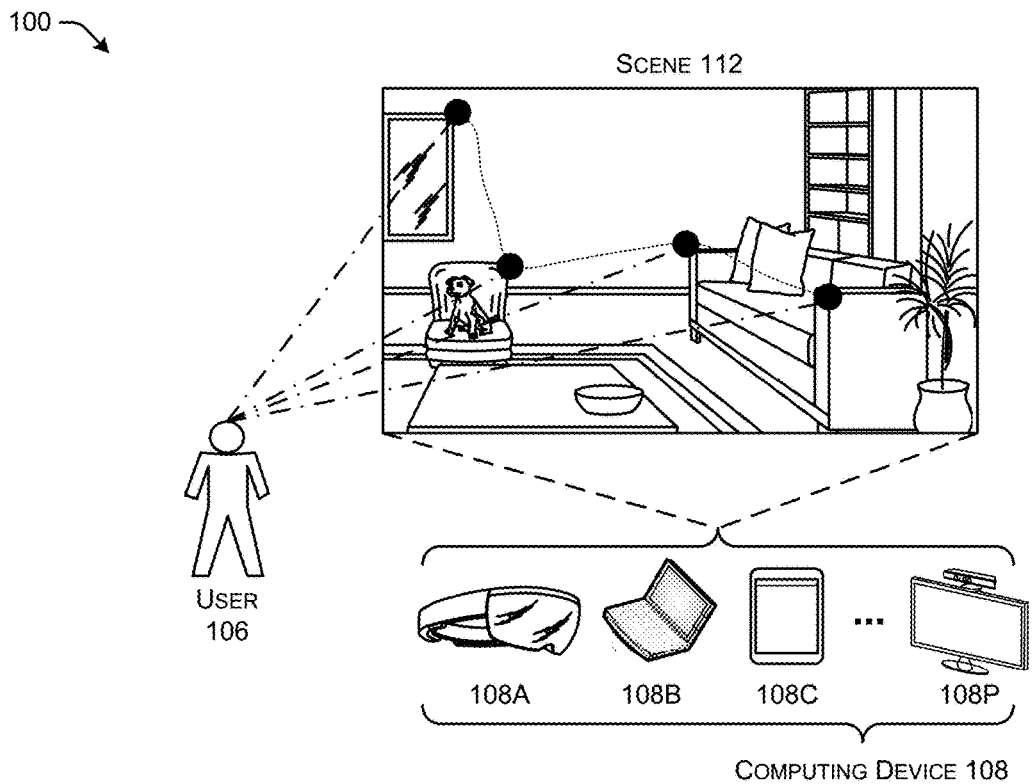
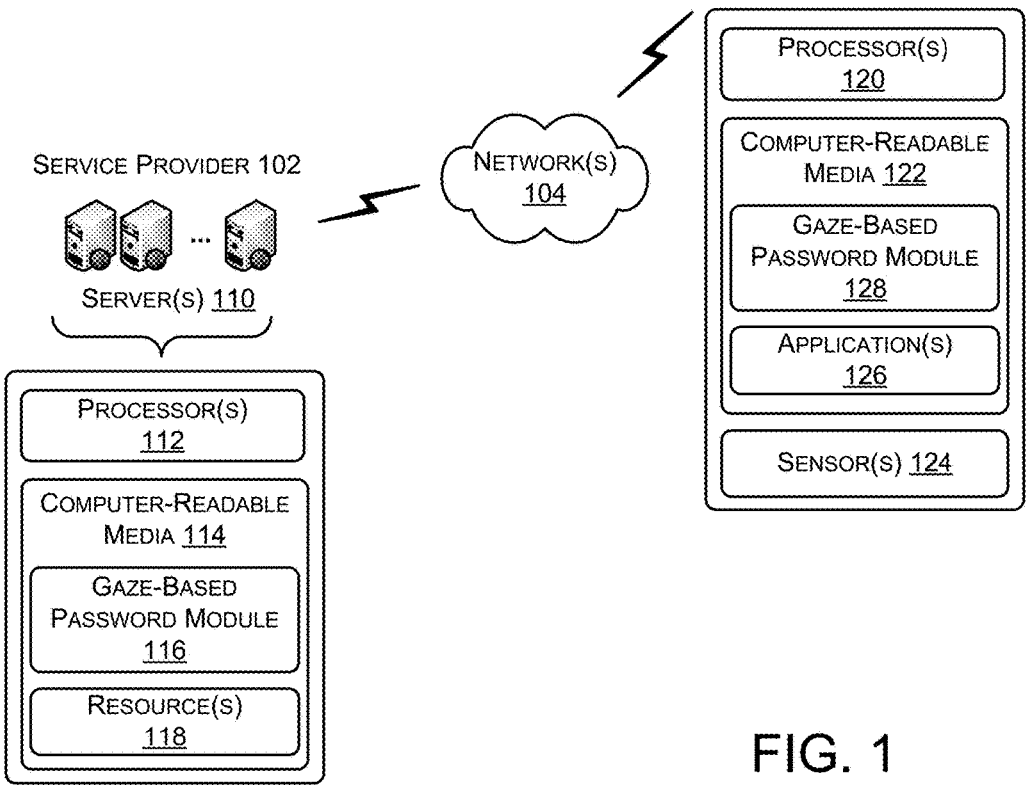
FIG. 1

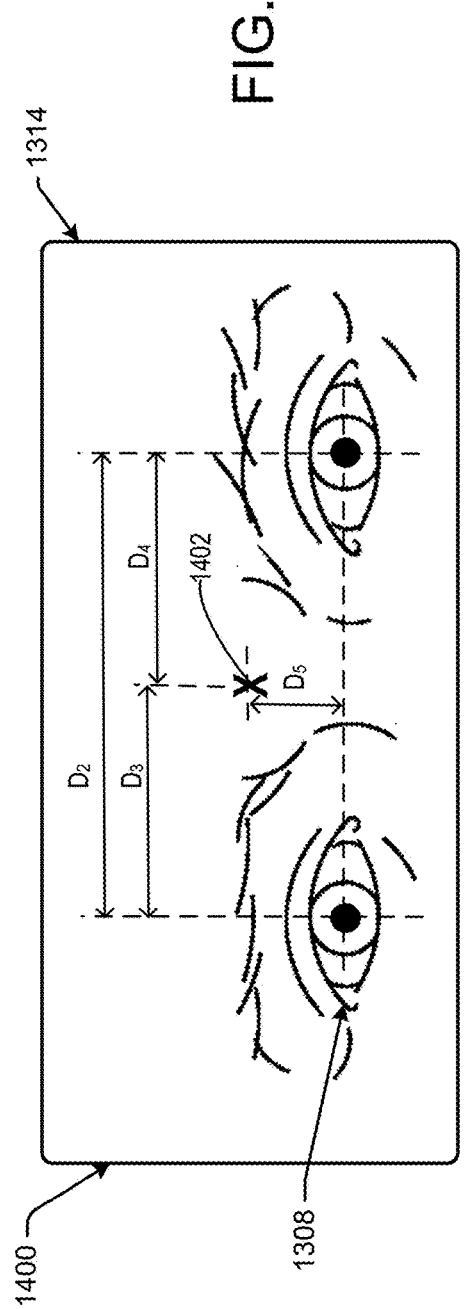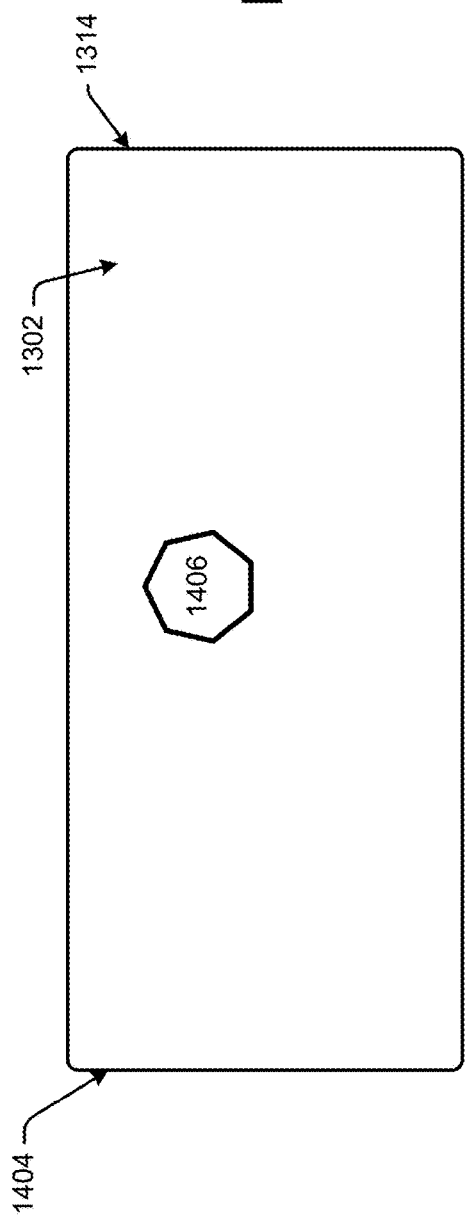

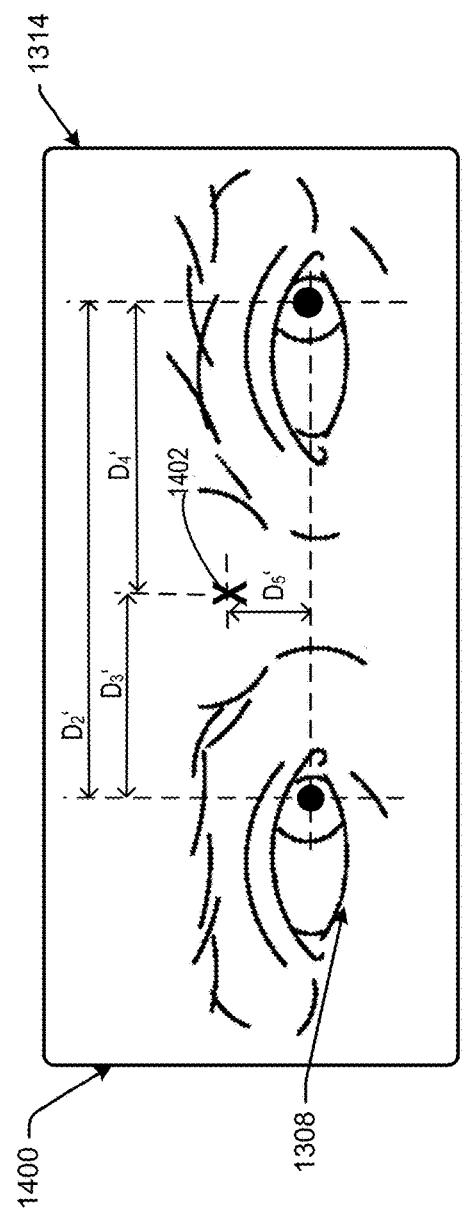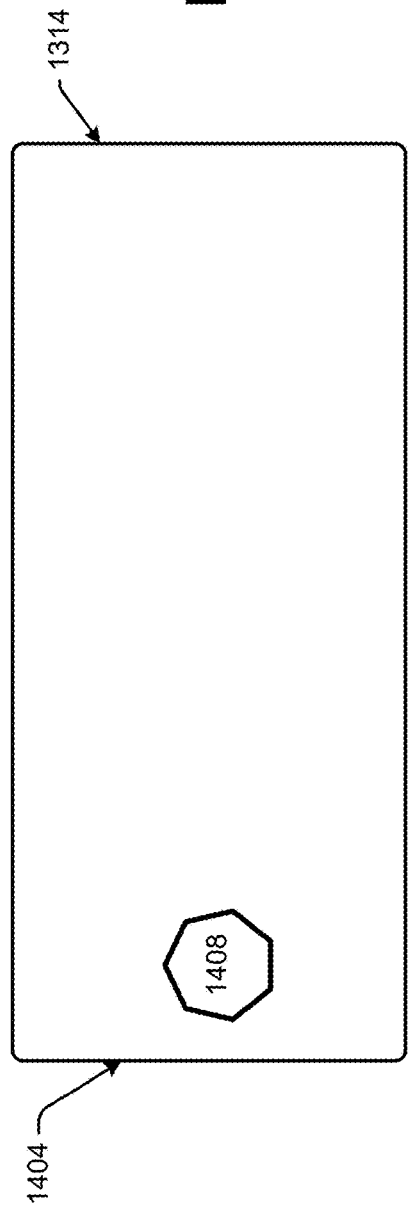

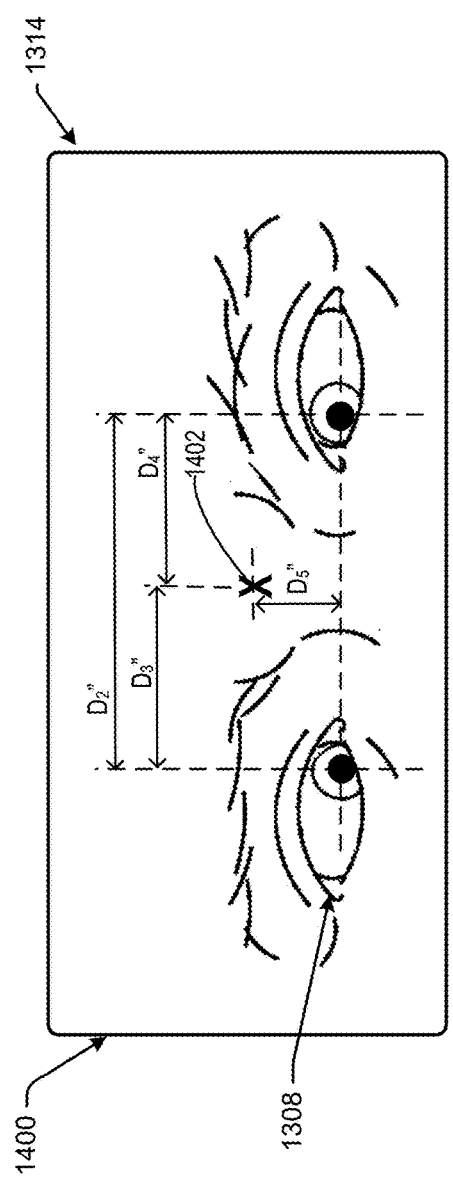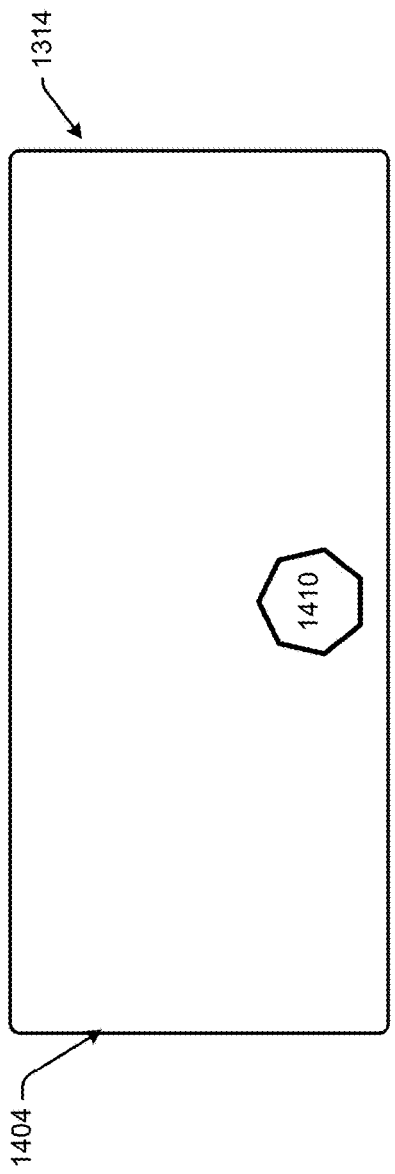

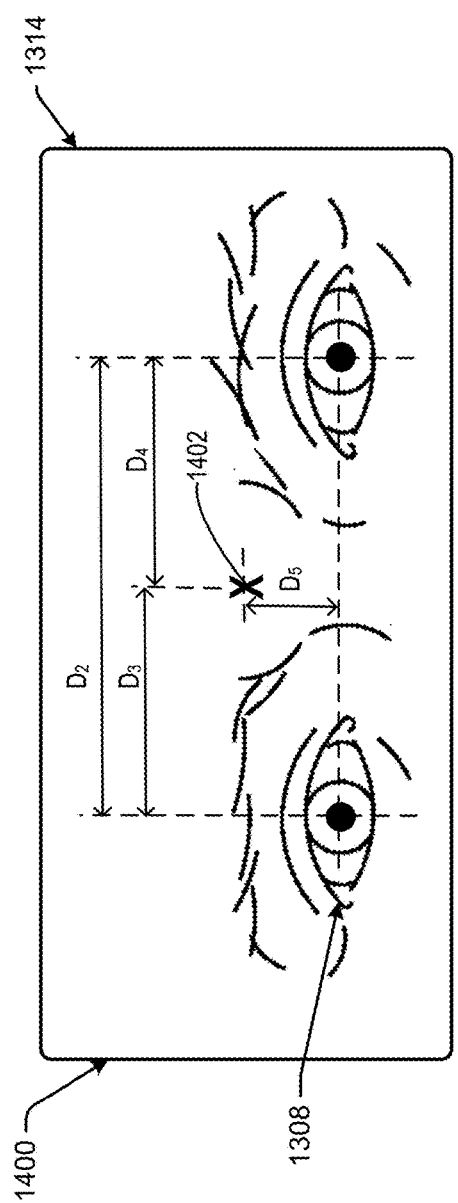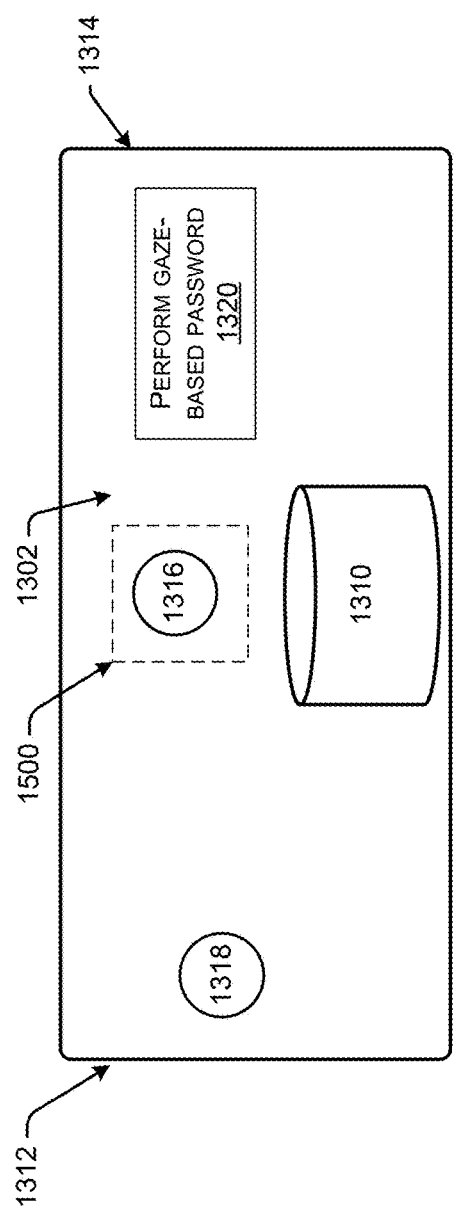

GAZE-BASED AUTHENTICATION

BACKGROUND

Users are often required to login to authenticate their identity in order to access online accounts, computing devices, or other computing resources. Numerous authentication techniques exist. For example, before accessing a computing resource, a user may be required to provide a login name, email address, personal identification number (PIN), text-based password, picture password, digital certificate, physical access credential (e.g., smart card), phone number, biometric information (e.g., finger print, retinal scan, etc.), answers to one or more security questions, and/or other identifying information. Authentication has become a common requirement for almost everything users do on computers. However, these existing authentication techniques are burdensome, time consuming, error prone, and distracting to users. Many existing authentication techniques require the use of hands or voice, which makes them unusable by users with disabilities that impair the use of those faculties. Still further, many existing authentication techniques require multiple factors of authentication in order to increase security and to avoid attacks by computers or bots.

SUMMARY

This disclosure describes techniques for authenticating a user to access an account, computing device, location, or other resource using gaze tracking.

In some examples, a user may be prompted to establish a gaze-based password for the resource. For instance, the user may be prompted to identify multiple gaze targets within a scene, and the gaze targets may be used to construct a gaze-based password usable to access the resource. The scene may include one or more images (e.g., photographs, two- or three-dimensional computer generated images, etc.), real-world scenes, and/or mixed reality scenes. The gaze targets may be fixed locations within the scene (e.g., objects depicted in a scene, or geometric features of the scene itself such as a center, corner, edge, or other boundary of the scene) or may correspond to physical or digital objects that are repositionable or movable within the scene. Additionally or alternatively, the scene itself may be static (i.e., unchanging) or dynamic (i.e., one or more objects or portions of the scene may be changing or animated).

The gaze-based password may be used to authenticate the user to access the resource. In some examples, when the user attempts to access the resource, the scene may be presented on a display. In some examples, the scene may be a real-world scene including the user's real-world surroundings, or a mixed reality scene including the user's real-world surroundings and computer generated images augmenting the real-world surroundings. The scene may comprise one or multiple images or objects. The user's gaze may be tracked while the user is viewing the scene to generate login gaze tracking data. The login gaze tracking data may be compared to the gaze-based password and, if the login gaze tracking data satisfies the gaze-based password, the user may be authenticated to access the resource.

The gaze-based authentication techniques described herein provide a fast and easy way of authenticating a user to access a resource, without the need for touch or voice inputs, making them usable by many disabled individuals. In some examples, the gaze-based authentication techniques described herein may be more secure against attacks by computers or bots, and may be implemented without the need to capture and store biometric or other personal information (e.g., fingerprint data, retinal data, etc.). Thus, in some instances, use of gaze-based authentication techniques may eliminate the need for multi-factor authentication techniques, thereby reducing the number of steps and processing operations needed to authenticate a user.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 1 is a schematic diagram showing an example environment for enabling gaze-based authentication to a computing resource.

FIG. 14A-FIG. 14F describe example techniques for obtaining calibration data for gaze tracking.

FIG. 15A-FIG. 15F describe example techniques for processing calibration data and other data to identify a gaze target.

DETAILED DESCRIPTION

Figure 2:
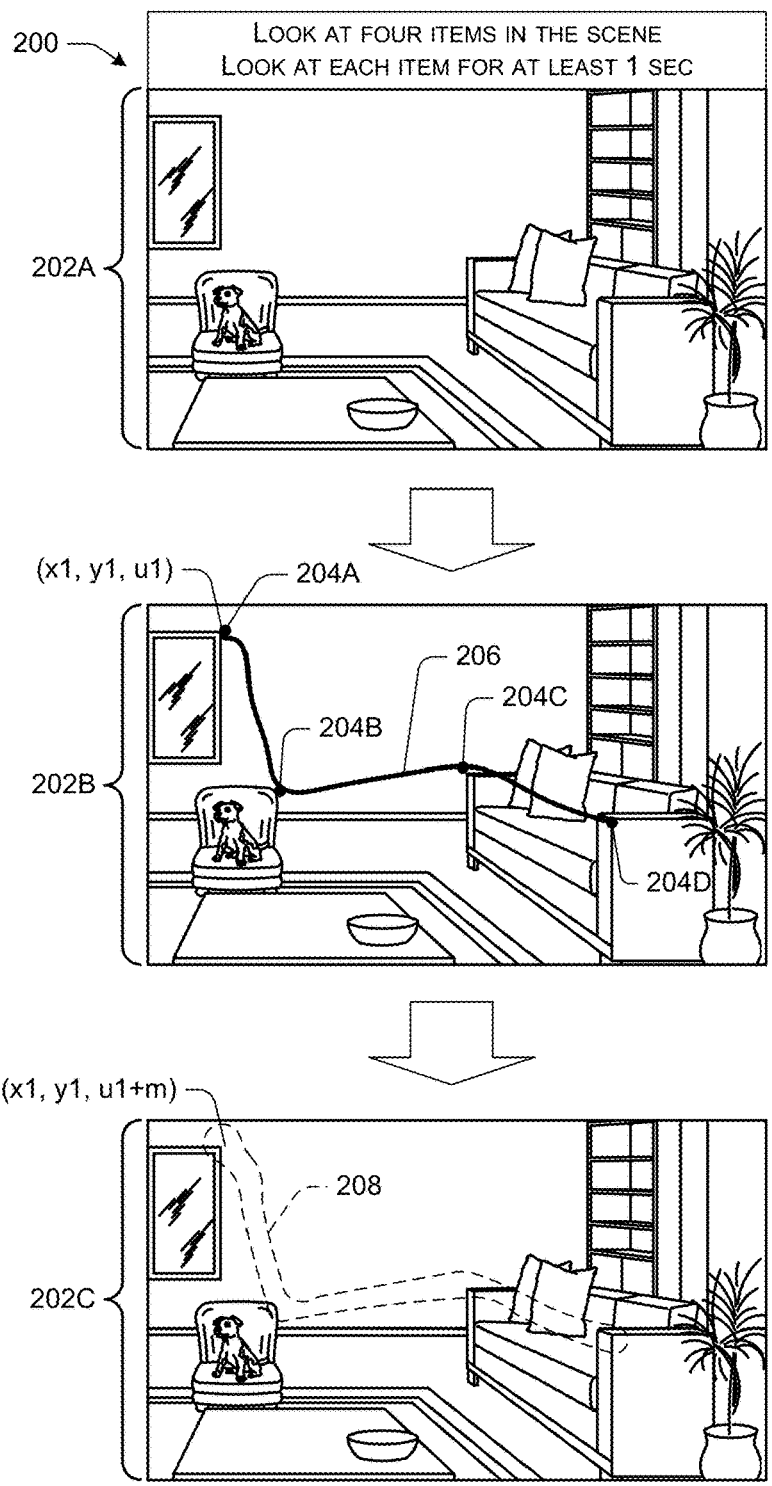
FIG. 2 illustrates an example user interface usable for establishing a gaze-based password using a scene comprised of a single image.

As discussed above, authentication has become a common requirement for almost everything users do on computers. For instance, users are required to authenticate themselves in order to access an online bank account, make a payment to an online merchant, login into a computing device, use a local or web-based application or service, gain entry to a building or room, and the list goes on. However, existing authentication techniques are burdensome, time consuming, error prone, and distracting to users. Many existing authentication techniques require the use of hands or voice, which makes them unusable by users with disabilities that impair the use of those faculties. Still further, many existing authentication techniques require multiple factors of authentication in order to increase security and to avoid attacks by computers or bots.

This disclosure describes gaze-based authentication techniques for authenticating a user to access an account, computing device, location, or other resource using gaze tracking. In some examples, a user may be prompted by a computing device to establish a gaze-based password for the resource by identifying multiple gaze targets of his or her choosing by looking at the gaze targets within a scene. As used herein, a "gaze target" is a location within a scene, an object or part of an object depicted in a scene, or a geometric feature of the scene itself at which a user looks for a threshold length of time. The computing device may specify the threshold length of time (e.g., 1 second, 3 seconds, etc.) that the user is to look at each gaze target in order to identify the gaze target. The computing device may also specify the number of gaze targets that the user is to identify. The number of gaze targets specified may depend on the level of security required, the complexity of the scene, the accuracy of the gaze tracking camera, or other factors.

The scene may include one or more images (e.g., photographs, two- or three-dimensional computer generated images, etc.), a real-world scene comprising the user's real-world surroundings, and/or a mixed reality scene. A mixed reality scene is one in which physical, real-world people and/or objects co-exist with virtual, computer-generated people and/or objects in real time. For example, a mixed reality scene may include all or part of a physical, real-world scene augmented with computer-generated graphics or objects that appear to be in the physical, real-world scene. In some examples, the user may be presented with multiple scenes and prompted to identify gaze targets in all of the scenes or a subset (less than all) of the scenes. In the case of scenes that are entirely computer generated or include computer generated elements (e.g., mixed reality scenes), the computer generated elements may be presented on a display of a computing device. Real-world scenes and real-world portions of mixed reality scenes may simply be visible to the user. In some instances, the user may view the real-world scenes (or portions thereof) through one or more transparent or translucent lenses or screens.

The gaze targets may be fixed locations within the scene (e.g., objects depicted in a scene, or geometric features of the scene itself such as a center, corner, edge, or other boundary of the scene) or may correspond to physical or digital objects that are repositionable or movable within the scene. Additionally or alternatively, the scene itself may be static (i.e., unchanging) or dynamic (i.e., one or more objects or portions of the scene may be changing or animated as in the case of video).

A gaze tracking camera may be used to capture the user's gaze to generate gaze tracking data corresponding to gaze of the user while the user identifies the gaze targets. The multiple gaze targets may then be identified from gaze tracking data captured by the gaze tracking camera. For example, the gaze targets can be identified by, for example, determining locations within the scene at which the user looked for more than the threshold length of time. The computing device may provide feedback to the user to visually indicate when the user has successfully identified each gaze target. For instance, when the user looks at a location for more than the threshold time, a dot, ring, or other indicator may be overlaid on the location to indicate to the user that the gaze target has been successfully identified so the user can proceed to identify the next gaze target. After identifying the gaze targets, in some examples, the user may be prompted to repeat the identification of the gaze targets one or more times to confirm the gaze-based password and/or to compute an acceptable range or margin of execution error for the gaze-based password. The margin for execution error (m) takes into account slight variations in the user's gaze from one password attempt to the next. The margin for execution error (m) may be established by measuring differences between the gaze tracking data during a first pass when the user first looks at the gaze targets and gaze tracking data during one or more subsequent passes when the users confirms the gaze based password.

The gaze-based password may be established based at least in part on the gaze targets. The gaze-based password may take into account the locations of the gaze targets within the scene. For instance, each discreet observation of the user's gaze may be defined as a pixel location (x,y) with some uncertainty (u) value representing inherent inaccuracy in measurements of the user's intentional gaze targeting. A number (n) observations of gaze can be represented as the sequence (x1, y1, u1), (x2, y2, u2), (x3,y3, u3), . . . (xn, yn, un). Connecting the gaze targets with a path having a stroke width equivalent to the uncertainty (u) results in an interpolating spline representing the distinctive path a user's eyes took as they observed the scene. This path between the gaze targets becomes a glyph that can be used as the gaze-based password. In some examples, establishing the gaze-based password may also include expanding the path defining the glyph of the gaze based password to take into account margin for execution error (m). In that case, the sequence of gaze operations can be represented as (x1, y1, u1+m), (x2, y2, u2+m), (x3,y3, u3+m), . . . (xn, yn, un+m).

In the case of three-dimensional computer generated scenes, real-world scenes, and mixed reality scenes, the gaze-based password may additionally or alternatively take into account the relative location and/or orientation of the user relative to the gaze targets objects in the scene at locations corresponding to the gaze targets. For instance, the gaze-based password may specify that the user look at a particular gaze target in the scene from a specific distance, direction, orientation, or vantage point.

In some examples, the gaze-based password may additionally or alternatively take into account information about objects in the scene at locations corresponding to the gaze targets (e.g., a scan or model of the object, a name of the object, contextual information about the object, or other identifying information about the object). For instance, the gaze-based password may store information about particular, known objects (e.g., a comb, a brush, and a bowl) in the scene at the locations corresponding to the gaze targets. Then, to satisfy the gaze-based password during login, the user must gaze at the particular, known objects. The password may or may not require the user to look at the objects in a particular order, that the user be in a particular location relative to the objects, or that the objects be in any particular location within the scene.

Once established, the gaze-based password may be used to authenticate the user to access the computing resource. In some examples, when the user requests or attempts to access the computing resource, an authentication interface including the scene may be presented on a display. In other examples, the scene may be a real-world scene including the user's real-world surroundings, or a mixed reality scene including the user's real-world surroundings and computer generated images augmenting the real-world surroundings. The scene may comprise one or multiple images or objects. The user's gaze may be tracked while the user is viewing the scene to obtain login gaze tracking data. The login gaze tracking data may be compared to the gaze-based password to determine if the login gaze tracking data satisfies the gaze-based password.

In some examples, determining that the login gaze tracking data satisfies the gaze-based password comprises computing a correlation between a gaze path of the login gaze tracking data and a path of the gaze-based password using a regression analysis. In some examples, determining that the login gaze tracking data satisfies the gaze-based password comprises determining, for each gaze target of the gaze-based password, a probability that the user gazed at the respective gaze target. Based at least in part on the determined probabilities that the user gazed at each of the multiple gaze targets, the computing device can calculate a similarity of the login gaze tracking data to the gaze-based password. Several examples of computing similarity of the login gaze tracking data to the gaze-based password are provided below.

In one example, a geometric approach may be applied to compare login gaze tracking data to the gaze-based password. In this example, the original gaze tracking data generated during the password establishment phase can be interpolated with a best-fit spline (S) and uncertainty value. The uncertainty value can take into account measurement uncertainty (u) and/or margin for execution error (m). The original gaze tracking data generated during the password establishment phase may include data of the user's gaze while looking at the multiple gaze targets during a single pass (e.g., the first time the user identifies the gaze targets) or multiple passes (e.g., the first time and one or more repetitions to confirm the password and/or establish a margin for execution error). The login gaze tracking data comprises a set of discreet point samples RT=(x1, y1, z1), (x2, y2, z2), . . . (xn, yn, zn). For each gaze target or point t in the observation set RT, a distance (me) between t and RS can be computed. Additional details of how to compute the distance me is described in Wen-Haw Chen, *The Distance between a Point and a Bezier Curve on a Bezier Surface*, International Journal of Mathematical, Computational, Physical, Electrical and Computer Engineering Vol: 4, No: 5, 2010. If me≤u (or u+m) for all points in the observation set RT, then the gaze-based password is satisfied. Else, if me>u (or u+m) for any point in the observation set RT, then the gaze-based password is not satisfied and the user may be prompted to attempt the gaze-based password again. Alternatively, in some examples, the gaze-based password may be satisfied if me≤u (or u+m) for at least a threshold amount of points in the observation set RT (e.g., a predetermined percentage of points, a statistically significant number of points, etc.).

In another example, the comparison may be made by comparing a gaze path of the user during login to a gaze path of the user at the time of password creation. This example is similar to the previous example when the sample rate of the gaze tracking data during both password creation and authentication is much higher (e.g., approaches infinity). In this example, the gaze-based password is treated as a set RS of samples (s) with approximate loci with an uncertainty value. Again, the uncertainty may include measurement uncertainty (u) and/or margin for execution error (m). During authentication, the login gaze tracking data is treated as another sample set of loci RT. For each sample t in the set RT, initialize me to a large number. For each sample s in RS, compute e=dist(t, s), where e is the L2 norm or Euclidian norm. The distance me between t and RS can be computed as the min (e, me). As in the previous example, if me≤u (or u+m) for all points in the observation set RT, then the gaze-based password is satisfied. Else, if me>u (or u+m) for any point in the observation set RT, then the gaze-based password is not satisfied and the user may be prompted to attempt the gaze-based password again. Alternatively, in some examples, the gaze-based password may be satisfied if me≤u (or u+m) for at least a threshold amount of points in the observation set RT (e.g., a predetermined percentage of points, a statistically significant number of points, etc.).

In another example, the comparison may be made by using an inverted model, projecting everything back to a 2-D plane from the user's perspective. In this example, perspective projected observations may be drawn into a background buffer, invisible to the user, in a memorable color such as red. In the same background buffer, the gaze-based password spline (S) may be drawn with the specified stroke width representing uncertainty (e.g., measurement uncertainty u and/or margin for execution error m) in a different color, such as green. The projections required may be implemented directly or may use, for example, perspective transformations built-into OpenGL or DirectX. After obtaining the rendered 2-D pixel image, the gaze-based password can be found to be satisfied if there exist no red pixels in the rendered image. Otherwise, the gaze-based password is not satisfied and the user may be prompted to attempt the gaze-based password again. Alternatively, in some examples, the gaze-based password may be satisfied if at some ratio of pixels in the 2-D image are green as opposed to red (e.g., a predetermined percentage of pixels, a statistically significant number of pixels, etc.).

In yet another example, the set of points for the gaze-based password may be continuously updated. In that case, each new sample set S can be added to the set of training sample points RS, and a new best-fit curve RS' and residual (RMSD for the set). For each login attempt, if the sum of square errors decreases or remains the same, then the gaze-based password may be found to be satisfied and RS is updated to RS'. Otherwise, the gaze-based password is not satisfied, RS' is discarded, and the user may be prompted to attempt the gaze-based password again.

In some examples, machine learning techniques, such as Dynamic Time Warping, Hidden Markov Models, or any other known technique for comparing a set of sampled points to an approximate spline with well-defined uncertainty can be applied to refine the comparison techniques over time. The login gaze tracking data may be found to satisfy the gaze-based password if the similarity of the login gaze tracking data to the gaze-based password is above a threshold similarity learned from the data. The threshold of similarity required may depend on the level of security desired, the number of gaze targets included in the password, the complexity of the scene, the margin for execution error, measurement uncertainty, or other factors. In certain cases, the threshold may not be a fixed scalar but can instead be an estimation that adapts itself automatically to the complexity of the sequence (e.g. a Threshold Model for Hidden Markov Models that is trained using a dataset).

If the login gaze tracking data satisfies the gaze-based password, the user may be authenticated to access the computing resource. In some examples, the gaze-based password may be updated based on the login gaze tracking data to adjust (e.g., expand or contract) the margin for execution error and/or to adjust the locations of one or more gaze targets to account for slight changes in the user's gaze over time.

In some examples, the gaze-based authentication techniques described herein may be implemented in whole or in part using a head-mounted computing device (e.g., Occulus Rift® by Occulus VR, Google Glass by Google Inc., or HoloLens by Microsoft Corporation) having a gaze tracking camera. The head-mounted computing device may also include a display and/or an environmental camera to capture the surroundings or environment of a user. When the user desires to login to use the head-mounted display or other computing resource accessible via the head-mounted display, the user may simply gaze at a scene displayed by the head-mounted display device, a real-world scene of his or her real-world surroundings, or at a mixed reality scene, the user's gaze may be tracked by the gaze tracking camera. In other examples, the gaze-based authentication techniques described herein may be implemented using a personal computer (e.g., laptop or desktop) having a user-facing web camera to capture the user's gaze. In other examples, the gaze-based authentication techniques described herein may be implemented using a game console or other computing device in communication with a depth camera as a user input (e.g., Kinect® by Microsoft Corporation, PlayStation® Camera by Sony Corporation).

While certain specific examples are described involving various hardware and software configurations, the techniques described herein are not limited to those examples and may be implemented using any computing device or combination of computing devices capable of tracking a gaze of a user while the user looks at a scene. Examples of other computing devices that are usable to implement the techniques described herein include, without limitation desktop computers, laptop computers, tablet computers, mobile devices, smartphones, wearable computers, implanted computing devices, telecommunication devices, automotive computers, network enabled televisions, thin clients, terminals, game consoles, gaming devices, work stations, media players, digital video recorders (DVRs), set-top boxes, cameras, access points to a building or other facility, integrated components for inclusion in a computing device, appliances, or any other sort of computing device including or having access to a camera or other sensor capable of tracking gaze of a user.

While the subject matter described herein is primarily presented in the general context of techniques for gaze-based authentication to a computing resource, the techniques described herein may apply to any type of scenario where gaze-based authentication is employed, such as access to a physical site (e.g., building, room, locker, etc.), object (e.g., vehicle, appliance, etc.), or resource. Also, while the gaze-based authentication techniques describe both establishing a gaze-based password and authenticating a user based on the gaze-based password by tracking gaze of a user, in other examples either the password establishing phase or the authentication phase may be performed using other techniques. For instance, the gaze-based password may be established using touch inputs (e.g., touch inputs on a touch screen) or gestures (e.g., gestures performed to point to or "touch" a virtual object) to set the gaze targets, and the user may be authenticated by tracking the user's gaze at the gaze targets.

The gaze-based authentication techniques described herein provide a fast and easy way of authenticating a user to access a resource, without the need for touch or voice inputs. Because the authentication can be "hands free," even users with impairments to the use of their hands and voice can be authenticated to the resource. In some examples, the gaze-based authentication techniques described herein may include gaze targets that are specific to the user's real-world location (e.g., features or objects in a user's surroundings), making the techniques more secure against attacks by computers and bots. Also, because the techniques described herein can be implemented without the use of biometric or other personal information (e.g., fingerprint data, retinal data, etc.), the techniques reduce the risk of personal information being misappropriated. In some examples, use of gaze-based authentication techniques may eliminate the need for multi-factor authentication techniques, thereby reducing the number of steps and processing operations needed to authenticate a user.

These and various other example features will be apparent from a reading of the following description and a review of the associated drawings. However, the claimed subject matter is not limited to implementations that solve any or all disadvantages or provide any of the benefits noted in any part of this disclosure.

Example Environments

FIG. 1 is a schematic diagram showing an example environment 100 in which a gaze-based password can be implemented. The example environment 100 can include a service provider 102, one or more networks 104, a user 106, and one or more computing devices 108 usable by the user 106 to access a service or resource available from the service provider 102 via the network(s) 104. Example computing device(s) 108 illustrated in this figure include a head-mounted computing device 108A, a laptop computer 108B, a tablet computer 108C, and a gaming device 108P. However, as discussed above, the techniques described herein can also be implemented using any other computing device including or having access to a camera or other sensor capable of tracking gaze of a user.

In this example, the user 106 is attempting to access a resource provided by the service provider 102 via the network(s) 104. In some examples, the network(s) 104 can be any type of wired and/or wireless networks known in the art. Moreover, the computing devices 108 can communicatively couple to the network(s) 104 in any manner, such as by a wired or wireless connection (e.g., Ethernet, WiFi, Bluetooth, cellular data connection, etc.). The network(s) 104 can facilitate communication between the service provider 102 and the computing devices 108.

The service provider 102 can include one or more server(s) 110, which can be arranged in a data center or server farm. Additionally or alternatively, the service provider 102 can be implemented in a distributed computing environment, with portions of the service running on one or more other devices (e.g., computing devices 108 or other remotely located devices). The server(s) 110 or other computing devices of the service provider 102 can include one or more processing unit(s)(e.g., processor(s) 112) and computer-readable media 114, such as memory. The computer-readable media 114 includes a gaze-based password module 116 and one or more resources 118. The resource(s) 118 may include applications or services provided by the service provider 102. For instance, in one specific example, the service provider 102 may comprise a financial institution and the resource may comprise an online banking account of the user 106. However, as discussed above, the resource provided by service provider 102 may be any service commonly provided by an online service provider, such as, for example, a shopping service, a gaming service, a mail service, a social networking service, or the like.

When the user 106 attempts to access the resource 118, the user is prompted to enter his or her gaze-based password. In some examples, the prompting may include the service provider 102 serving an authentication interface for presentation to the user 106 via a display of the computing device 108. In that case, the authentication interface may include a scene 112 to be presented. Additionally or alternatively, the prompting may include the service provider sending an audible or visual prompt instructing the user to perform his or her gaze based password (with or without sending the scene). As noted above, the scene 112 may be a computer generated scene, a real-world scene, or a mixed reality scene. Upon receiving the prompt, the user 106 may perform the gaze-based password.

The computing device 108 can include one or more processing unit(s)(e.g., processor(s) 120), computer-readable media 122 such as memory, and one or more sensors 124 (e.g., a gaze tracking camera, an environmental camera, etc.). The computer-readable media 122 may include one or more applications 126, such as an operating system, a browser, or the like. The computing device 108 may capture gaze tracking data using the sensor(s) 124 or other sensor of the computing device 108 while the user 106 performs the gaze-based password, and may transmit the gaze tracking data to the service provider 102 via the network 104. The service provider 102 may determine whether or not the gaze tracking data matches a gaze-based password usable to access the resource 118 and, if so, may authenticate the user to access the resource 118.

In other examples, instead of being provided by the service provider 102, the resource to be accessed by the user 106 may be the computing device 108 itself or one of the applications 126 stored locally on the computing device, or the resource to be accessed may be a physical resource (e.g., a building, room, locker, etc.) to which the user is attempting to gain access. In such cases, the computing device 108 may also include a gaze-based password module 128 stored in the computer-readable media 122 to perform the gaze-based password authentication. While the gaze-based password modules 116 and 128 are shown as separate modules in computer-readable media of their respective devices (server 110 and computing device 108), in other examples, the gaze-based password functionality may be incorporated into the operating system or another application running on the respective devices.

Example Gaze-Based Authentication

FIGS. 2-11 illustrate gaze-based authentication techniques in the context of various different example computer generated, real-world, and mixed reality scenes.

FIG. 2 illustrates an example process of establishing a gaze-based password using a scene 200 comprised of a single image. When a user attempts to access a resource for a first time, the user may be prompted to set up a gaze-based password. The scene 200 may be selected to use for the gaze-based authentication. In some examples, the user may upload a scene or designate a scene from a repository of scenes available to the computing device (e.g., an online photo library, social networking site, etc.) to use for the gaze-based authentication. In some examples, a computing device associated with the resource to be accessed may select the scene to be used for the gaze-based authentication, or may present the user with multiple scenes from which the user can select a scene to be used for the gaze-based authentication. In this example, the scene 200 comprises a static photograph or other two-dimensional a computer generated scene. However, in other examples, the scene may be dynamic (i.e., one or more objects or portions of the scene may be changing or animated as in the case of video).

As shown at 202A, the scene is presented on a display of a computing device. The scene 200 in this example depicts a room with multiple objects. The user is then prompted to look at one or more things depicted in the scene. In some cases, the user may be prompted to look at a specified number (n) of things in the scene to be used as gaze targets for the user's gaze-based password. In this example, n=4. However, in other examples (n) may be any integer number greater than or equal to 1, depending on, for example, the desired level of security, the complexity of the scene, and the like.

At 202B the user looks at the specified number of things in the scene 200. The "things" at which the user looks during this password establishment phase are referred to as "gaze targets" and may include fixed locations within the scene (e.g., objects depicted in a scene, or geometric features of the scene itself such as a center, corner, edge, or other boundary of the scene). As the user looks at the scene 200, a gaze tracking camera or other sensor may be used to capture the user's gaze to generate gaze tracking data corresponding to gaze of the user while the user identifies the gaze targets. The multiple gaze targets 204A, 204B, 204C, and 204D (collectively "gaze targets 204") may then be identified from the gaze tracking data captured by the gaze tracking camera. For example, the gaze targets 204 can be identified by, for example, determining locations within the scene 200 at which the user looked for more than the threshold length of time (e.g., greater than 1 second). In the illustrated example, gaze target 204A corresponds to the top right corner of a window, gaze target 204B corresponds to a top right corner of a chair, gaze target 204C corresponds to a first armrest of a couch, and gaze target 204D corresponds to a second armrest of the couch.

In this example, the computing device provides feedback to the user to indicate when the user has successfully identified each gaze target. In the illustrated example, the feedback is shown as a black dot overlaid on the scene 200 centered at the location of the gaze target. However, in other examples, the feedback may take different forms, such a shape surrounding the gaze target (e.g., ring, square, triangle, etc.), an arrow pointing to the gaze target, an illumination or glow around the gaze target, an audible tone or message, a vibration or other haptic feedback, or any other feedback to the user when and/or where a gaze target has been successfully identified in the scene. The feedback may be persisted on the display until the password has been completed, or the feedback for each gaze target may be fleeting (e.g., being presented for only a short time after the gaze target is successfully identified). In some examples, in addition to or instead of the gaze targets 204, a path 206 of the user's gaze may be captured by the gaze tracking camera or other sensors. The gaze tracking data includes some measurement uncertainty (u) due to inherent inaccuracy in measurements of the user's intentional gaze targeting. The size of the gaze targets 204 and the width of the gaze path 206 represent this measurement uncertainty (u).

After identifying the gaze targets 204 and/or path 206, in some examples, the user may be prompted to repeat the identification of the gaze targets one or more times to confirm the gaze-based password and/or to compute an acceptable range or margin of execution error for the gaze-based password. Based on the repetition of the password, a margin for execution error (m) may be established that takes into account slight variations in the user's gaze from one password attempt to the next. The margin for execution error (m) may be established by measuring differences between the gaze tracking data during a first pass when the user first looks at the gaze targets and gaze tracking data during one or more subsequent passes when the users confirms the gaze based password. Thus, if the user looks at slightly different locations in the scene 200 during each repetition and/or the gaze path changes slightly those differences may be used to broaden an acceptable area of the gaze targets 204 and/or gaze path 206.

As shown at 202C, a gaze-based password 208 may be established. The gaze-based password 208 in this examples is based on the gaze targets 204 and the gaze path 206, and takes into account both measurement uncertainty (u) and a margin for execution error (m). That is, the gaze-based password 208 is defined by locations of the gaze targets 204 from one or multiple inputs by the user. For instance, each discreet observation of the user's gaze may be defined as a pixel location (x,y) with some uncertainty (u) value representing inherent inaccuracy in measurements of the user's intentional gaze targeting. A number (n) of gaze targets 204 can be represented as the sequence (x1, y1, u1), (x2, y2, u2), (x3,y3, u3), . . . (xn, yn, un). Connecting the gaze targets 204 with the path 206 having a stroke width equivalent to the uncertainty (u) results in an interpolating spline representing the distinctive path a user's eyes took as they observed the scene 200. This path between the gaze targets represents a glyph that can be used as the gaze-based password. The gaze-based password 208 can also be expanded based on one or more repetitions of the password to take into account margin for execution error (m). This has the practical effect of increasing the stroke width of the path 206. In the illustrated example, the margin for execution error (m) as shown as being a constant along the length of the path 206. In that case, the sequence of gaze operations can be represented as (x1, y1, u1+m), (x2, y2, u2+m), (x3,y3, u3+m), . . . (xn, yn, un+m). However, in other examples, the margin for execution error (m) may vary over the length of the path 206. In some examples, the gaze-based password 208 can be represented as an area or bounded region within the scene 200. Once established, the gaze-based password 208 may be used to authenticate the user to access the resource.

Figure 3:
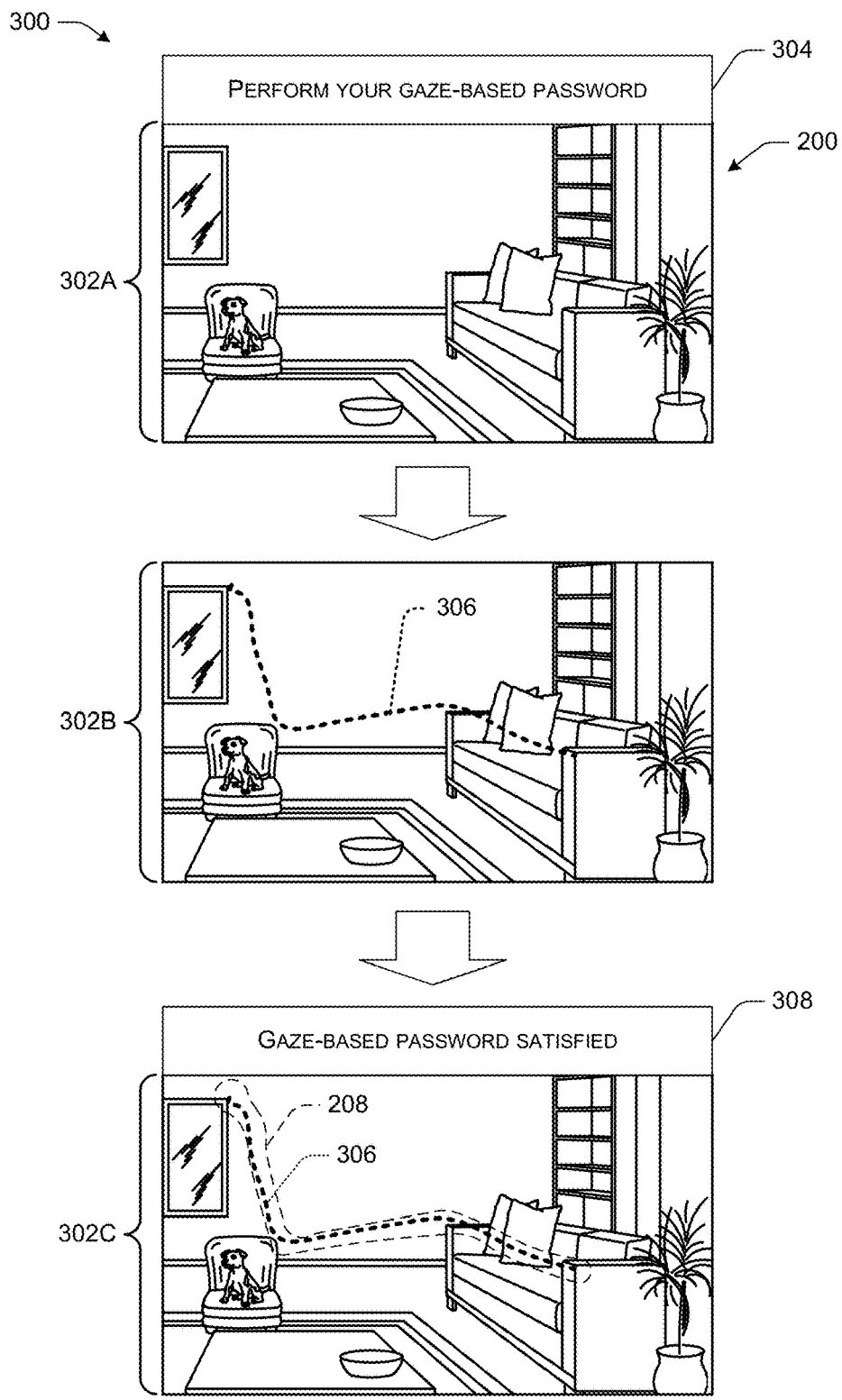
FIG. 3 illustrates an example process of authenticating a user to access a computing resource using a gaze-based password using the scene of FIG. 2.

FIG. 3 illustrates an example process of authenticating a user to access a computing resource using a gaze-based password. Continuing the example from FIG. 2, when the user next attempts to access the resource, the user may, at 302A, be presented with an authentication interface 300 including the scene 200. The authentication interface 300 may include a prompt 304 instructing the user to perform their gaze-based password.

As shown at 302B, the user's gaze may be tracked while the user is viewing the scene to obtain login gaze tracking data. The login gaze tracking data is represented in FIG. 3 by login path 306. While visual feedback is not shown in this figure, in some examples feedback showing the user's gaze on the display (or audible or haptic feedback) may be provided to the user during the authentication phase. The login gaze tracking data is then compared to the gaze-based password 208 to determine if the login gaze tracking data satisfies the gaze-based password. This comparison is shown schematically at 302C. As shown, the entire login path 306 (including all gaze targets) in this example falls within the bounds of the gaze tracking password 208. Thus, the gaze-based password 208 is satisfied in this example. As outlined below, in some examples, the gaze-based password may be satisfied even if portions of the login path 306 and/or one or more gaze targets fall outside the area defined by the gaze-based password, or depart from the gaze-based password glyph by more than the margin for execution error (m) and the measurement uncertainty (u).

In practice, the comparison may be performed using a variety of techniques. In one example, the comparison may comprise determining whether points along the login path 306 fall within a bounded area of the gaze tracking password 208. In another example, the comparison may comprise computing a correlation between the login path 306 and the gaze-based password 208 using, for example a regression analysis. In another example, the comparison may comprise statistical analysis by determining, for each gaze target of the gaze-based password, a probability that the user gazed at the respective gaze target. Based at least in part on the determined probabilities that the user gazed at each of the multiple gaze targets, the computing device can calculate a similarity of the login gaze tracking data to the gaze-based password. The similarity of the login gaze tracking data to the gaze-based password can be computed using any of the comparison techniques described herein.

If the login gaze tracking data satisfies the gaze-based password, the user may be authenticated to access the computing resource. In some examples, the authentication interface 300 may present a message 308 indicating to the user that the password was satisfied or that the authentication was successful.

In some examples, the gaze-based password may be updated based on the login gaze tracking data to adjust (e.g., expand or contract) the margin for execution error (m) and/or to adjust the locations of one or more gaze targets to account for slight changes in the user's gaze over time. For instance, in the example of FIG. 3, if a portion of the login path 306 strayed outside the area bounded by the gaze-based password 208, but overall the login path 306 was sufficiently similar to satisfy the gaze-based password 208, the gaze-based password 208 may be modified or expanded to include the area of the scene where the login path 306 strayed outside the previous area bounded by the gaze-based password 208.

In some examples, multiple scenes may be used for the gaze-based password. The multiple scenes may be presented concurrently (e.g., as multiple tiled images as described further below with reference to FIGS. 4-6), or sequentially. In the case of a gaze-based password composed of multiple sequential scenes, the process described with reference to FIG. 2 may be repeated to establish a gaze-based password element (e.g., glyph, spline, region, etc.) for each scene that forms a part of the gaze-based password. Then, during authentication, the user may be presented with multiple sequential scenes and may perform the gaze-based password element for each scene that forms a part of the gaze-based password. In that case, the process described with reference to FIG. 3 may be repeated for each scene that forms a part of the gaze-based password. Additionally or alternatively, during the authentication phase, the user may be sequentially presented with the multiple images in the same order as during the password establishment phase, or in a different order. Moreover, in some examples, during the authentication phase, the user may be presented with salient scenes that form part of the gaze-based password interspersed with filler scenes that do not form part of the gaze-based password.

Figure 4:
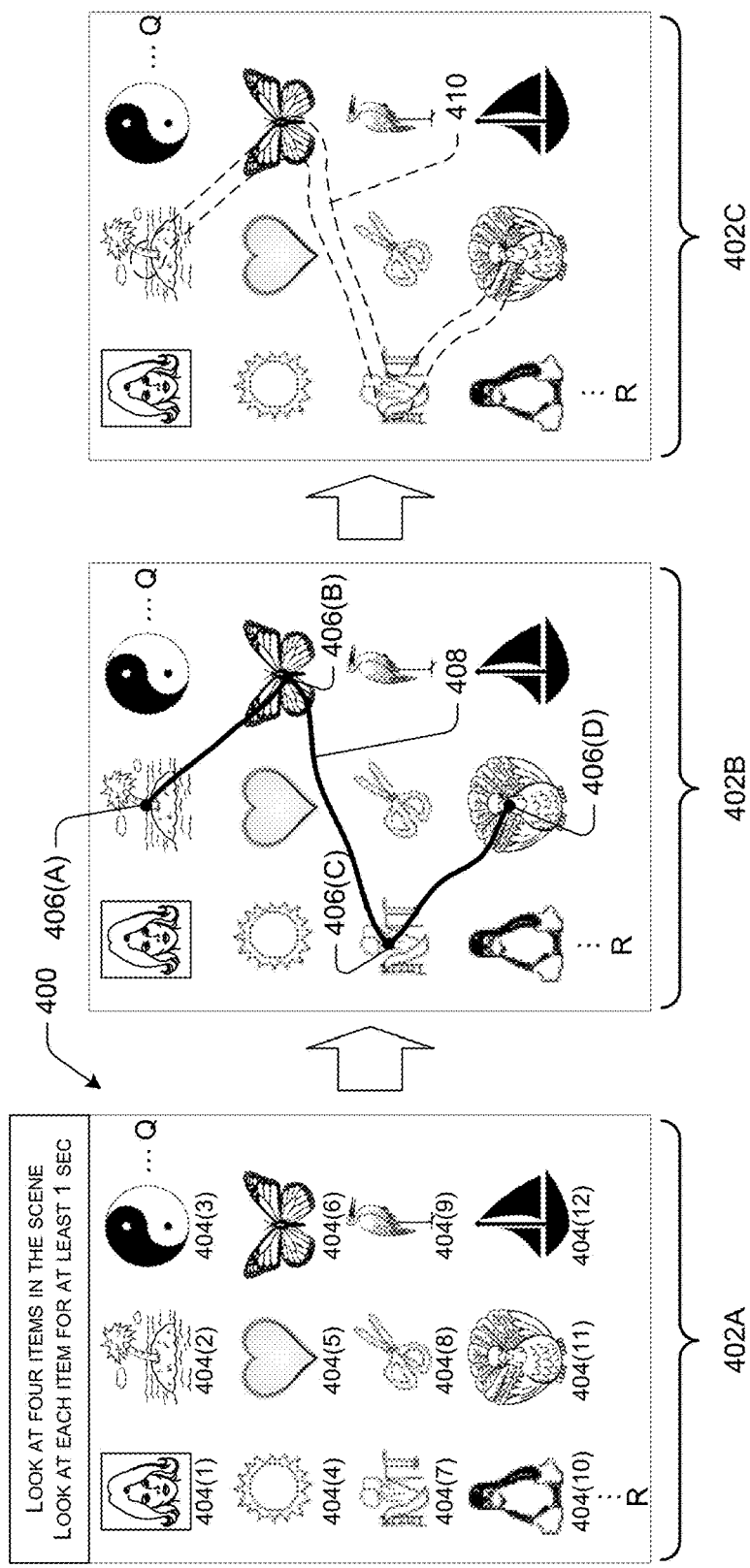
FIG. 4 illustrates an example process of establishing a gaze-based password using a scene comprised of multiple tiled images.

FIG. 4 illustrates an example process of establishing a gaze-based password using a scene 400 comprised of multiple tiled images 404(1)-404(12) (collectively "images 404"). When a user attempts to access a resource for a first time, the user may be prompted to set up a gaze-based password. The scene 400 may be selected to use for the gaze-based authentication. In some examples, the scene 400 may include images that are uploaded by the user or are designated by the user from a repository of scenes available to the computing device (e.g., an online photo library, social networking site, etc.) to use for the gaze-based authentication. In some examples, a computing device associated with the resource to be accessed may select the scene to be used for the gaze-based authentication, or may present the user with multiple images from which the user can select images for the scene to be used for the gaze-based authentication. In this example, the scene 400 comprises a multiple static photographs or other two-dimensional computer generated images 404. However, in other examples, the scene 400 may be dynamic (i.e., one or more objects or portions of the scene may be changing or animated as in the case of video).

As shown at 402A, the scene 400 is presented on a display of a computing device. The scene 400 in this example depicts twelve two-dimensional images 404(1)-404(12) in a grid format with three columns and four rows. However, the scene may extend further in the horizontal and/or vertical directions to include any number images arranged in any numbers of columns (Q) and rows (R), where Q and R are positive integers, and either Q or R or both are greater than or equal to 2.

The user is then prompted to look at one or more things depicted in the scene 400. In some cases, the user may be prompted to look at a specified number (n) of things in the scene to be used as gaze targets for the user's gaze-based password. In this example, n=4. However, in other examples (n) may be any integer number greater than or equal to 1, depending on, for example, the desired level of security, the complexity of the scene, and the like.

At 402B the user looks at the specified number of things in the scene 400. The "things" at which the user looks during this password establishment phase are referred to as "gaze targets" 406(A)-406(D)(collectively "gaze targets 406"). The gaze targets 406 may correspond to individual images of the multiple tiled images (e.g., image 404(2), image 404(6), image 404(7), and image 404(11)), while in other examples, the gaze targets 406 may correspond to specific points within the multiple tiled images (e.g., base of palm tree in image 404(2), abdomen of butterfly in image 404(6), center of park in image 404(7), and beak of turkey in image 404(11)).

As the user looks at the scene 400, a gaze tracking camera or other sensor may be used to capture the user's gaze to generate gaze tracking data corresponding to gaze of the user while the user identifies the gaze targets 406. The multiple gaze targets 406A, 406B, 406C, and 406D may then be identified from the gaze tracking data captured by the gaze tracking camera. For example, the gaze targets 406 can be identified by, for example, determining locations within the scene 400 at which the user looked for more than the threshold length of time (e.g., greater than 1 second).

As described with reference to FIG. 2 above, the computing device may in some instance provide feedback to the user (e.g., visual, audio, haptic/tactile, etc.) to indicate when the user has successfully identified each gaze target. The feedback may include any of the types feedback described throughout the application. In some examples, in addition to or instead of the gaze targets 406, a path 408 of the user's gaze may be captured by the gaze tracking camera or other sensors. As described with reference to FIG. 2, the gaze tracking data includes some measurement uncertainty (u) due to inherent inaccuracy in measurements of the user's intentional gaze targeting. The size of the gaze targets 406 and the width of the gaze path 408 represent this measurement uncertainty (u).

After identifying the gaze targets 406 and/or path 408, in some examples, the user may be prompted to repeat the identification of the gaze targets one or more times to confirm the gaze-based password and/or to compute an acceptable range or margin of execution error for the gaze-based password. Based on the repetition of the password, a margin for execution error (m) may be established using one or more of the techniques described with reference to FIG. 2.

As shown at 402C, a gaze-based password 410 may be established. The gaze-based password 410 in this example is based on the gaze targets 406 and the gaze path 408, and takes into account both measurement uncertainty (u) and a margin for execution error (m). That is, the gaze-based password 410 is defined by locations of the gaze targets 406 from one or multiple inputs by the user. For instance, each discreet observation of the user's gaze may be defined as a pixel location (x,y) with some uncertainty (u) value representing inherent inaccuracy in measurements of the user's intentional gaze targeting. A number (n) of gaze targets 406 can be represented as the sequence (x1, y1, u1), (x2, y2, u2), (x3,y3, u3), . . . (xn, yn, un). Connecting the gaze targets 406 with the path 408 having a stroke width equivalent to the uncertainty (u) results in an interpolating spline representing the distinctive path a user's eyes took as they observed the scene 400. This path between the gaze targets represents a glyph that can be used as the gaze-based password. The gaze-based password 410 can also be expanded as described with reference to FIG. 2. In some examples, the gaze-based password 410 can be represented as an area or bounded region within the scene 400. Alternatively, in some examples, the gaze based password may be represented as a matrix of row and column entries. In that case, the gaze-based password of FIG. 4 can be represented as (row 1, column 2), (row 2, column 3), (row 3, column 1), and (row 4, column 2). Once established, the gaze-based password 410 may be used to authenticate the user to access the resource.

Figure 5:
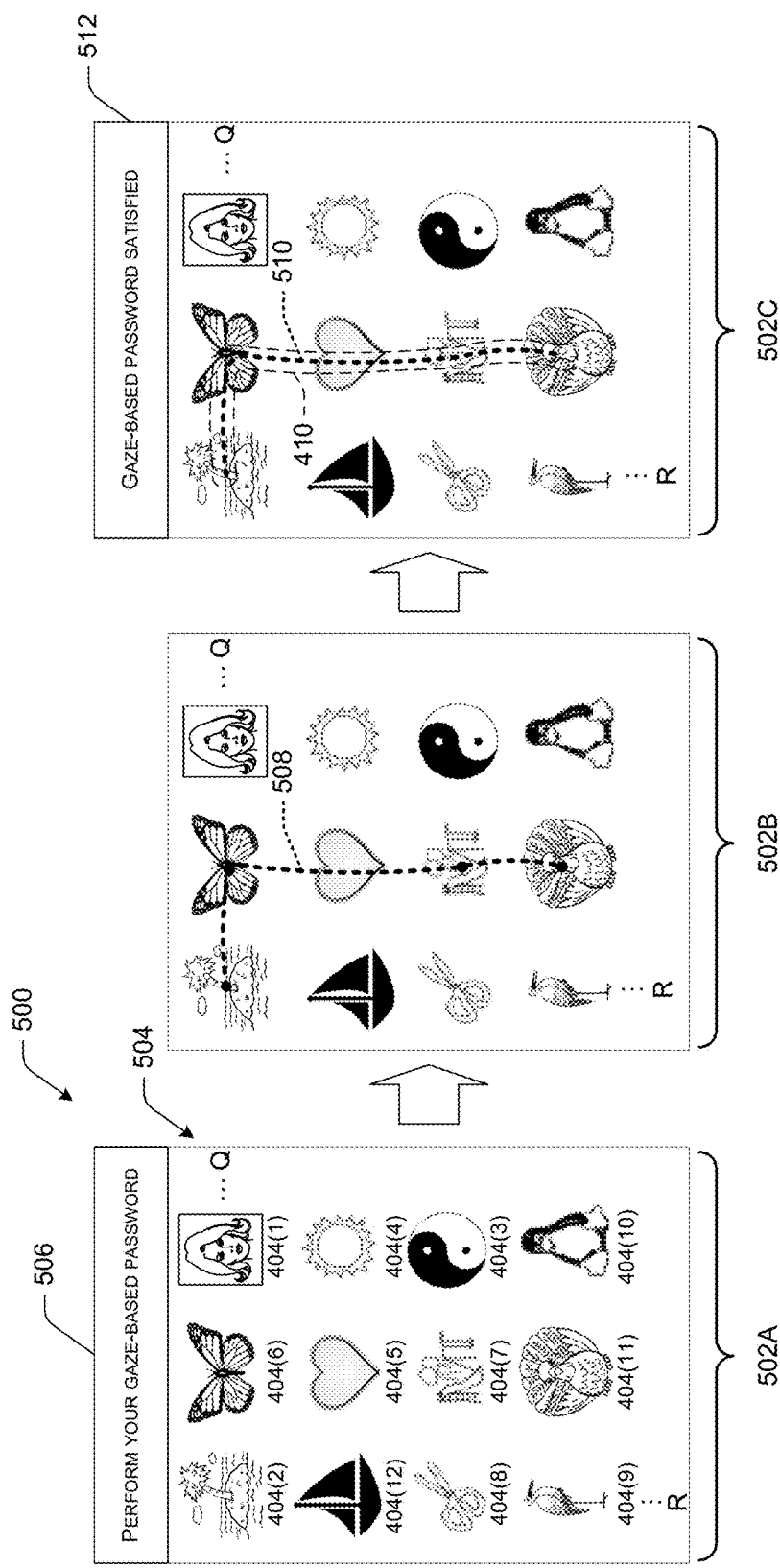
FIG. 5 illustrates an example process of authenticating a user to access a computing resource using a gaze-based password using the scene of FIG. 4.

FIG. 5 illustrates an example process of authenticating a user to access a computing resource using a gaze-based password with the scene 400. Continuing the example from FIG. 4, when the user next attempts to access the resource, as shown at 502A, the user may be presented with an authentication interface 500 including an authentication scene 504. In some examples, the authentication scene 504 may be the same as the scene 400 used to establish the gaze-based password. However, in the illustrated example, the authentication scene 504 is different than the scene 400 used to establish the gaze-based password. In this example, the authentication scene 502 includes the images 404(1)-404(12) from scene 400, but they are rearranged (e.g., randomly) into different rows and columns. Additionally, in other examples, the authentication scene 502 may include at least some images that are different than those in the scene 400 used to establish the password. For instance, authentication scene 502 may include the images from the scene 400 that correspond to the gaze targets that form the gaze-based password (i.e., salient images) but some or all of the other images from scene 400 (i.e., those that don't correspond to gaze targets) may be replaced in authentication scene 502 with other filler images that do not form part of the gaze-based password. The authentication interface 500 may include a prompt 506 instructing the user to perform their gaze-based password.

As shown at 502B, the user's gaze may be tracked while the user is viewing the authentication scene 502 to obtain login gaze tracking data. The login gaze tracking data is represented in FIG. 5 by login path 508. While visual feedback is not shown in this figure, in some examples feedback showing the user's gaze on the display (or audible or haptic feedback) may be provided to the user during the authentication phase.

As discussed above, the authentication interface 502 includes multiple salient images that are part of the gaze-based password (e.g., 404(2), 404(6), 404(7), and 404(11)), and multiple filler images that are not part of the gaze-based password (e.g., 404(1), 404(3), 404(4), 404(5), 404(8), 404(9), 404(10), and 404(12)). And, in other examples, authentication scenes may additionally or alternatively include other filler images interspersed with the salient images. In some examples, the authentication phase may comprise multiple passes to collect the login gaze tracking data. For example, obtaining the login gaze tracking data may include performing a first scan while the user locates salient images from among in the tiled arrangement, followed by a second scan while the user intentionally gazes at the multiple gaze targets.

In the example of FIG. 5, since the authentication scene 502 is different than the scene 400 used to establish the gaze-based password 410, the gaze-based password 410 can be adjusted to fit the authentication scene 502. For instance, the gaze-based password 410 may be adjusted by re-addressing the coordinates of the gaze targets 406(A)-406(D) to the corresponding coordinates at which the respective images corresponding to the gaze targets 406(A)-406(D) are shown in the authentication scene 502 to generated an adjusted gaze-based password 510. The login gaze tracking data is then compared to the adjusted gaze-based password 510 using any of the techniques described with reference to FIG. 2 to determine if the login gaze tracking data (represented by login path 508) satisfies the adjusted gaze-based password 510. Additionally or alternatively, in the context of FIG. 5, in some examples, it may be sufficient to satisfy the adjusted gaze-based password 510 if the login path 508 passes through at least a portion of each of the images 404 corresponding to the gaze targets 406. In other words, the adjusted gaze-based password 510 may be expanded to have a width approximately equal to the images corresponding to the gaze targets 406.

If the login gaze tracking data satisfies the gaze-based password, the user may be authenticated to access the computing resource. In some examples, the authentication interface 500 may present a message 512 indicating to the user that the password was satisfied or that the authentication was successful.

The gaze-based password may be updated based on the login gaze tracking data to adjust (e.g., expand or contract) the margin for execution error (m) and/or to adjust the locations of one or more gaze targets to account for slight changes in the user's gaze over time, generally as described with reference to FIG. 3.

Figure 6:
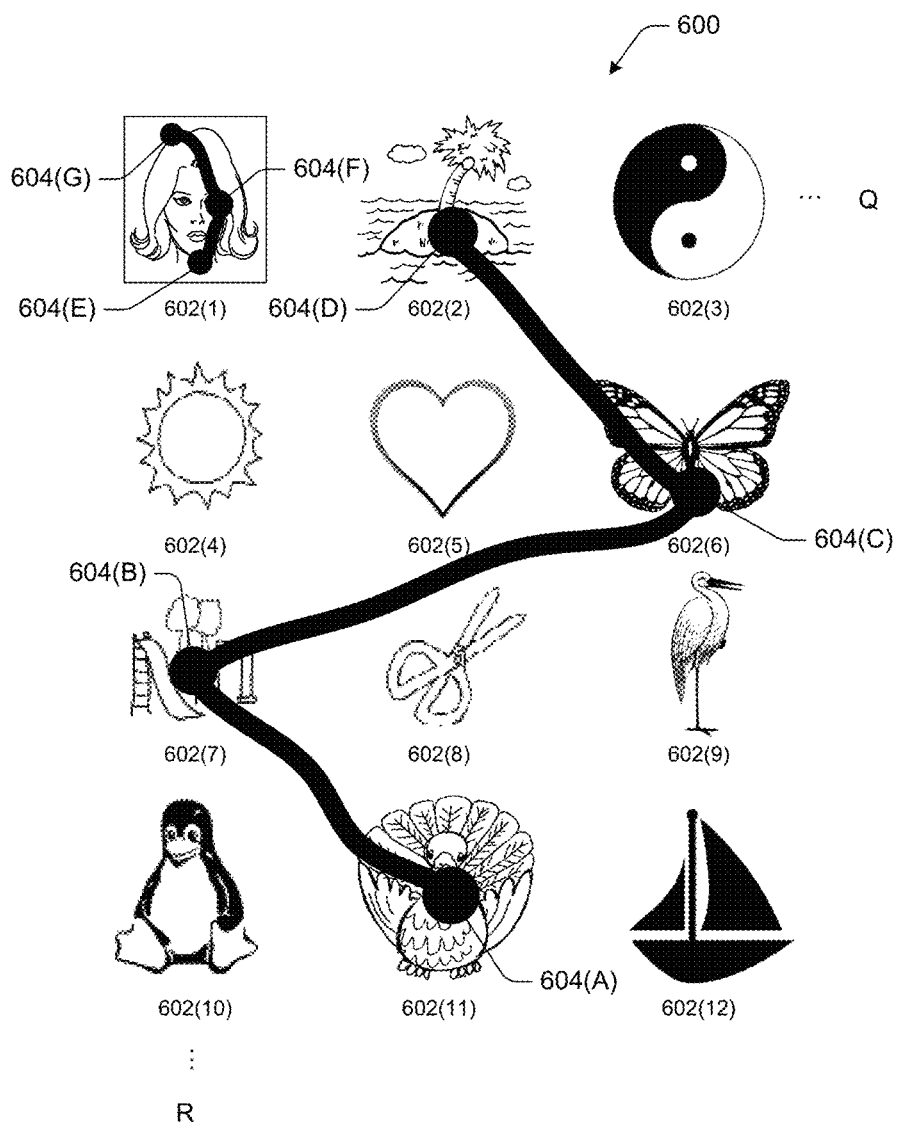
FIG. 6 illustrates another example process of establishing a gaze-based password using a scene comprised of multiple tiled images, which the password includes elements spanning multiple tiled images and elements within an individual image.

FIG. 6 illustrates another example of gaze-based password authentication employing a scene 600 having multiple tiled images 602. The example of FIG. 6 is similar to that described with reference to FIGS. 4 and 5, except that in this case, the gaze-based password includes multiple different levels of granularity or resolution of gaze tracking. That is, the gaze-based password includes a coarse level of granularity which includes gaze targets 604(A), 604(B), 604(C), and 604(D) that span multiple different images 602(2), 602(6), 602(7), and 602(11) of the scene 600, and a fine level of granularity which includes multiple gaze targets 604(E), 604(F), 604(G) corresponding to multiple objects (e.g., hair, eye, chin in this example) or locations within a particular image 602(1) of the tiled images. The coarse and fine levels of the gaze-based password be sequential (e.g., coarse then fine or vice versa), or they may be interspersed (e.g., one or more coarse gaze targets, followed multiple fine gaze targets within an image, followed by one or more additional coarse gaze targets). In the illustrated example, the coarse and fine portions of the gaze-based password are discontinuous, with no path connecting the coarse gaze targets 604(A), 604(B), 604(C), and 604(D) and the fine gaze targets 604(E), 604(F), 604(G). However, in other examples, a gaze path may connect one or more of the coarse gaze targets with one or more of the fine gaze targets.

In the illustrated example, the coarse and fine portions of the gaze-based password are both shown within the scene 600 including the multiple tiled images 602, and both the coarse and fine portions of the gaze-based password may be performed while viewing the scene 600. However, in other examples, upon completing the coarse portion of the gaze-based password, the image 602(1) may be enlarged for completion of the fine portion of the gaze-based password. In that case, the image 602(1) may be overlaid on top of the scene 600, or may replace the scene 600 entirely.

Unless otherwise indicated, the processes of establishing a gaze-based password and authenticating a user to a resource using the scene 600 are the same or similar to the techniques described with respect to FIGS. 2-5.

Figure 7:
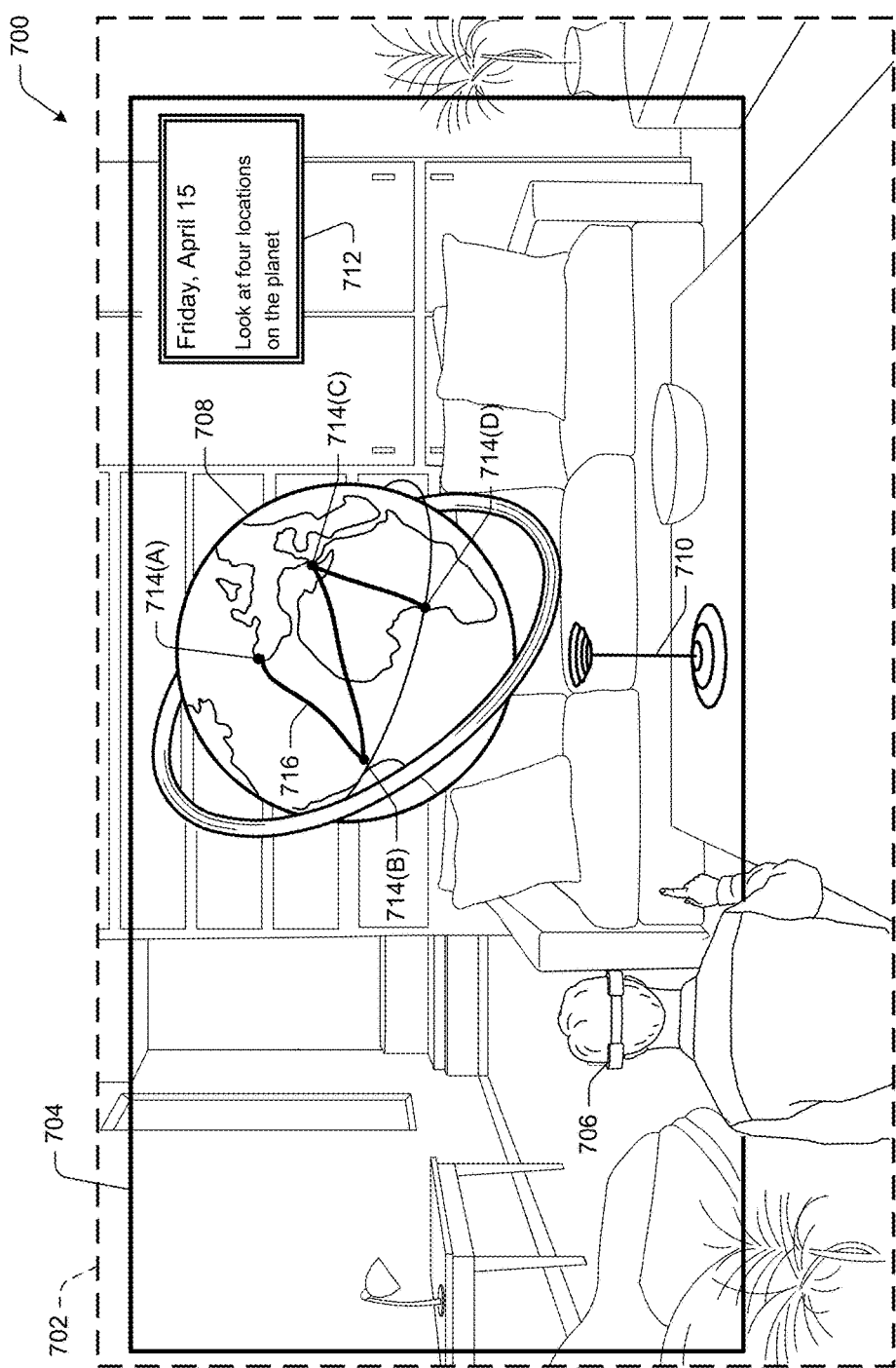
FIG. 7 illustrates an example process of establishing a gaze-based password using a mixed reality scene.

FIG. 7 illustrates an example process of establishing a gaze-based password using a mixed reality scene 700. The mixed reality scene 700 includes the user's real-world surroundings 702 (represented by the dashed line box), which are augmented by or overlaid with a computer generated scene 704 (represented by the heavy line weight box). The heavy line weight box of the computer generated scene 704 in this example represents a field of view of a holographic display of a head mounted computing device 706 worn by the user.

Unlike the previous examples, the scene 700 is partially composed of the user's real-world surroundings 702. The computer generated scene 704 that is used to augment the user's real-world surroundings 702 may be selected to use for the gaze-based authentication. In some examples, the computer generated scene 704 may include virtual objects or models that are uploaded by the user or are designated by the user from a repository of objects or models that are available to the computing device (e.g., an online model library, virtual world, game, etc.) to use for the gaze-based authentication. In some examples, a computing device associated with the resource to be accessed may select the computer generated scene 704 to be used for the gaze-based authentication, or may present the user with multiple computer generated scenes from which the user can select the computer generated scene 704 to be used for the gaze-based authentication. In this example, the computer generated scene 704 comprises includes multiple three-dimensional virtual objects, including a planet 708, a candle holder 710, and an information pane 712. The three-dimensional virtual objects are disposed at various locations throughout the computer generated scene 704 such that they appear to the user to be within the user's real-world surroundings 702. As the user moves in the real-world surroundings 702, the computer generated scene 704 may be rendered so that the virtual objects appear to remain stationary relative to the real-world scene 702 such that the user's perspective of the virtual objects changes as it would if they were physical objects. In some examples, the virtual objects are interactive such that the user can move, rotate, or otherwise manipulate the virtual objects.

Figure 9:
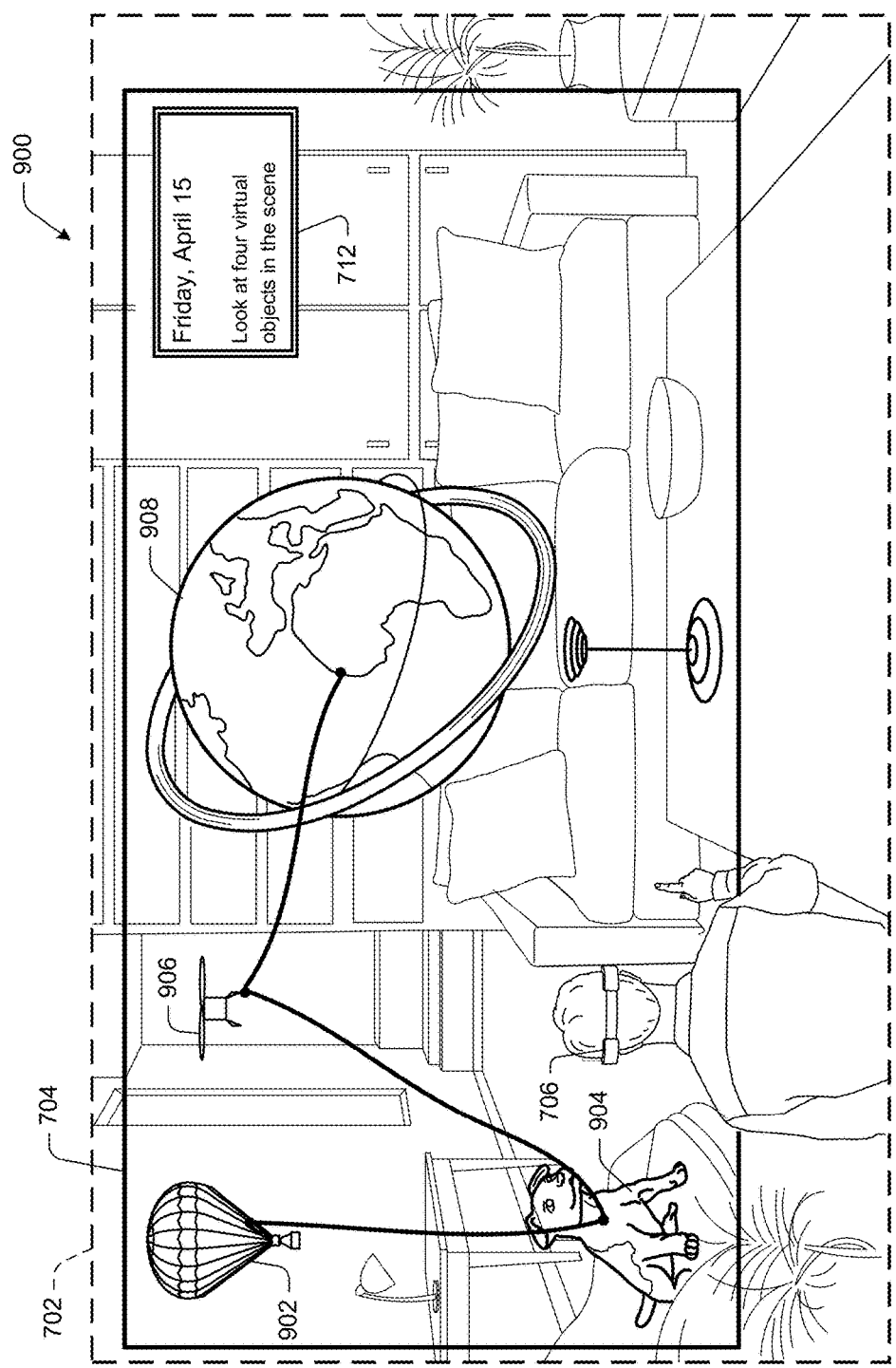
FIG. 9 illustrates another example process of establishing a gaze-based password using a mixed reality scene including a password that spans multiple virtual objects.
Figure 10:
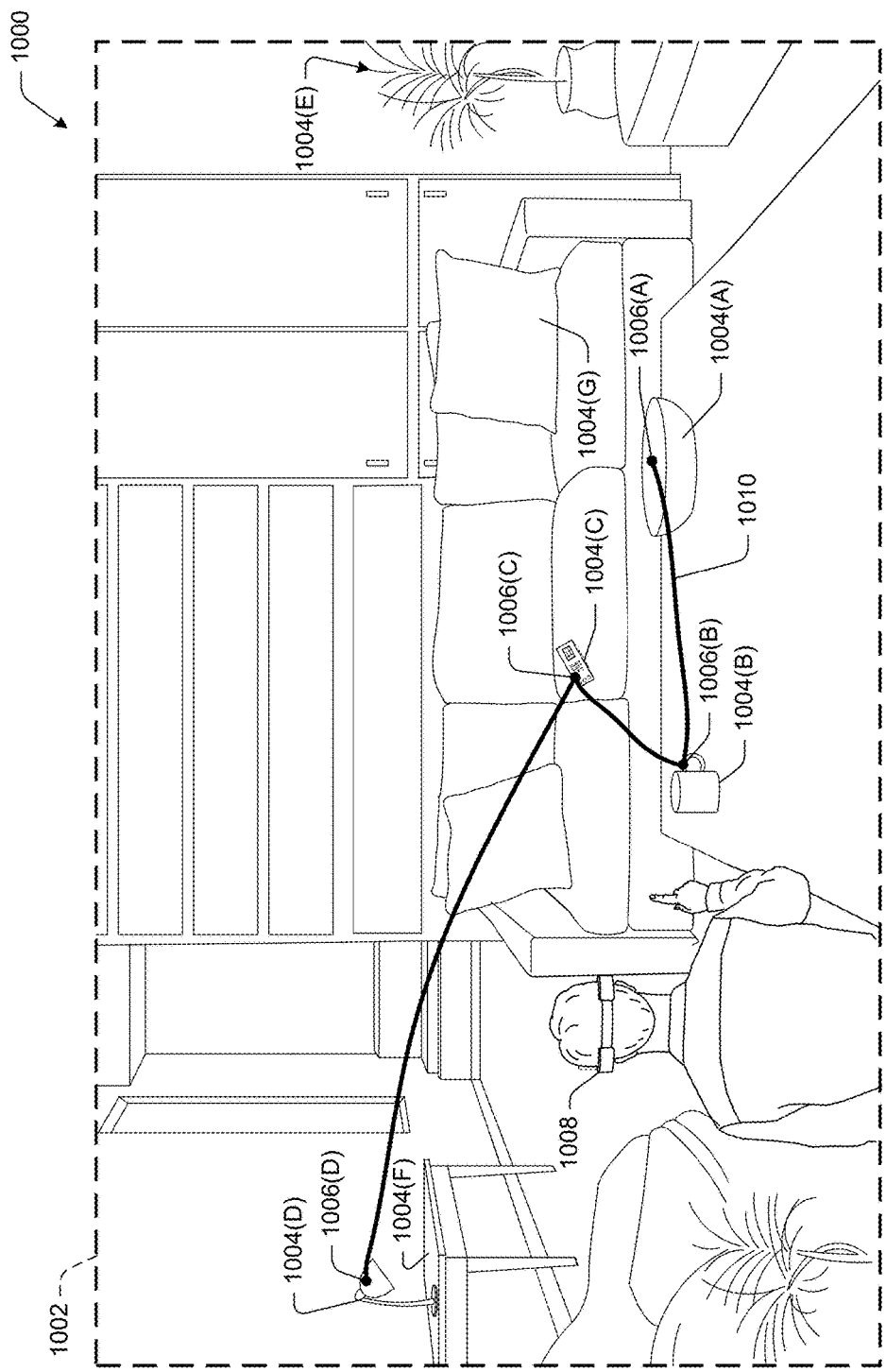
FIG. 10 illustrates an example process of establishing a gaze-based password using a real world scene.
Figure 11:
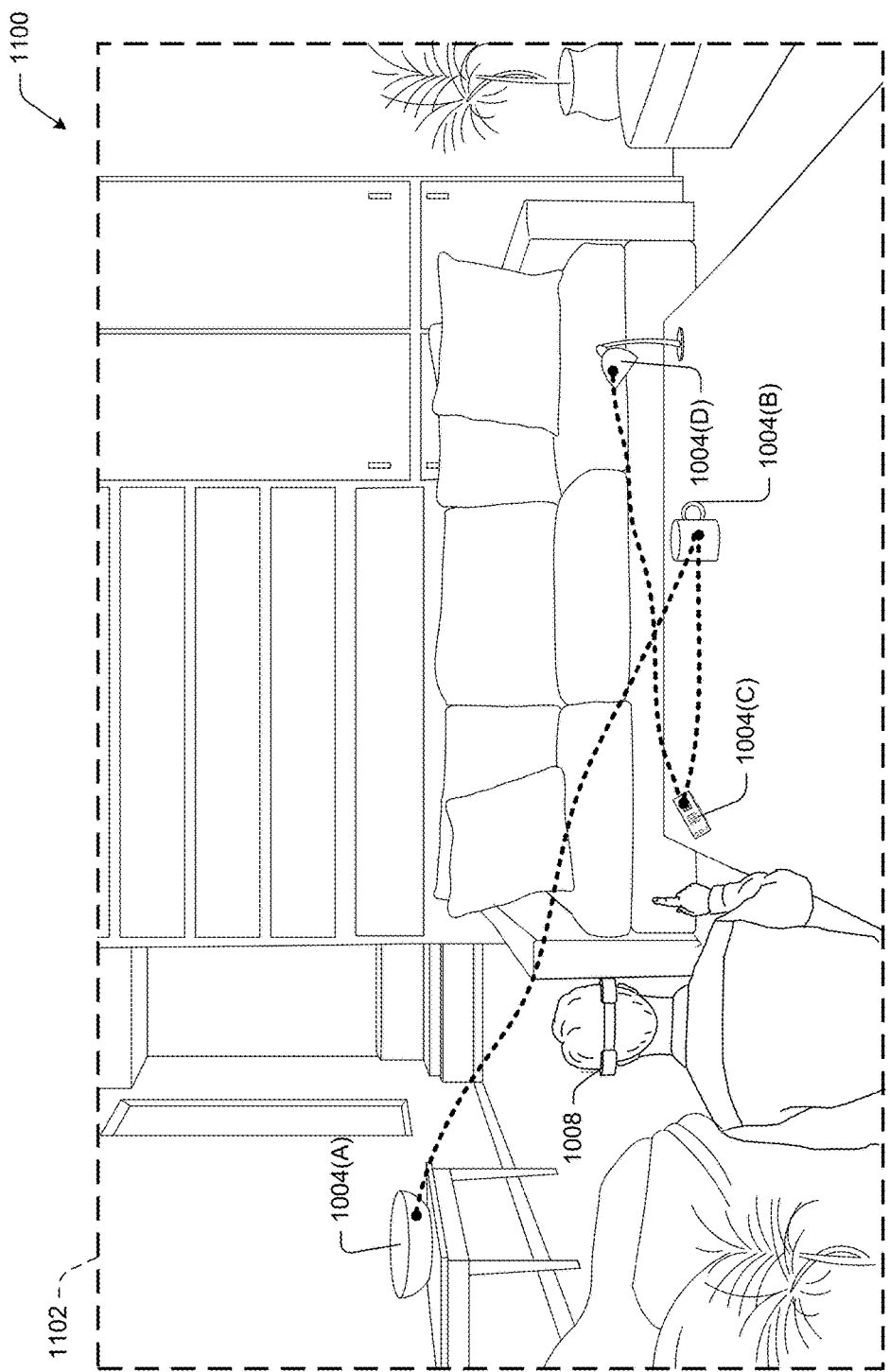
FIG. 11 illustrates an example process of authenticating a user to access a computing resource using a gaze-based password using the scene of FIG. 10.

When a user attempts to access a resource for a first time, the user may be prompted to set up a gaze-based password. In this example, the information pane 712 instructs the user to look at four locations on the planet 708 virtual object. However, in other examples the user may be instructed to look at a different number of locations. As the user looks at the specified number of things in the scene 400, the things at which the user looks are established as gaze targets 714(A)-714(D)(collectively "gaze targets 714"). The gaze targets 714 in this example correspond to locations on a specific virtual object (in this case on a surface of the planet 708 virtual object). However, in other examples, the gaze targets 714 may correspond to locations of multiple virtual objects in the computer generated scene 704 (as shown in FIG. 9), real objects in the real-world surroundings 702 (as shown in FIGS. 10 and 11), or both virtual objects and real objects.

As the user looks at the scene 700, a gaze tracking camera or other sensor of the head-mounted computing device 706 may be used to capture the user's gaze to generate gaze tracking data corresponding to gaze of the user while the user identifies the gaze targets 714. The multiple gaze targets 714A, 714B, 714C, and 714D may then be identified from the gaze tracking data captured by the gaze tracking camera. For example, the gaze targets 714 can be identified by, for example, determining locations within the scene 700 at which the user looked for more than the threshold length of time (e.g., greater than 1 second). Additionally or alternatively, in some examples, gaze targets 714 may be established by the user gesturing to point at or "touch" the gaze targets 714 on the virtual object.

As described with reference to FIG. 2 above, the computing device may in some instance provide feedback to the user (e.g., visual, audio, haptic/tactile, etc.) to indicate when the user has successfully identified each gaze target. The feedback may include any of the types feedback described throughout the application. In some examples, in addition to or instead of the gaze targets 714, a path 716 of the user's gaze may be captured by the gaze tracking camera or other sensors. As described with reference to FIG. 2, the gaze tracking data includes some measurement uncertainty (u) due to inherent inaccuracy in measurements of the user's intentional gaze targeting. The size of the gaze targets 714 and the cross-sectional area of the gaze path 716 represents this measurement uncertainty (u).

After identifying the gaze targets 714 and/or path 716, in some examples, the user may be prompted to repeat the identification of the gaze targets one or more times to confirm the gaze-based password and/or to compute an acceptable range or margin of execution error for the gaze-based password. Based on the repetition of the password, a margin for execution error (m) may be established using one or more of the techniques described with reference to FIG. 2.

A gaze-based password 714 may be established based on the gaze targets 714 and/or the gaze path 716, and may take into account measurement uncertainty (u) and/or a margin for execution error (m). In that case, the gaze-based password 714 is defined by locations of the gaze targets 714 in three space relative to an origin or frame of reference (e.g., the gaze tracking camera of the head-mounted computing device). For instance, each discreet observation of the user's gaze may be defined as a coordinate location (x,y,z) with some uncertainty (u) value representing inherent inaccuracy in measurements of the user's intentional gaze targeting. A number (n) of gaze targets 406 can be represented as the sequence (x1, y1, z1, u1), (x2, y2, Z2, u2), (x3, y3, z3, u3), . . . (xn, yn, zn, un). Connecting the gaze targets 714 with the path 716 having a cross-sectional stroke area equivalent to the uncertainty (u) results in an interpolating spline representing the distinctive path a user's eyes took as they observed the scene 700. This path between the gaze targets represents a three dimensional glyph that can be used as the gaze-based password. The gaze-based password can also be expanded (e.g., the cross-sectional stroke area can be expanded) as described with reference to FIG. 2. In some examples, the gaze-based password can be represented as a virtual volume or bounded region within the scene 700. Alternatively, in some examples, the gaze based password may be represented as a matrix of vectors. Once established, the gaze-based password may be used to authenticate the user to access the resource.

Figure 8:
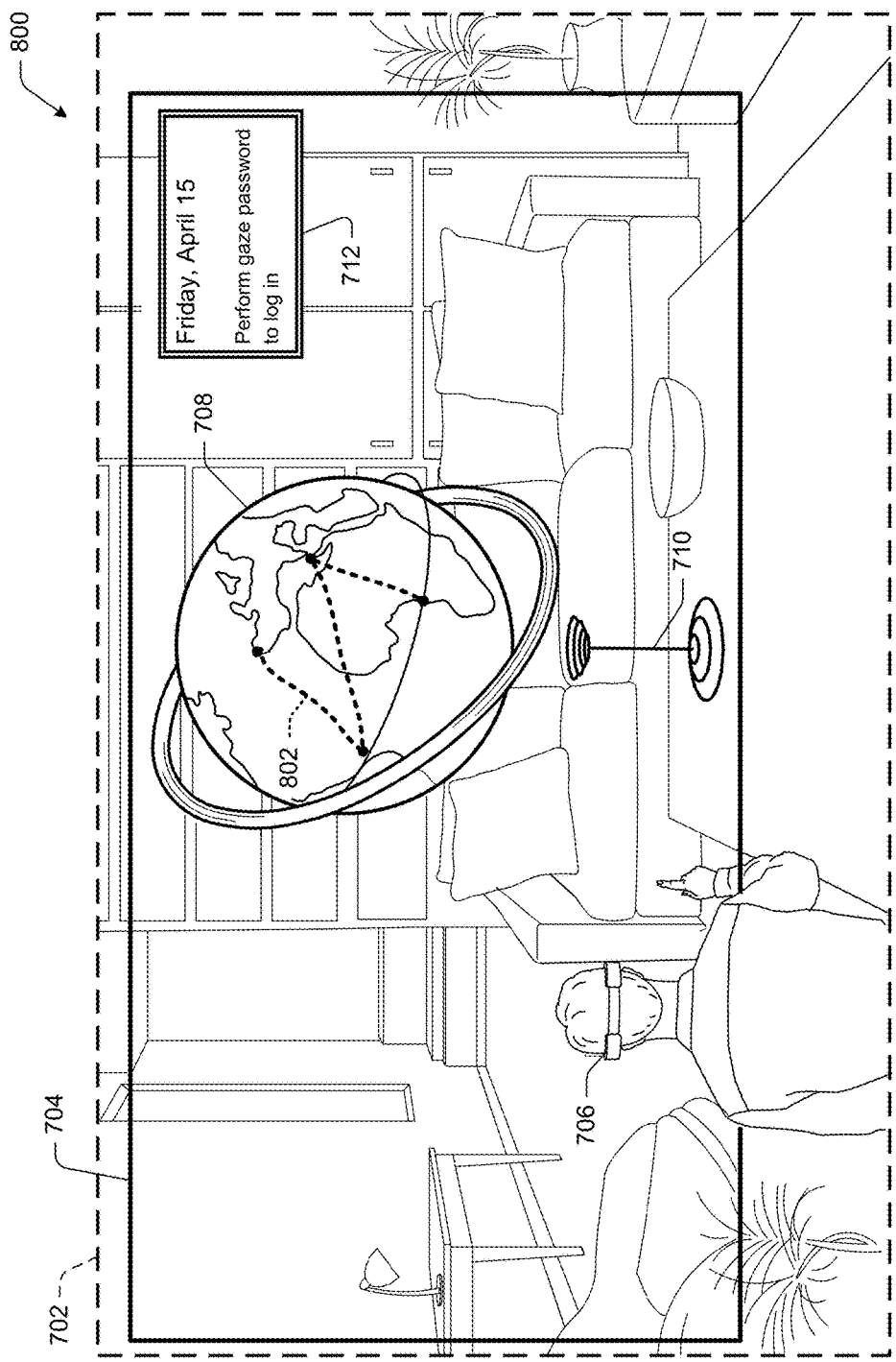
FIG. 8 illustrates an example process of authenticating a user to access a computing resource using a gaze-based password using the scene of FIG. 7.

FIG. 8 illustrates an example process of authenticating a user to access a computing resource using a gaze-based password. Continuing the example from FIG. 7, when the user next attempts to access the resource, the user may be presented with an authentication interface including a scene 800. In this example, the scene 800 includes the same real-world surroundings 702 and computer generated scene 704 as used in the gaze-based password establishment phase. However, in other examples, the user may access the resource in other real-world surroundings (e.g., in a different room or building), or from a different location within the real-world surroundings. Additionally or alternatively, the computer generated scene may be altered during the authentication phase relative to password establishment phase to show the virtual objects in different locations and/or orientations relative to each other and/or the user. In some examples, the gaze-based password may be location and/or orientation specific (meaning that the locations and/or orientations of the objects form part of the password). In that case, the user must first manipulate the objects to put them in the proper locations (i.e., the locations at which they were positioned during the password establishment phase) before performing the gaze-based password. In other examples, the gaze-based password may be location and/or orientation agnostic (meaning that the locations and/or orientations of the objects do not form part of the password). In that case, the user may perform the gaze-based password by gazing at the things corresponding to the gaze targets without regard to the locations or orientations of the things.

The information pane 712 may include a prompt instructing the user to perform their gaze-based password. The user's gaze may be tracked while the user is viewing the scene to obtain login gaze tracking data. The login gaze tracking data is represented in FIG. 8 by login path 802. While visual feedback is not shown in this figure, in some examples feedback showing the user's gaze on the display (or audible or haptic feedback) may be provided to the user during the authentication phase. The login gaze tracking data is then compared to the gaze-based password to determine if the login gaze tracking data satisfies the gaze-based password. This comparison may be performed using any of the techniques described for the preceding examples, the only difference being that the comparison of the login path 802 and the gaze-based password is made with respect to three dimensions rather than two.

FIG. 9 illustrates example gaze-based password techniques using a mixed reality scene 900. The example of FIG. 9 is similar to the example of FIGS. 7 and 8, except that the scene 900 includes multiple three-dimensional virtual objects and the user selects the objects that form part of the gaze-based password. That is, the gaze-based password in this example spans multiple virtual objects, namely virtual objects 902, 904, 906, and 908, instead of being comprised of multiple locations within or on a single virtual object as shown in FIGS. 7 and 8. In some examples, a gaze-based password may include gaze targets multiple levels of granularity, similar to the example of FIG. 6, but in a three-dimensional mixed reality environment. In that case, a gaze-based password may include a portion of the password having a coarse granularity in which gaze targets correspond to multiple virtual objects (e.g., as shown in FIG. 9) and a portion of the password having a fine granularity in which multiple gaze targets correspond to locations in or on a particular virtual object (e.g., as shown in FIGS. 7 and 8). In the example of FIG. 9, the gaze-based password may be established with the virtual objects 902, 904, 906, and 908 located in first positions within the scene 900, while the objects may be repositioned in different locations and/or orientations in the scene (or relative to each other or the gaze tracking camera) during the authentication phase. As discussed above, the gaze-based password may be location and/or orientation specific or may be agnostic to the location and/or orientation of the locations of the objects corresponding to the gaze targets.

FIG. 10 illustrates an example of establishing a gaze-based password in which real word objects define the gaze-based password. In this example, a scene 1000 comprises the user's real-world surroundings 1002 (shown generally by the dashed line box). In other examples, the scene 1000 may be augmented with computer generated graphics, which may or may not form part of the gaze-based password. In the example of FIG. 10, the scene 1000 includes multiple physical, real-world objects 1004(A)-1004(G).

When a user attempts to access a resource for a first time, the user may be prompted (e.g., audibly or via a computer generated prompt overlaid on the real-world surroundings 1002) to set up a gaze-based password. For example, the user may be prompted to look at a specified number (e.g., three, four, five, ten, etc.) of things (e.g., locations or objects) in the scene 1000. As the user looks at the specified number of things in the scene 1000, the things at which the user looks are established as gaze targets 1006(A)-1006(D)(collectively "gaze targets 1006"). The gaze targets 1006 in this example correspond to physical, real-world objects 1004(A), 1004(B), 1004(C), and 1004(D) chosen by the user. Other physical objects in the scene (e.g., 1004E, 1004(F), and 1004(G) among others) are not selected by the user as gaze targets. In other examples, one or more virtual objects augmenting the real-world surroundings 1002 may additionally or alternatively serve as gaze targets. That is, in some examples, a gaze-based password may be composed of a combination of real-world objects and virtual objects.

As the user looks at the scene 1000, a gaze tracking camera or other sensor of a head-mounted computing device 1008 may be used to capture the user's gaze to generate gaze tracking data corresponding to gaze of the user while the user identifies the gaze targets 1006. The head-mounted computing device 1008 of this example need not include a display, since this example does not include computer generated graphics to augment the real-world surroundings 1002. However, in other examples the, the head-mounted computing device 1008 may include a display on which to present computer generated graphics to augment the real-world surroundings 1002. In some examples, the login gaze tracking data additionally or alternatively includes information about the real-world objects 1004(A)-1004(D) corresponding to each of the gaze targets 1006(A)-1006(D). For instance, the information about the real-world objects in the real-world surroundings 1002 may include a two- or three-dimensional scan, model, or other identifier of the real-world objects. The information about the real-world objects may be obtained by an environmental camera, scanner, or other sensor of the head-mounted computing device 1006. The The multiple gaze targets 1006(A), 1006(B), 1006(C), and 1006(D) may then be identified from the gaze tracking data captured by the gaze tracking camera and stored along with the information about the real-world objects 1004(A)-1004(D) corresponding to each of the gaze targets 1006(A)-1006(D). For example, the gaze targets 1006 can be identified by, for example, determining locations within the scene 1000 at which the user looked for more than the threshold length of time (e.g., greater than 1 second). Additionally or alternatively, in some examples, gaze targets 1006 may be established by the user gesturing to or touching the locations or real-world objects corresponding to the gaze targets 1006.

As described with reference to FIG. 2 above, the computing device 1008 may in some instance provide feedback to the user (e.g., visual, audio, haptic/tactile, etc.) to indicate when the user has successfully identified each gaze target. The feedback may include any of the types feedback described throughout the application. In some examples, in addition to or instead of the gaze targets 1006, a path 1010 of the user's gaze may be captured by the gaze tracking camera or other sensors. As described with reference to FIG. 2, the gaze tracking data includes some measurement uncertainty (u) due to inherent inaccuracy in measurements of the user's intentional gaze targeting. The size of the gaze targets 1006 and the cross-sectional area of the gaze path 1010 represents this measurement uncertainty (u).

After identifying the gaze targets 1006, path 1010, and/or object information, in some examples, the user may be prompted to repeat the identification of the gaze targets one or more times to confirm the gaze-based password and/or to compute an acceptable range or margin of execution error for the gaze-based password. Based on the repetition of the password, a margin for execution error (m) may be established using one or more of the techniques described with reference to FIG. 2.

A gaze-based password may be established based on the gaze targets 1006, the gaze path 1010, and/or the object information, and may take into account measurement uncertainty (u) and/or a margin for execution error (m). In some examples, the gaze-based password may be established using the techniques described above with respect to FIGS. 7 and 8 or elsewhere in this disclosure. Additionally or alternatively, in some examples, the gaze-based password in this example may be based in whole or in part on the object information. In that case, objects in the real-world scene at which the user looks during login are compared with the object information corresponding to the gaze targets stored during the password establishment phase. The gaze-based password may require that the objects in the real-world scene at which the user looks during login be substantially the same (or within a threshold similarity) as the object information corresponding to the gaze targets stored during the password establishment phase. The comparison of the objects viewed during login to the object information stored during password establishment may be performed using any suitable object recognition/comparison technology. The gaze-based password in this example may be location and/or orientation specific (meaning that the locations and/or orientations of the real-world objects form part of the password), or it may be location and/or orientation agnostic (meaning that the locations and/or orientations of the objects do not form part of the password). The password may require that the objects be looked at in a specific order during authentication, or may be agnostic to the order in which the objects are viewed during authentication. Once established, the gaze-based password may be used to authenticate the user to access the resource.

FIG. 11 illustrates an example of authenticating a user to access a resource using a gaze-based password in which real word objects define the gaze-based password. FIG. 11 includes a scene 1100 including real-world surroundings 1102 of the user, which may or may not be the same as the real-world surroundings 1002 of the user when the gaze-based password was established. The user may seek to access a resource using the gaze-based password established according to FIG. 10. Moreover, even if the user is the same location at the time of authentication as when the password was established, the real-world objects upon which the gaze-based password is based may or may not be in the same locations relative to each other and/or relative to the user as they were during password establishment. In the example of FIG. 11, the real-world objects 1004(A)-1004(D) upon which the gaze-based password is based have been moved since the password establishment phase.

Upon receiving a request from the user to access a resource, the head-mounted computing device 1008 may obtain from the gaze-tracking camera login gaze tracking data representing gaze of the user during login. The login gaze tracking data is graphically represented in FIG. 11 by login gaze path 1104. The login gaze tracking data may be compared to the login gaze tracking data to the gaze-based password using any of the techniques described in this or any preceding section of the application. In the illustrated example, the gaze-based password is based on a comparison of objects in the real-world scene at which the user looks during login with the object information corresponding to the gaze targets stored during the password establishment phase. The gaze-based password in this example is location and orientation agnostic, such that the user may be authenticated by looking at the real-world objects 1004(A)-1004(D) corresponding to the gaze targets 1006(A)-1006(D), regardless of the objects' locations relative to each other and/or relative to the head-mounted computing device 1006. The password may require that the objects be looked at in a specific order during authentication (e.g., a same order that they were looked at during password establishment), or may be agnostic to the order in which the objects are viewed during authentication.

In some examples, the gaze-based password may also be location specific, such that the password requires the head-mounted computing device 1008 to be in the same location for authentication as during password establishment. This location requirement, when implemented, adds an additional level of security that prevents the head-mounted computing device 1008 from being used outside of the location required by the password. A determination of whether the head-mounted computing device 1008 is in the same location can be made based on global positioning system (GPS) data or other location data when available, and/or based on a comparison of the real-world surroundings 1102 during authentication to stored information about the real-world surroundings 1002 during password establishment.

Based on the comparison, it may be determined whether the login gaze tracking data satisfies the gaze-based password. And, if so, the user may be authenticated to access the resource.

Example Computing Devices

Figure 12:
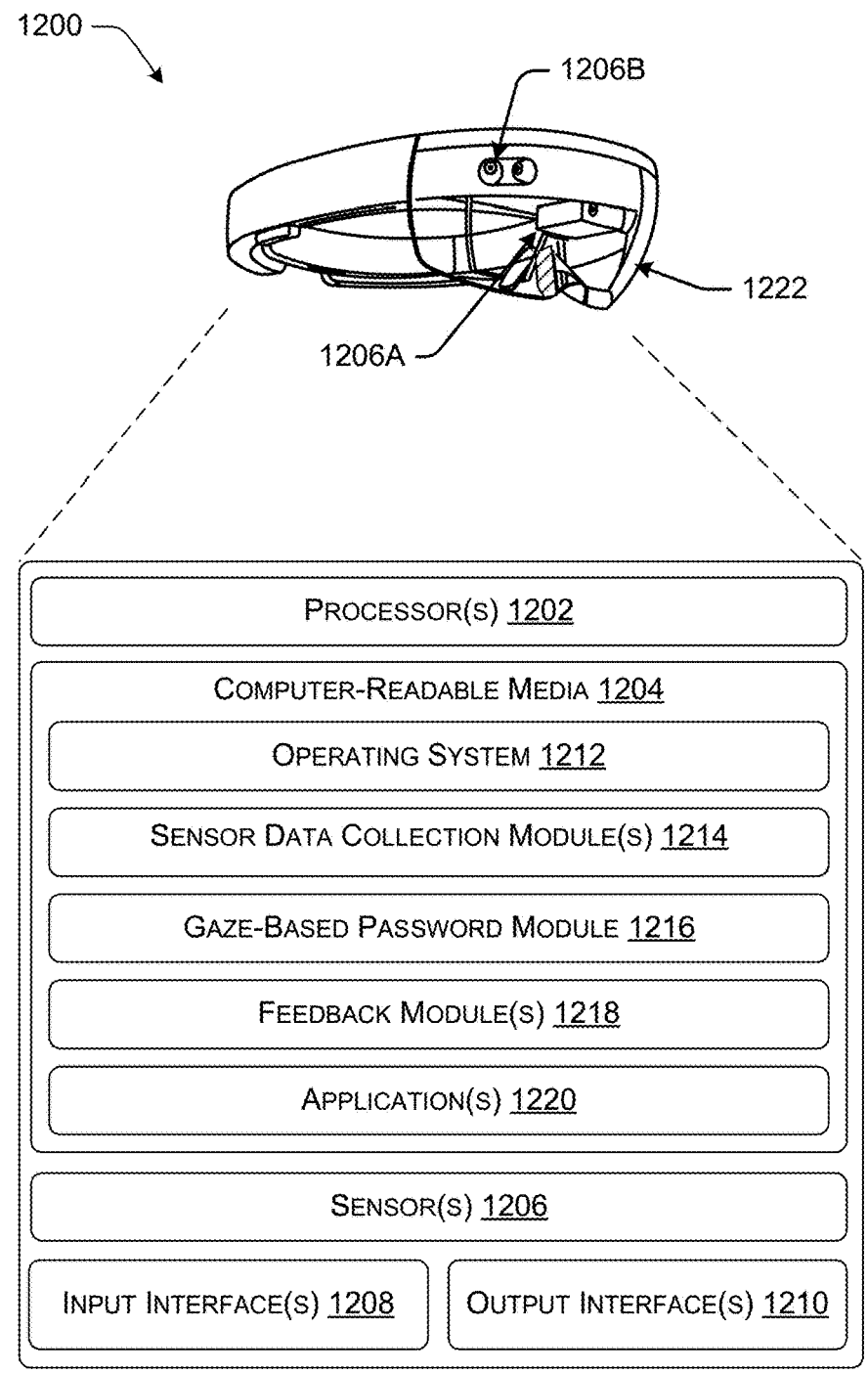
FIG. 12 illustrates details of an example head-mounted computing device that is usable to implement gaze-based authentication.

FIG. 12 illustrates details of an example computing device 1200 that can be used to implement the gaze-based password techniques described herein. The computing device 1200 may be representative of any of the computing devices 108 in FIG. 12. The computing device 1200 in this example includes processor(s) 1202, computer-readable media 1204, sensor(s) 1206, input interface(s) 1208, and output interfaces(s) 1210. In FIG. 12, device 1200 is illustrated as a head-mounted device. However, device 1200 can be any type of device configured capable of detecting gaze tracking of a user. This example is provided for illustrative purposes and is not to be construed as limiting. Additional details and example computing environments and computing devices are described below with reference to FIGS. 17-19.

Processor(s) 1202 can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-On-a-Chip systems (SOCs), Complex Programmable Logic Devices (CPLDs), etc. In various examples, the processor(s) 1202 can execute one or more instructions, modules, and/or processes to cause the device 1202 to perform a variety of functions, such as those described as being performed by computing devices herein. Additionally, each of the processor(s) 1202 can possess its own local memory, which also can store program modules, program data, and/or one or more operating systems. Additional details of example processors that can be used as processor(s) 1202 are described below with reference to FIGS. 17 and 19.

In at least one configuration, the computer-readable media 1204 of the device 1200 can store components that facilitate interaction between a user and the computing device 1200. For example, the computer-readable media 1204 can include an operating system 1212, sensor data collection module(s) 1214, a gaze-based password module 1216, feedback module 1218, and one or more applications 1220. The operating system 1212 can be configured to manage hardware and services within and coupled to the device 1200 for the benefit of other components and/or modules. The sensor data collection module(s) 1214 collect, store, and/or process sensor data collected from the sensor(s) 1206 of the computing device. The gaze-based password module 1216 includes program instructions to establish a gaze-based password for a user to access a resource and/or to authenticate the user to access the resource. Specifically, the gaze-based password module 1216 may be configured to establish a gaze-based password based on gaze tracking data and other inputs of the user and to store the gaze-based password in association with an account, computing device, or other resource. The gaze-based password may be stored locally, in memory of the computing device 1200, or remotely such as in memory of a service provider (e.g., service provider 102). The feedback module 1218 may be configured to generate and cause output of feedback to a user via a display, speaker, haptic device, or other output of the computing device 1200. By way of example and not limitation, the feedback module 1218 may generate and output feedback informing the user when the user has successfully selected a gaze target during establishment of a gaze-based password. Application(s) 1220 may correspond to any other applications stored in whole or in part on the computing device 1200. By way of example and not limitation, the applications 1220 may include gaming applications, file sharing applications, browser applications, search applications, productivity applications (e.g., word processing applications, spreadsheet applications, computer-aided design applications, etc.), communication applications (e.g., email, instant messaging, audio and/or video conferencing, social networking applications, etc.). The application(s) 1220 can be stored in the computer-readable media 1204 or otherwise accessible to the device 1200 (e.g., via a network, such as network 104). Additional details of example applications that can be representative of application(s) 1220 are described below with reference to FIGS. 17-19.

While FIG. 12 illustrates the gaze-based password module 1216 and the feedback module 1218 as being separate from the operating system 1212 and the application(s) 1220, in alternative examples, the gaze-based password module 1216 and/or the feedback module 1218 can be included in or integrated with the operating system 1212 and/or one or more of the applications 1220. In such examples, the operating system 1212 and/or application(s) 1220 having the integrated gaze-based password functionality can perform same or similar functionalities as described for the gaze-based password module 1216 and/or the feedback module 1218.

The modules can represent pieces of code executing on a computing device (e.g., device 102). In some examples, individual modules can include an interface, such as an Application Program Interface (API), to perform some or all of its functionality (e.g., operations). In additional and/or alternative examples, the components can be implemented as computer-readable instructions, data structures, and so forth that are executable by at least one processing unit (e.g., processor(s) 1202) to configure the device 1200 to perform operations including the gaze-based authentication techniques described herein. Functionality to perform these operations can be implemented by a single device or distributed across multiple devices. Additional details of an example distributed computing scenario are described with reference to FIG. 18. Additional details of example types of computer-readable media that can be used for computer-readable media 106 are provided below with reference to FIGS. 17-19.

In at least one example, the sensor(s) 1206 can be any device or combination of devices configured to sense conditions of a user or surroundings of the user. The sensor(s) 1206 include one or more user facing cameras 1206A or other sensors for tracking eye movement or gaze, facial expressions, pupil dilation and/or contraction, gestures, and/or other characteristics of the user. In some examples, the sensor(s) 1206 also include one or more outwardly facing or environmental cameras 1206B for capturing images of real-world objects and surroundings of the user. The sensor(s) 1206 may additionally or alternatively include one or more biometric sensors (e.g., a galvanic skin response sensor for measuring galvanic skin response, a heart rate monitor, a skin temperature sensor for measuring the temperature on the surface of the skin, an electroencephalography (EEG) device for measuring electrical activity of the brain, an electrocardiography (ECG or EKG) device for measuring electrical activity of the heart), one or more other cameras (e.g., web cameras, infrared cameras, depth cameras, etc.), microphones or other sound sensors for measuring a volume of speech, a rate of speech, etc., light sensors, optical scanners, or the like. Individual sensor(s) 1206 can output sensor data to corresponding sensor data collection module(s) 1214 for suitable processing. For instance, a user facing camera 1206A can capture gaze tracking data which may be processed by a corresponding sensor data collection module 1214 to determine one or more gaze targets and/or a gaze path of the user. The sensor data collection module 1214 may then output the gaze targets and/or gaze path to the gaze-based password module 1216 for use in establishing a gaze-based password for the user, or for authenticating the user.

In additional and/or alternative examples, the sensor(s) 1206 can be any device or combination of devices configured to detect a position or movement of the device 102 and other objects. For instance, the sensor(s) 1206 can additionally and/or alternatively include a depth map sensor, a light field sensor, a gyroscope, a sonar sensor, an infrared sensor, a compass, an accelerometer, a global positioning system (GPS) sensor, and/or any other device or component for detecting a position or movement of the device 1200 and/or other objects. The sensor(s) 1206 can also enable the generation of data characterizing interactions, such as user gestures, with the device 1200. For illustrative purposes, the sensor(s) 1206 and/or an input interface 1208 can enable the generation of data defining a position and aspects of movement, e.g., speed, direction, acceleration, of one or more objects, which can include device 1200, physical items near the device 1200, and/or users.

FIG. 12 shows an example in which at least some of the sensor(s) 1206 are part of, or built into, the device 1200. More specifically, FIG. 12 shows a non-limiting example where the device 1200 includes the user facing camera sensor 126(A) and an environmental camera (126(B) disposed in or integrated with a nose-bridge component of the head-mounted display 1200. As described above, each device 1200 can include any configuration of one or more sensors 1206 that can be part of, or built into, the device 1200. However, in some examples, one or more sensors 1206 can be removably coupled to the device 1200, or be separate from and communicatively coupled to the device 1200. In the latter case, sensor data can be communicated from the one or more sensors 1206 to the device 1200, for example, via a wired and/or wireless network, such as network 104.

As described above, the device 1200 can include the input interface(s) 1208 and output interface(s) 1210. By way of example and not limitation, the input interface(s) 1208 can include a keyboard, keypad, mouse, microphone, touch sensor, touch screen, joystick, control buttons, scrolling buttons, cameras, neural interface, or any other device suitable to generate a signal and/or data defining a user interaction with the device 1200. By way of example and not limitation, the output interface(s) 1210 can include a display (e.g., holographic display, head-up display, protector, touch screen, liquid crystal display (LCD), etc.), speakers, haptic interfaces, or the like.

In at least one example, an output interface 1210 can be a hardware display surface 1222 that can be configured to allow for a real-world view of an object through the hardware display surface 1222 while also providing a rendered display of computer generated content or scenes. The hardware display surface 1222 can include one or more components, such as a projector, screen, or other suitable components for producing a display of an object and/or data. In some configurations, the hardware display surface 1222 can be configured to cover at least one eye of a user. In one illustrative example, the hardware display surface 1222 can include a screen configured to cover both eyes of a user. The hardware display surface 1222 can render or cause the display of one or more images for generating a view or a stereoscopic image of one or more computer generated virtual objects. For illustrative purposes, an object can be an item, data, device, person, place, or any type of entity. In at least one example, an object can be associated with a function or a feature associated with an application. As will be described in more detail below, some configurations enable a device 1200 to graphically associate holographic user interfaces and other graphical elements with an object seen through the hardware display surface 1222 or rendered objects displayed on the hardware display surface 1222.

The hardware display surface 1222 can be configured to allow a user to view objects from different environments. In some configurations, the hardware display surface 1222 can display a rendering of a computer generated virtual object. In addition, some configurations of the hardware display surface 1222 can allow a user to see through selectable sections of the hardware display surface 1222 having a controllable level of transparency, enabling the user to view objects in his or her surrounding environment. For illustrative purposes, a user's perspective looking at objects through the hardware display surface 1222 is referred to herein as a "real-world view" of an object or a "real-world view of a physical object." As will be described in more detail below, computer generated renderings of objects and/or data can be displayed in, around, or near the selected portions of the hardware display surface 1222 enabling a user to view the computer generated renderings along with real-world views of objects observed through the selected portions of the hardware display surface 1222.

Some configurations described herein provide both a "see through display" and an "augmented reality display." For illustrative purposes, the "see through display" can include a transparent lens that can have content displayed on it. The "augmented reality display" can include an opaque display that is configured to display content over a rendering of an image, which can be from any source, such as a video feed from a camera used to capture images of an environment. For illustrative purposes, some examples described herein describe a display of rendered content over a display of an image. In addition, some examples described herein describe techniques that display rendered content over a "see through display" enabling a user to see a real-world view of an object with the content. It can be appreciated that the examples of the techniques described herein can apply to a "see through display," an "augmented reality display," or variations and combinations thereof. For illustrative purposes, devices configured to enable a "see through display," "augmented reality display," or combinations thereof are referred to herein as devices that are capable of providing a "mixed environment" or "mixed reality scene."

Additional details associated with the hardware display surface 1222 are described below with reference to FIGS. 13A-13C, 14A-14F, 15A-15F. Additional details associated with the input interface(s) 1208 and/or the output interface(s) 1210 are described below with reference to FIGS. 17 and 19.

Example Gaze Tracking

Figure 13A:
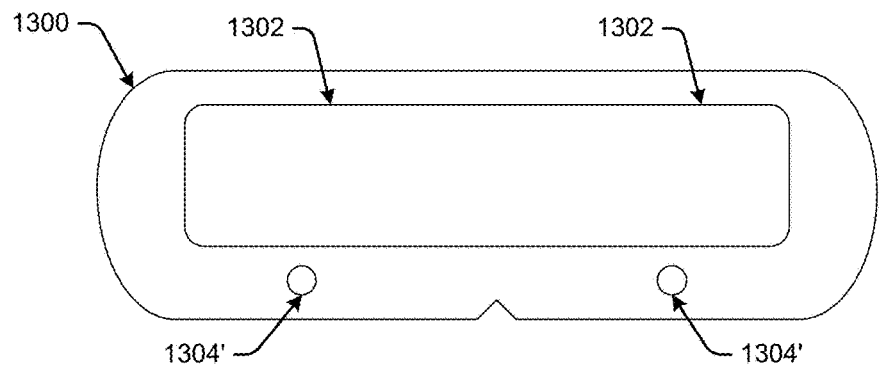
FIG. 13A-FIG. 13C illustrate example details of identifying gaze targets by tracking a gaze of a user.

Referring now to FIGS. 13A-13C, 14A-14F, 15A-15F, and 16 the following section describes techniques for identifying a gaze target, such as described in the preceding examples (e.g., gaze targets 204, 406, 604, 714, 106, etc.). The techniques are described in the context of a head-mounted computing device having a user facing gaze tracking camera. However, the techniques described in this section can also be applied to other types of computing devices having a user facing camera for gaze tracking (e.g., computer with a web camera 108B, a tablet or smartphone with user-facing camera 108C, a game console with user facing camera 108D, etc.). FIG. 13A is back view of a device 1300 (e.g., device 108, device 1200, etc.) having a hardware display surface 1302 (e.g., hardware display surface 1222) and one or more sensors 1304 and 1304' (such as cameras 1206B and 1206A, respectively, of computing device 1200). To facilitate functionality described herein, in at least one example, sensor(s) 1304' are user facing (such as user facing camera 1206A) and can be configured to track the position of at least one eye of a user. In addition, at least one other sensor 1304 is environment facing (such as environmental camera 1206B) and can be directed toward a real-world object for generating image data of the real-world object. As will be described in more detail below, examples can process eye position data, image data, and other data to identify a gaze target that is a rendered object displayed on a hardware display surface 1302 or a real-world object viewed through a transparent section of the hardware display surface 1302. As will also be described below, examples described herein can also determine if the user is looking at a particular section of a hardware display surface 1302, a particular part of a real-world object, or a particular part of a rendered object. Such information can be useful for determining gaze targets from gaze tracking data to establish a gaze-based password and/or during authentication for determining whether a user's login gaze tracking data satisfies a gaze-based password.

In FIG. 13A, the device 1300 comprises two of the user facing sensors 1304' for generating data or a signal indicating the position or movement of at least one eye of a user. The sensors 1304' can be in the form of a camera or another suitable device for tracking the position or movement of at least one eye of the user. The device 1300 also comprises at least one hardware display surface 1302 (such as hardware display 1222 of computing device 1200, or a display screen associated with one of computing devices 108B, 108C, or 108D, for example) for allowing a user to view one or more objects. The hardware display surface 1302 can provide a view of a real-world object through the hardware display surface 1302 as well as images of rendered objects that can be displayed on the hardware display surface 1302, as described above.

Figure 13B:
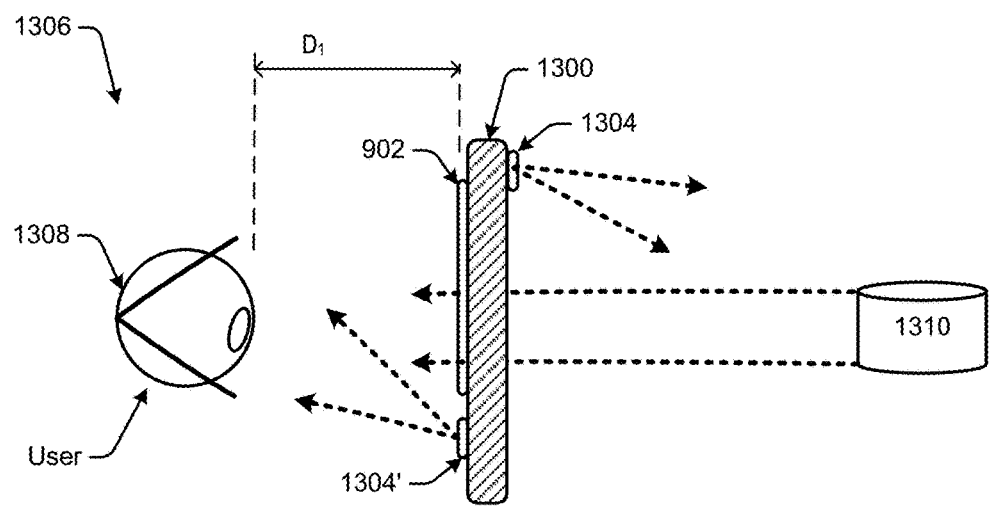

FIG. 13B is a side cutaway view 1306 of the device 1300 shown in FIG. 13A. FIG. 13B includes an eye 1308 of a user looking through the hardware display surface 1302. The hardware display surface 1302 is configured to create transparent sections enabling a user to view objects through the hardware display surface 1302. FIG. 13B shows an example arrangement where a real-world object 1310 is aligned with a transparent section of the hardware display surface 1302 allowing the user to view the real-world object 1310 through the hardware display surface 1302. The hardware display surface 1302 can display one or more rendered objects. The device 102 also comprises at least one sensor 1304' directed toward at least one eye 1308 of the user.

Figure 13C:
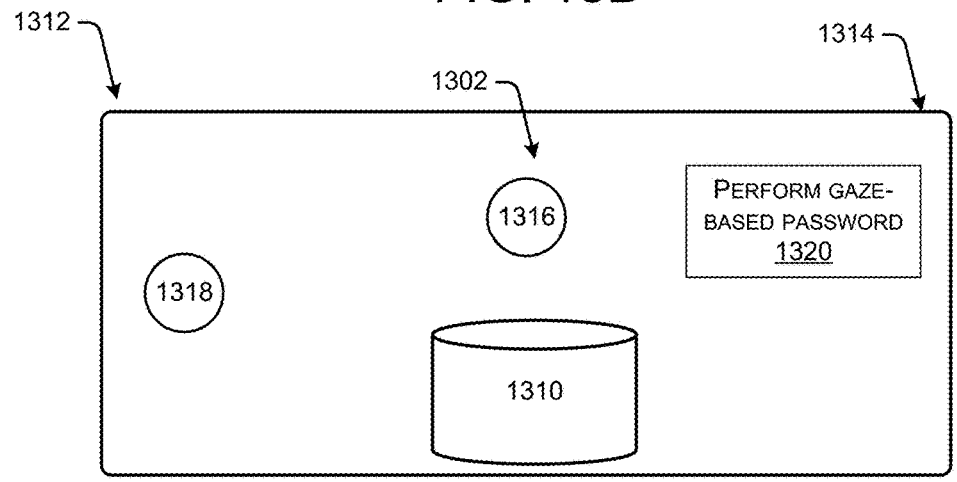

FIG. 13C illustrates an example scene or view 1312 that can be observed by a user via the hardware display surface 1302. The thick double line 1314 illustrates the boundary of the hardware display surface 1302. In this illustrative example, the scene or view 1312 includes a first rendered object 1316, a second rendered object 1318, and a third rendered object 1320 that are displayed on the hardware display surface 1302. The real-world object 1310 is viewed through the hardware display surface 1302.

In a non-limiting example described above, a user can be attempting to access a resource (e.g., resource(s) 118). For instance, in order to access the resource, the user may be asked to authenticate him or herself using a gaze-based password. The gaze-based password in this example includes gaze targets corresponding to the first rendered object 1316, the second rendered object 1318, and the real-world object 1310. In practice, other filler objects (i.e., rendered objects and/or real-world objects that do not correspond to gaze targets of the gaze-based password) may also be included in the scene or view 1312. The gaze-based password module (e.g., 116, 128, or 1216) can cause the third rendered object 1320 to be presented on a display to instruct the user to perform his or her gaze-based password in order to be authenticated to access the resource. For example, the third rendered object 1320 can be a prompt presented in a rendered information pane. The gaze-based password module (e.g., 116, 128, or 1216) can then receive sensor data from one or more sensors of a computing device (e.g., sensor(s) 124, 1208, or 1304) as the user performs his or her gaze-based password. The gaze-based password module and/or the feedback module (e.g., 1218) can cause feedback (e.g., audio, visual, haptic, etc.) to be presented inform the user that the gaze targets have been identified.

To facilitate aspects of such an example, the device 1300 can utilize one or more techniques for calibrating the device 1300. The following section, in conjunction with FIGS. 14A-14F, describes aspects of a technique for obtaining calibration data. A subsequent section, in conjunction with FIG. 15A-FIG. 15F, describes aspects of an example scenario where a device 1300 processes the calibration data and other data to identify a gaze target.

A device 1300 can be calibrated in a number of ways. In one example, a device 1300 can utilize the display of a number of graphical elements at predetermined locations. As the graphical elements are displayed, the device 1300 can prompt the user to look at a particular graphical element and provide an input to verify that the user is looking at the particular graphical element. When the user verifies that he or she is looking at the particular graphical element, sensor(s) 1304' can generate eye position data defining a position of at least one eye. The eye position data can be stored in a data structure in memory in response to receiving the verification from the user.

FIG. 14A illustrates an example view 1400 that can be captured by the sensors 1304' of the device 1300. From such a perspective, the device 1300 can determine one or more values that define the position of at least one eye 1308 of the user. In one illustrative example, the values can include a second value (D2) indicating a distance between a user's eyes and a third value (D3), fourth value (D4), and a fifth value (D5) indicating a distance between at least one eye of the user and a reference point 1402. It can be appreciated that by the use of one or more image processing technologies, one or more aspects of an eye, such as the pupil, can be identified and utilized to determine an eye position.

In addition, by the use of one or more suitable technologies, a reference point 1402 can be selected. A reference point 1402 can be based on a feature of the user, e.g., a tip of a nose, an eyebrow, a beauty mark, or a reference point 1402 can be in an arbitrary location. In the example of FIG. 14A, a point between the user's eyes is used as a reference point 1402. This example reference point 1402 is provided for illustrative purposes and is not to be construed as limiting. It can be appreciated that the reference point 1402 is can be in any suitable location, which can be based on an identifiable feature or characteristic of a user or any object.

As described above, the device 1300 can generate a number of graphical elements at predetermined locations of the hardware display surface 1302. As the graphical elements are displayed on the hardware display surface 1302, the device 1300 can prompt the user to look at the graphical elements and provide an input to verify that the user is looking at the graphical elements. FIG. 14B illustrates an example view 1404 of a graphical element 1406 that can be generated by the device 1300 to facilitate the calibration process. In this example, the device 1300 generates a rendering of a graphical element 1406 in the center of the viewing area. While the graphical element 1406 is displayed, the device 1300 can generate a prompt for the user to verify that he or she is looking at the graphical element 1406. The prompt, as well as a user response to the prompt, can include a gesture, voice command, or other suitable types of input.

When the device 1300 verifies that the user is looking at the graphical element 1406, the device 1300 can record one or more values indicating the position and/or the movement of at least one eye 1308 of the user. For instance, one or more values described above and shown in FIG. 13B and FIG. 14A can be stored in a data structure in memory. It can be appreciated that any suitable value or a combination of values can be stored and utilized, including but not limited to, the first value (D1) indicating the distance between the sensors 1304' and at least one eye 1308 of a user, the second value (D2) indicating the distance between the eyes of a user, and other values (D3, D4, and D5) indicating the distance between at least one eye 1308 and a reference point 1402. These values are provided for illustrative purposes and are not to be construed as limiting. It can be appreciated that such values, subsets of such values, and other values of other measurements can be utilized in determining the movement and/or the position of one or more eyes of a user.

Other sets of values can be measured during the display of other graphical elements displayed in various positions. For example, as shown in FIG. 14C, a second set of values (D2', D3', D4', and D5') can be measured when a second graphical element 1408 is displayed, as shown in FIG. 14D. As shown in FIG. 14E, a third set of values (D2", D3", D4", and D5") can be measured when a third graphical element 1410 is displayed, as shown in FIG. 14F.

These example measurements and the locations of the graphical elements are provided for illustrative purposes. It can be appreciated that any number of graphical elements can be placed at different locations to obtain measurements that can be used to calibrate a device 1300. For example, the device 1300 can sequentially display a graphical element at pre-determined locations of the view 1404, such as each corner of the view 1404. As can be appreciated, more or fewer graphical elements can be used in the calibration process.

The values that indicate the position of at least one eye 1308 at each pre-determined location can be used to generate calibration data. The calibration data can be configured to correlate the sets of eye position data with data identifying the positions of the graphical elements.

Any known technique suitable for generating calibration data can be used. It can be appreciated that the generation of calibration data can include extrapolation, projection and/or estimation technologies that can project correlations between sets of eye position data and various sections of a hardware display surface 1302 and/or pixels of a hardware display surface 1302. These examples are provided for illustrative purposes and are not to be construed as limiting, and the values and/or calibration data can be obtained in other ways, including receiving such calibration data from one or more remote resources.

Once the calibration data is generated or obtained, such data and other data can be utilized by the device 1300 to determine if a user is looking at a particular gaze target, which can include a part of a hardware display surface 1302, a rendered object, part of a rendered object, a real-world object, or part of a real-world object. FIGS. 15A-15F describe aspects of an example scenario where the device 1300 having at least one sensor 1304' is used to track the movement of at least one eye 1308 of a user to identify a gaze target.

Referring now to FIG. 15A and FIG. 15B, an example scenario showing the identification of a gaze target is shown and described. In this example, the user is looking at the example view 1312. As summarized above with reference to FIG. 13C, the example view 1312 comprises both a view of rendered objects (e.g., first rendered object 1316, second rendered object 1318, and third rendered object 1320) on the hardware display surface 1302 as well as a view of a real-world object 1310 through the hardware display surface 1302. While the user is looking at the view 1312, the sensor(s) 1304' can cause the generation of one or more measured values, such as the values shown in the FIG. 15A. In some examples, using any combination of suitable technologies, such values can be compared against the calibration data and/or other data to identify a gaze target. In this example, one or more values measured in the scenario depicted in FIG. 15A can be processed with the calibration data to determine that the user is looking at the first rendered object 1316. In such an example, the one or more measured values shown in FIG. 15A can also be used to determine that the user is looking at a predetermined section of an interface, such as the first section 1500 of the hardware display surface 1302 in FIG. 15B.

Figure 15C:
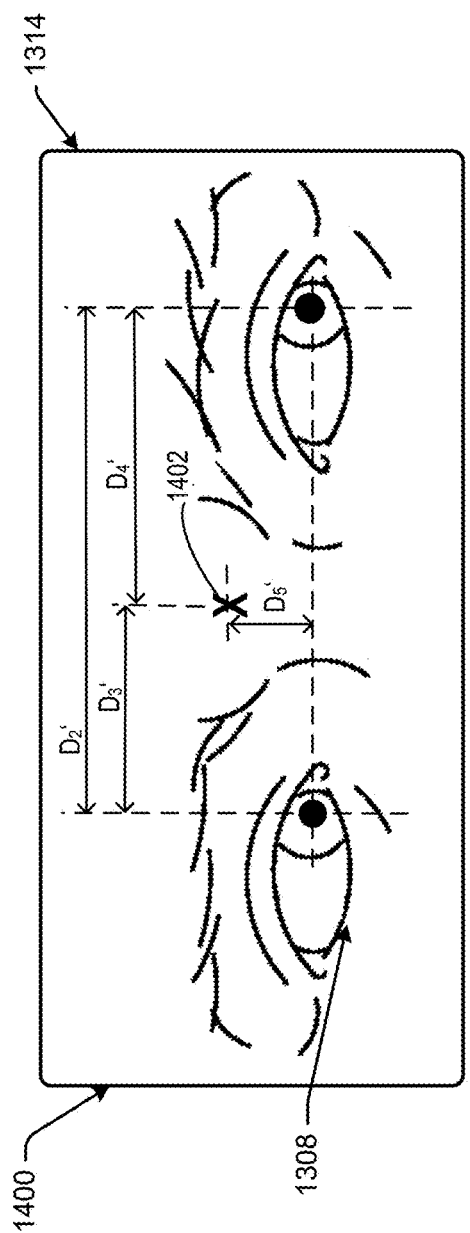
Figure 15D:
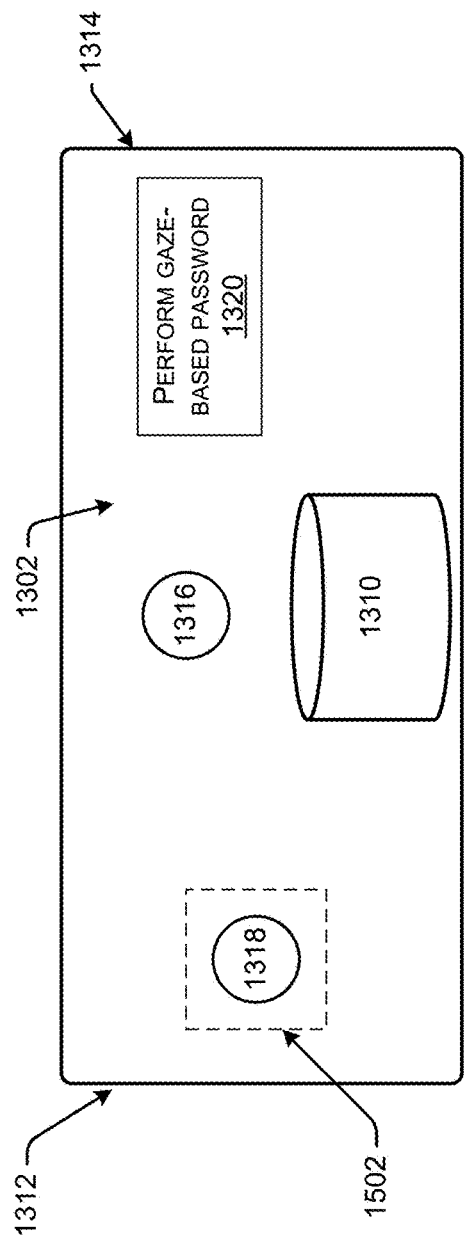

In continuing the present example, one or more values measured in the scenario depicted in FIG. 15C can be processed with the calibration data to determine that the user is looking at the second rendered object 1318. In such an example, the one or more measured values shown in FIG. 15C can also be used to determine that the user is looking at a second section 1502 of the hardware display surface 1302 in FIG. 15D.

Figure 15E:
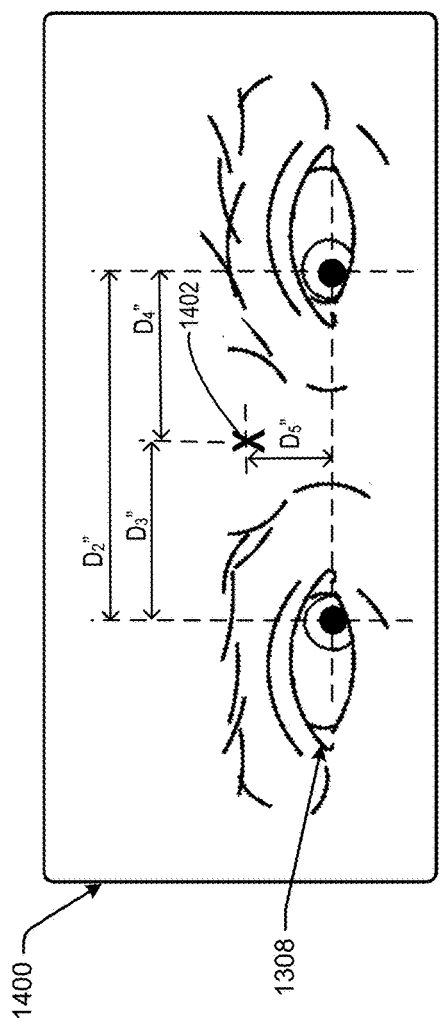
Figure 15F:
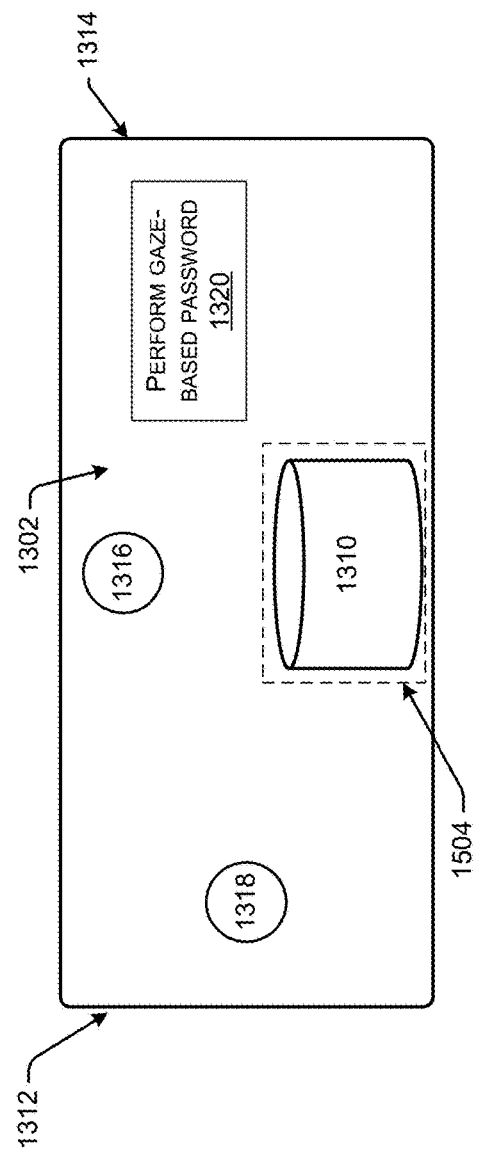

In continuing the present example, one or more values measured in the scenario depicted in FIG. 15E can be processed with the calibration data to determine that the user is looking at the real-world object 1310. In such an example, the one or more measured values shown in FIG. 15E can be processed with the calibration data to determine that the user is looking at a third section 1504 of the hardware display surface 1302 in FIG. 15F.

In some examples, the device 1300 can utilize data from a combination of resources to determine if a user is looking at the real-world object 1310 through the hardware display surface 1302. As summarized above, a camera or other type of sensor 1304 (FIG. 13A) mounted to the device 1300 can be directed towards a user's field of view. Image data generated from the camera can be analyzed to determine if an object in the field of view is in a pre-determined position of an image of the image data. If an object is positioned within a pre-determined area of an image, such as the center of the image, a device can determine a gaze target processing such data with eye position data. Such data can be utilized to supplement other types of data, such as position data from a GPS and/or data generated from a compass or accelerometer, to assist device 1300 to determine a gaze direction, e.g., left, right, up, or down, and/or a gaze target.

Figure 16:
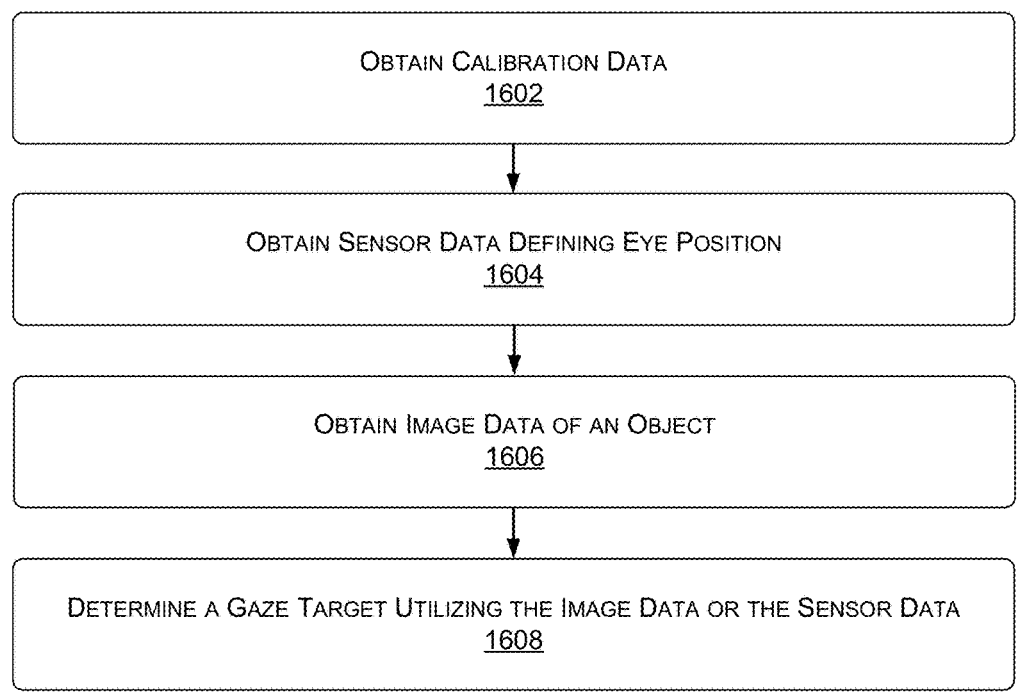
FIG. 16 is a flowchart illustrating aspects of an example process for determining a gaze target from gaze tracking data.

FIG. 16 is a flowchart illustrating aspects of an example process 1600 for determining a gaze target. In FIG. 16, the operations are described in the context of device 1200 for convenience. However, the operations are applicable to other devices as well including, but not limited to, computing devices 108 and 1300.

Block 1602 illustrates obtaining calibration data. In at least one example, the operating system 1212, an application 1220, or another module associated with the computer-readable media 1204, can obtain calibration data. The calibration data can be stored in a data structure in the computer-readable media 1204 or any computer readable storage medium for access at a later time. The calibration data can be generated by the device 1200 or the calibration data can be received from a remote resource. In some examples, sensors 1206A of computing device 1200 can be positioned to track the position of at least one eye of a user. The sensors 1206A can cause the generation of one or more values that correlate the position of at least one eye of a user with a particular section or position of a hardware display surface 1222. Such examples can utilize an initialization process where the device 1200 displays one or more graphical elements at pre-determined locations. During the display of the one or more graphical elements, one or more inputs from a user can indicate that they are looking at the one or more graphical elements. In response to the input, a device can generate calibration data comprising the values that correlate the position of at least one eye of a user with data identifying a particular position or section of a hardware display surface 1222.

Block 1604 illustrates obtaining sensor data indicating the position of at least one eye of the user. In at least one example, the operating system 1212, an application 1220, or another module associated with the computer-readable media 1204, can obtain sensor data from the sensor(s) 1206A. The sensor data can be stored in a data structure in the sensor data collection module(s) 1214 or elsewhere in the computer-readable media 106 or any computer readable storage medium for access at a later time. As summarized above, sensor(s) 1206A directed toward at least one eye of the user can cause the generation of sensor data (e.g., gaze tracking data) indicating the position of at least one eye of the user. The sensor data can be processed to generate data indicating a gaze direction of a user. As will be described below, the data indicating the gaze direction of the user can be processed with the calibration data to determine if the user is looking at a gaze target, which can include a rendered object displayed on the hardware display surface 1222.

Block 1606 illustrates obtaining image data of an object. In at least one example, the operating system 1212, an application 1220, or another module associated with the computer-readable media 1204, can obtain sensor data. The image data or other information about the object can be stored in a data structure in the sensor data collection module(s) 1214, the gaze-based password module 1216, or elsewhere in the computer-readable media 106 or any computer readable storage medium for access at a later time. In some examples, a camera or other type of sensor 1206B mounted to or otherwise in communication with the computing device 1200 can be directed towards a user's field of view. The camera or other type of sensor 1206B can cause the generation of image data, which can include one or more images of an object that is in the user's field of view. The image data can be in any suitable format and generated by any suitable sensor 1206B, which can include the use of a depth map sensor, camera, etc.

Block 1608 illustrates determining a gaze target utilizing the image data or the sensor data. In at least one example, the operating system 1212, an application 1220, the gaze-based password module 1216, or another module associated with the computer-readable media 1204, can determine the gaze target. For instance, if the user is looking at a real-world view of the object through the hardware display surface 1222, and the sensor 1206B directed towards the user's field of view generates image data of the object, the image data can be analyzed to determine if the object in the field of view is in a pre-determined position of an image of the image data. For example, if an object is positioned within a pre-determined area of an image, such as the center of the image, the computing device 1200 can determine that the object is a gaze target. In another example, sensor data (e.g., gaze tracking data) indicating the position of at least one eye of the user can be processed with the calibration data and/or image data to determine if the user is looking at a rendered object displayed on the hardware display surface 1222. Such an example can be used to determine that the rendered object displayed on the hardware display surface 1222 is a gaze target.

Additional Example Computing Architectures

Figure 17:
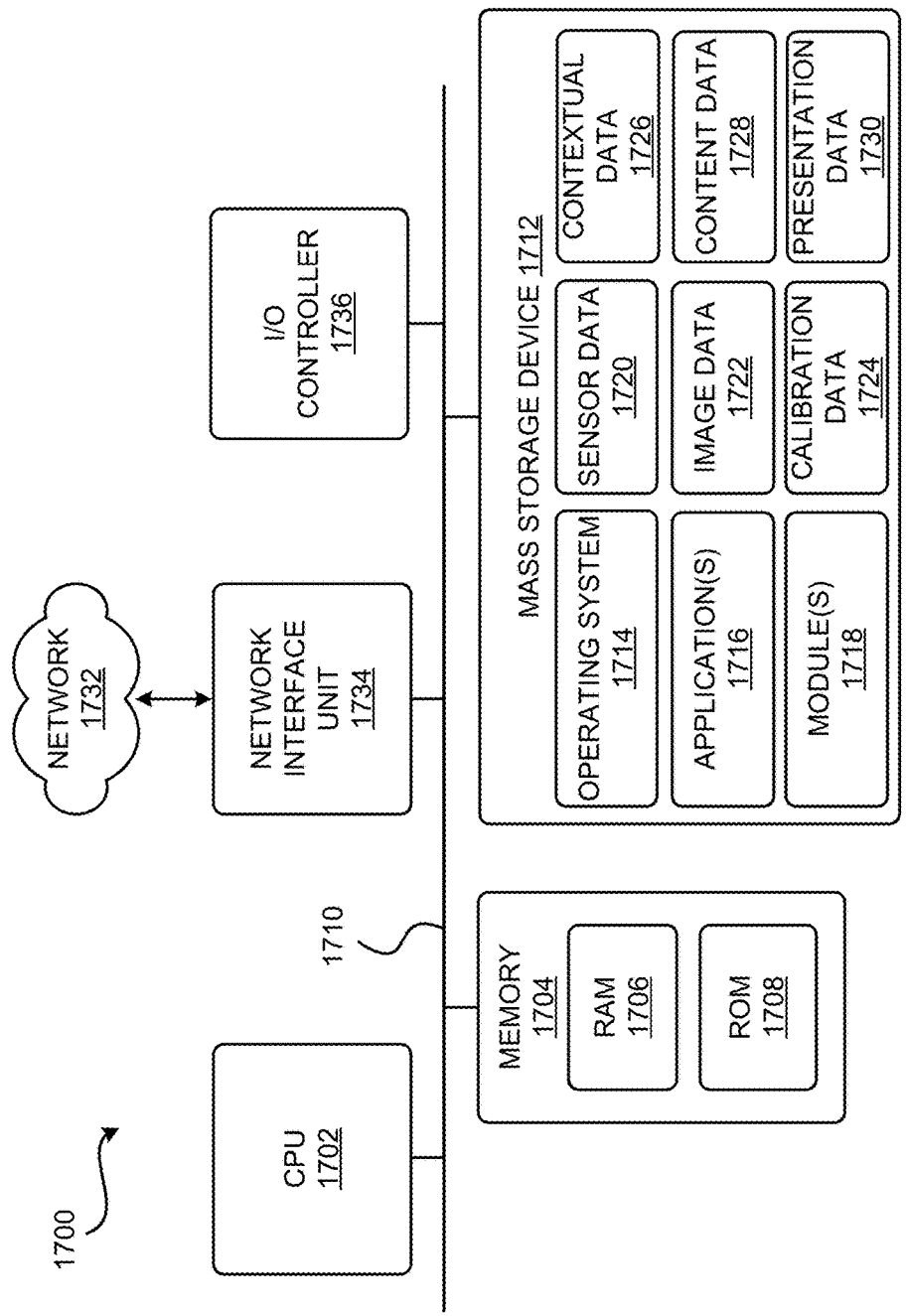
FIG. 17 is a schematic diagram illustrating an example computer architecture usable to implement aspects of gaze-based authentication.

FIG. 17 shows additional details of an example computer architecture 1700 for a computer, such as computing device 108, computing device 1200, device 1300, and/or server(s) 110, capable of executing the program components described above for establishing a gaze-based password and/or authenticating a user to a resource based on a gaze-based password. Thus, the computer architecture 1700 illustrated in FIG. 17 illustrates an architecture for a server computer, mobile phone, a PDA, a smart phone, a desktop computer, a netbook computer, a tablet computer, a laptop computer, and/or a wearable computer. The computer architecture 1700 is an example architecture that can be used to execute, in whole or in part, aspects of the software components presented herein.

The computer architecture 1700 illustrated in FIG. 17 includes a central processing unit 1702 ("CPU"), a system memory 1704, including a random access memory 1706 ("RAM") and a read-only memory ("ROM") 1708, and a system bus 1710 that couples the memory 1704 to the CPU 1702. A basic input/output system ("BIOS") containing the basic routines that help to transfer information between elements within the computer architecture 1700, such as during startup, is stored in the ROM 1708. The computer architecture 1700 further includes a mass storage device 1712 for storing an operating system 1714 (e.g., operating system 1212), application(s) 1716 (e.g., resource(s) 118, application(s) 126, application(s) 1220, etc.) programs, module(s) 1718 (e.g., gaze-based password modules 116, 128, and 1216, sensor data collection module(s) 1216, feedback module(s) 1218, etc.), and the like, as described above with reference to FIGS. 1 and 12. Additionally and/or alternatively, the mass storage device 1712 can store sensor data 1720 (e.g., from sensors 124, 1206, 1304, etc.), image data 1722 (e.g., photographs, computer generated images, object information about real and/or virtual objects in a scene, metadata about any of the foregoing, etc.), calibration data 1724, gaze-based password data 1726 (e.g., gaze targets, gaze paths, glyphs, vectors, coordinates, or other information defining gaze-based passwords), content data 1728 (e.g., computer generated images, videos, scenes, etc.), presentation data 1730 (e.g., instructions, prompts, etc.), and the like, as described herein.

The mass storage device 1712 is connected to the CPU 1702 through a mass storage controller (not shown) connected to the bus 1710. The mass storage device 1712 and its associated computer-readable media provide non-volatile storage for the computer architecture 1700. Mass storage device 1712, computer-readable media 114, computer-readable media 122, and computer-readable media 1204 are examples of computer-readable media according to this disclosure. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communication media.

By way of example, and not limitation, computer storage media can include volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory ("EPROM"), electrically erasable programmable read-only memory ("EEPROM"), flash memory or other solid state memory technology, compact disc read-only memory ("CD-ROM"), digital versatile disks ("DVD"), high definition/density digital versatile/video disc ("HD-DVD"), BLU-RAY disc, or other optical storage, magnetic cassettes, magnetic tape, magnetic disk storage or other magnetic storage devices, or any other medium which can be used to store the desired information and which can be accessed by the computer architecture 1700. For purposes of the claims, the phrase "computer storage medium," "computer-readable storage medium," and variations thereof, does not include communication media.

According to various configurations, the computer architecture 1700 can operate in a networked environment using logical connections to remote computers through the network 1732 and/or another network (not shown). The computer architecture 1700 can connect to the network 1732 through a network interface unit 1734 connected to the bus 1710. It should be appreciated that the network interface unit 1734 also can be utilized to connect to other types of networks and remote computer systems. The computer architecture 1700 also can include an input/output controller 1736 for receiving and processing input from input device(s) or input interface(s), and to provide output to an output device or output interface. Numerous examples of input and output devices and interfaces are provided throughout the application. For instance, the input/output controller 1736 can receive and process data from the input interface(s) 1208 and/or provide output to output interface(s) 1210 described above with reference to FIG. 12.

It should be appreciated that the software components described herein can, when loaded into the CPU 1702 and executed, transform the CPU 1702 and the overall computer architecture 1700 from a general-purpose computing system into a special-purpose computing system customized to facilitate the functionality presented herein. The CPU 1702 can be constructed from any number of transistors or other discrete circuit elements, which can individually or collectively assume any number of states. More specifically, the CPU 1702 can operate as a finite-state machine, in response to executable instructions contained within the software modules described herein. These computer-executable instructions can transform the CPU 1702 by specifying how the CPU 1702 transitions between states, thereby transforming the transistors or other discrete hardware elements constituting the CPU 1702. In some examples, processor(s) 112, processor(s) 120, and/or processor(s) 1202 can correspond to CPU 1702.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software described herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media described herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1700 in order to store and execute the software components presented herein. It also should be appreciated that the computer architecture 1700 can include other types of computing entities, including hand-held computers, embedded computer systems, personal digital assistants, and other types of computing entities known to those skilled in the art. It is also contemplated that the computer architecture 1700 may not include all of the components shown in FIG. 17, can include other components that are not explicitly shown in FIG. 17, or can utilize an architecture completely different than that shown in FIG. 17.

Figure 18:
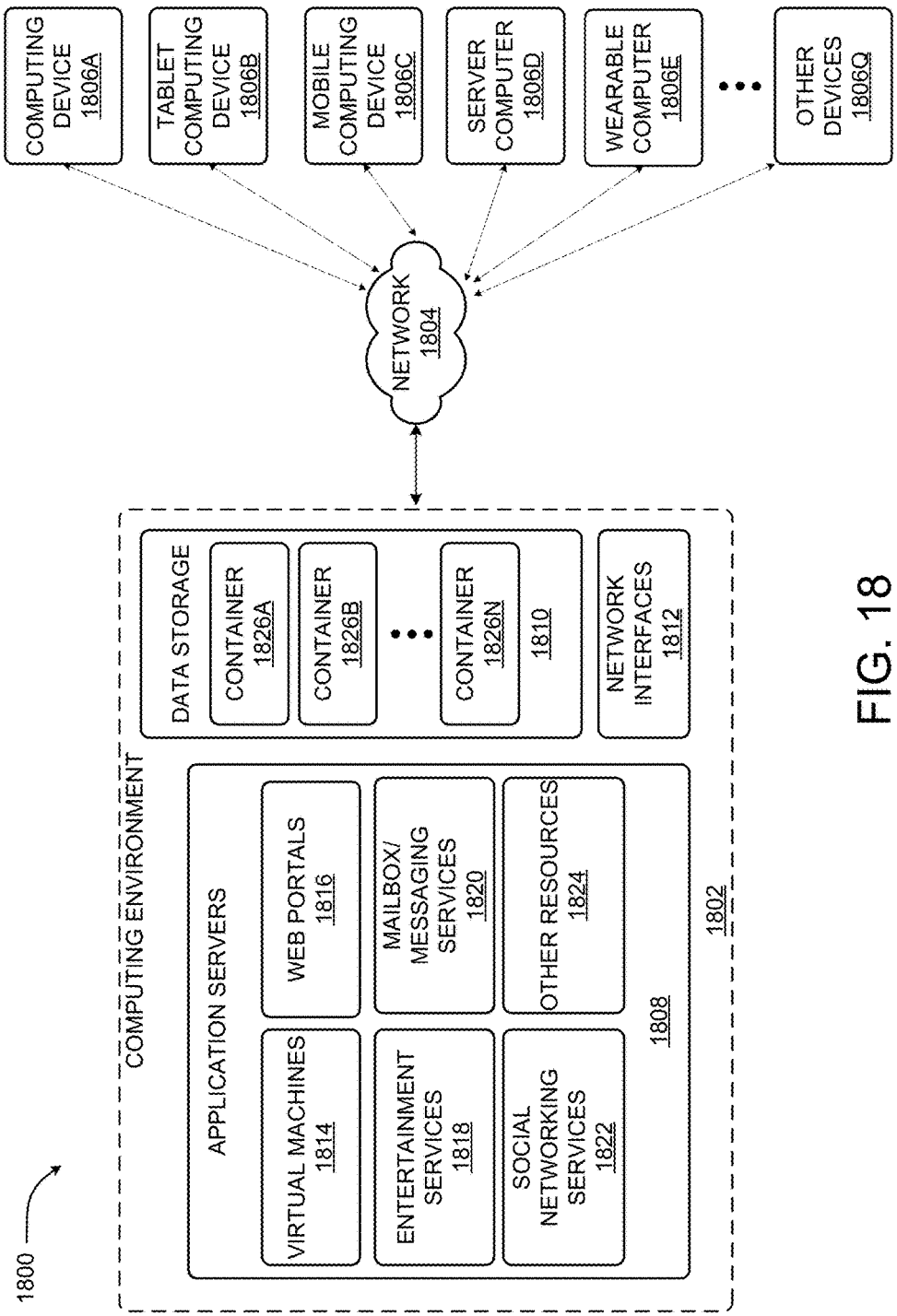
FIG. 18 is a schematic diagram illustrating an example distributed computing environment capable of implementing aspects of gaze-based authentication.

FIG. 18 depicts an example distributed computing environment 1800 capable of executing the software components described herein for implementing gaze-based authentication techniques. Thus, the distributed computing environment 1800 illustrated in FIG. 18 can be utilized to execute any aspects of the software components presented herein to achieve aspects of the techniques described herein.

According to various implementations, the distributed computing environment 1800 includes a computing environment 1802 operating on, in communication with, or as part of a network 1804. In at least one example, at least some of computing environment 1802 can correspond to the one or more servers 110 of the service provider 102, the computing devices 108, the computing device 1200, and/or the computing device 1300. The network 1804 can be or can include network(s) 104 and/or network 1732, described above with reference to FIGS. 1 and 17, respectively. The network 1804 also can include various access networks. One or more client devices 1806A-1806N (hereinafter referred to collectively and/or generically as "clients 1806") can communicate with the computing environment 1802 via the network 1804 and/or other connections (not illustrated in FIG. 18). By way of example, computing devices 108 and servers 110 in FIG. 1, computing device 1200 in FIG. 12, and device 1300 in FIG. 13A can correspond to one or more of client devices 1806A-1806Q (collectively referred to as "clients 1806"), where Q may be any integer greater than or equal to 1 depending on the desired architecture. In one illustrated configuration, the clients 1806 include a computing device 1806A such as a laptop computer, a desktop computer, or other computing device, a slate or tablet computing device ("tablet computing device") 1806B, a mobile computing device 1806C such as a mobile telephone, a smart phone, or other mobile computing device, a server computer 1806D, a wearable computer 1806E, and/or other devices 1806N. It should be understood that any number of clients 1806 can communicate with the computing environment 1802. Two example computing architectures for the clients 1806 are illustrated and described herein with reference to FIGS. 17 and 19. It should be understood that the illustrated clients 1806 and computing architectures illustrated and described herein are illustrative, and should not be construed as being limited in any way.

In the illustrated configuration, the computing environment 1802 includes application servers 1808, data storage 1810, and one or more network interfaces 1812. According to various implementations, the functionality of the application servers 1808 can be provided by one or more server computers that are executing as part of, or in communication with, the network 1804. In some examples, the computing environment 1802 can correspond to or be representative of the one or more servers 110 in FIG. 1, which are in communication with and accessible by the one or more computing devices 108 via the network(s) 104 and/or 1804. In that case, the applications servers 1808 are examples of the resource(s) 118 available at the servers 110 of the service provider 102. In some instances, the resource(s) 118 may be only accessible to authorized users. In that case, the user of one or more of the computing devices 108 may be prompted to complete his or her gaze-based password to authenticate him or herself in order to access one or more of the services or resources available from the application servers 1808. It should be understood that this example is illustrative, and should not be construed as being limited in any way.

In at least one example, the application servers 1808 can host various services, virtual machines, portals, and/or other resources. In the illustrated configuration, the application servers 1808 can host one or more virtual machines 1814 for executing applications or other functionality. According to various implementations, the virtual machines 1814 can execute one or more applications and/or software modules for implementing gaze-based authentication techniques and/or the virtual machines 1814 may be secured using such gaze-based authentication techniques. The application servers 1808 also host or provide access to one or more portals, link pages, Web sites, and/or other information ("Web portals") 1816. The Web portals 1816 can be used to communicate with one or more client computers. The application servers 1808 can include one or more entertainment services 1818. The entertainment services 1818 can include various gaming experiences for one or more users 114.

According to various implementations, the application servers 1808 also include one or more mailbox and/or messaging services 1820. The mailbox and/or messaging services 1820 can include electronic mail ("email") services, various personal information management ("PIM") services (e.g., calendar services, contact management services, collaboration services, etc.), instant messaging services, chat services, forum services, and/or other communication services.

The application servers 1808 also can include one or more social networking services 1822. The social networking services 1822 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1822 are provided by or include the FACEBOOK® social networking service, the LINKEDIN® professional networking service, the MYSPACE® social networking service, the FOURSQUARE® geographic networking service, the YAMMER® office colleague networking service, and the like. In other configurations, the social networking services 1822 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE® service and the XBOX LIVE® service from Microsoft Corporation in Redmond, Wash. Other services are possible and are contemplated.

The social networking services 1822 also can include commenting, blogging, and/or micro blogging services. Examples of such services include, but are not limited to, the YELP® commenting service, the KUDZU® review service, the OFFICETALK® enterprise micro blogging service, the TWITTER® messaging service, the GOOGLE BUZZ® service, and/or other services. It should be appreciated that the above lists of services are not exhaustive and that numerous additional and/or alternative social networking services 1822 are not mentioned herein for the sake of brevity. As such, the above configurations are illustrative, and should not be construed as being limited in any way. According to various implementations, the social networking services 1822 can host one or more applications and/or software modules for providing the functionality described herein for providing contextually-aware location sharing services for computing devices. For instance, any one of the application servers 1808 can communicate or facilitate the functionality and features described herein. For instance, a social networking application, mail client, messaging client, a browser running on a phone or any other client 1806 can communicate with a social networking service 1822.

As shown in FIG. 18, the application servers 1808 also can host other services, applications, portals, and/or other resources ("other resources") 1824. The other resources 1824 can deploy a service-oriented architecture or any other client-server management software. It thus can be appreciated that the computing environment 1802 can provide integration of the gaze-based authentication concepts and technologies described herein with various mailbox, messaging, social networking, and/or other services or resources.

As mentioned above, the computing environment 1802 can include the data storage 1810. According to various implementations, the functionality of the data storage 1810 is provided by one or more databases operating on, or in communication with, the network 1804. The functionality of the data storage 1810 also can be provided by one or more server computers configured to host data for the computing environment 1802. The data storage 1810 can include, host, or provide one or more real or virtual containers 1826A-1826N (referred to collectively and/or generically as "containers 1826"). Although not illustrated in FIG. 18, the containers 1826 also can host or store data structures and/or algorithms for execution by one or more modules of remote computing devices (e.g., gaze-based password module 128 of one of computing devices 108, or gaze-based password module 1216 or sensor data collection module(s) 1214 of computing device 1200). Aspects of the containers 1826 can be associated with a database program, file system and/or any program that stores data with secure access features. Aspects of the containers 1826 can also be implemented using products or services, such as ACTIVE DIRECTORY®, DKM®, ONEDRIVE®, DROPBOX® or GOOGLEDRIVE®.

The computing environment 1802 can communicate with, or be accessed by, the network interfaces 1812. The network interfaces 1812 can include various types of network hardware and software for supporting communications between two or more computing entities including, but not limited to, the clients 1806 and the application servers 1808. It should be appreciated that the network interfaces 1812 also can be utilized to connect to other types of networks and/or computer systems.

It should be understood that the distributed computing environment 1800 described herein can provide any aspects of the software elements described herein with any number of virtual computing resources and/or other distributed computing functionality that can be configured to execute any aspects of the software components described herein. According to various implementations of the concepts and technologies described herein, the distributed computing environment 1800 provides the software functionality described herein as a service to the clients 1806. It should be understood that the clients 1806 can include real or virtual machines including, but not limited to, server computers, web servers, personal computers, tablet computers, gaming consoles, smart televisions, mobile computing entities, smart phones, and/or other devices. As such, various configurations of the concepts and technologies described herein enable any device configured to access the distributed computing environment 1800 to utilize the functionality described herein for providing gaze-based authentication, among other aspects. In one specific example, as summarized above, techniques described herein can be implemented, at least in part, by a web browser application that can work in conjunction with the application servers 1808 of FIG. 18.

Figure 19:
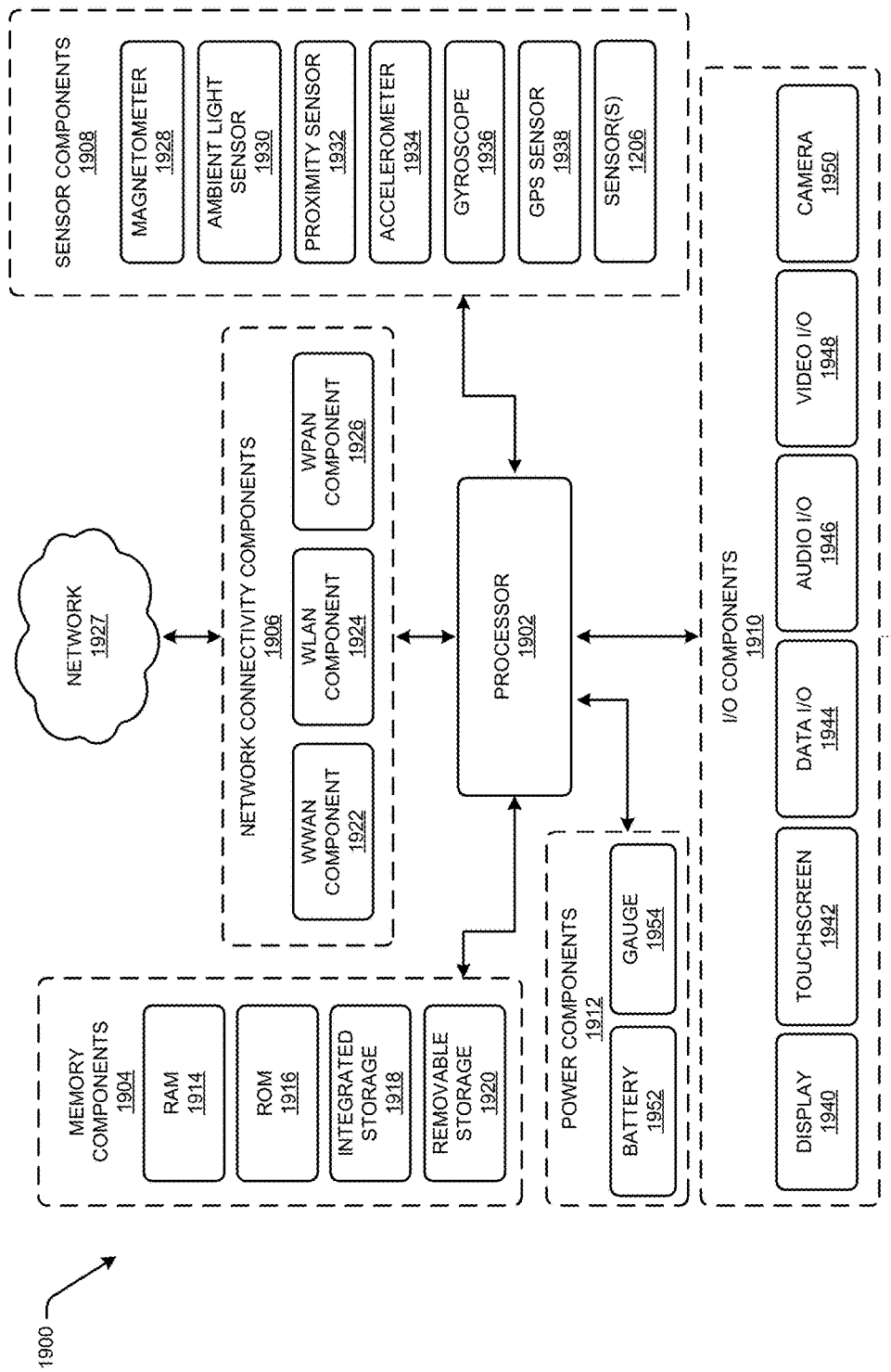
FIG. 19 is a schematic diagram illustrating another example computing device architecture usable to implement aspects of gaze-based authentication.

FIG. 19 is an illustrative computing device architecture 1900 for a computing device that is capable of executing various software components described which, in some examples, is usable to implement aspects of gaze-based authentication. The computing device architecture 1900 is applicable to computing entities that facilitate mobile computing due, in part, to form factor, wireless connectivity, and/or battery-powered operation. In some configurations, the computing entities include, but are not limited to, mobile telephones, tablet devices, slate devices, wearable devices, portable video game devices, and the like. Moreover, aspects of the computing device architecture 1900 can be applicable to traditional desktop computers, portable computers (e.g., laptops, notebooks, ultra-portables, and netbooks), server computers, and other computer systems. By way of example and not limitation, the computing device architecture 1900 is applicable to any of the clients shown in FIGS. 1, 12, 13, 17, and 18 (e.g., servers 110 of service provider 102, computing devices 108, computing device 1200, device 1300, and/or devices 1806).

The computing device architecture 1900 illustrated in FIG. 19 includes a processor 1902, memory components 1904, network connectivity components 1906, sensor components 1908, input/output components 1910, and power components 1912. In the illustrated configuration, the processor 1902 is in communication with the memory components 1904, the network connectivity components 1906, the sensor components 1908, the input/output ("I/O") components 1910, and the power components 1912. Although no connections are shown between the individual components illustrated in FIG. 19, the components can interact to carry out device functions. In some configurations, the components are arranged so as to communicate via one or more busses (not shown).

The processor 1902 includes a central processing unit ("CPU") configured to process data, execute computer-executable instructions of one or more application programs, and communicate with other components of the computing device architecture 1900 in order to perform various functionality described herein. The processor 1902 can be utilized to execute aspects of the software components presented herein. In some examples, the processor 1902 can correspond to processor(s) 112, processor(s) 120, processor(s) 1202, and/or CPU 1702, as described above in reference to FIGS. 1, 12, and 17.

In some configurations, the processor 1902 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 1080i, 1080p, and higher resolution), video games, three-dimensional ("3D") modeling applications, and the like. In some configurations, the processor 1902 is configured to communicate with a discrete GPU (not shown). In some examples, the processor 1902 may additionally or alternatively comprise a holographic processing unit (HPU) which is designed specifically to process and integrate data from multiple sensors of a head mounted computing device and to handle tasks such as spatial mapping, gesture recognition, and voice and speech recognition. In any case, the CPU, GPU, and/or HPU can be configured in accordance with a co-processing CPU/GPU/HPU computing model, wherein processing tasks are divided between the CPU, GPU, and/or HPU according to their respective strengths. For instance, the sequential part of an application may execute on the CPU, the computationally-intensive part is accelerated by the GPU, and certain specialized functions (e.g., spatial mapping, gesture recognition, and voice and speech recognition) may executed by an HPU.

In some configurations, the processor 1902 is, or is included in, a System-on-Chip ("SoC") along with one or more of the other components described herein below. For example, the SoC can include the processor 1902, a GPU, one or more of the network connectivity components 1906, and one or more of the sensor components 1908. In some configurations, the processor 1902 is fabricated, in part, utilizing a Package-on-Package ("PoP") integrated circuit packaging technique. The processor 1902 can be a single core or multi-core processor.

The processor 1902 can be created in accordance with an ARM architecture, available for license from ARM HOLDINGS of Cambridge, United Kingdom. Alternatively, the processor 1902 can be created in accordance with an x86 architecture, such as is available from INTEL CORPORATION of Mountain View, Calif. and others. In some configurations, the processor 1902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1904 include a random access memory ("RAM") 1914, a read-only memory ("ROM") 1916, an integrated storage memory ("integrated storage") 1918, and a removable storage memory ("removable storage") 1920. In some configurations, the RAM 1914 or a portion thereof, the ROM 1916 or a portion thereof, and/or some combination the RAM 1914 and the ROM 1916 is integrated in the processor 1902. In some configurations, the ROM 1916 is configured to store a firmware, an operating system or a portion thereof (e.g., operating system kernel), and/or a bootloader to load an operating system kernel from the integrated storage 1918 and/or the removable storage 1920. In some examples, memory components 1904 can correspond to computer-readable media 114, computer-readable media 122, computer-readable media 1204, memory 1704, as described above in reference to FIGS. 1, 12, and 17, respectively.

The integrated storage 1918 can include a solid-state memory, a hard disk, or a combination of solid-state memory and a hard disk. The integrated storage 1918 can be soldered or otherwise connected to a logic board upon which the processor 1902 and other components described herein also can be connected. As such, the integrated storage 1918 is integrated in the computing device. The integrated storage 1918 is configured to store an operating system or portions thereof, application programs, data, and other software components described herein.

The removable storage 1920 can include a solid-state memory, a hard disk, or a combination of solid-state memory and a hard disk. In some configurations, the removable storage 1920 is provided in lieu of the integrated storage 1918. In other configurations, the removable storage 1920 is provided as additional optional storage. In some configurations, the removable storage 1920 is logically combined with the integrated storage 1918 such that the total available storage is made available as a total combined storage capacity. In some configurations, the total combined capacity of the integrated storage 1918 and the removable storage 1920 is shown to a user instead of separate storage capacities for the integrated storage 1918 and the removable storage 1920.

The removable storage 1920 is configured to be inserted into a removable storage memory slot (not shown) or other mechanism by which the removable storage 1920 is inserted and secured to facilitate a connection over which the removable storage 1920 can communicate with other components of the computing device, such as the processor 1902. The removable storage 1920 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1904 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are also contemplated.

The network connectivity components 1906 include a wireless wide area network component ("WWAN component") 1922, a wireless local area network component ("WLAN component") 1924, and a wireless personal area network component ("WPAN component") 1926. The network connectivity components 1906 facilitate communications to and from the network 1927 or another network, which can be a WWAN, a WLAN, or a WPAN. Although only the network 1927 is illustrated, the network connectivity components 1906 can facilitate simultaneous communication with multiple networks, including the network 1927 of FIG. 19. For example, the network connectivity components 1906 can facilitate simultaneous communications with multiple networks via one or more of a WWAN, a WLAN, or a WPAN. In some examples, the network 1927 can correspond to all or part of network(s) 104, network 1732, and/or network 1804, as shown in FIGS. 1, 17, and 18.

The network 1927 can be or can include a WWAN, such as a mobile telecommunications network utilizing one or more mobile telecommunications technologies to provide voice and/or data services to a computing device utilizing the computing device architecture 1900 via the WWAN component 1922. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1927 can utilize various channel access methods (which can or cannot be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1927 can be configured to provide voice and/or data communications with any combination of the above technologies. The network 1927 can be configured to or adapted to provide voice and/or data communications in accordance with future generation technologies.

In some configurations, the WWAN component 1922 is configured to provide dual-multi-mode connectivity to the network 1927. For example, the WWAN component 1922 can be configured to provide connectivity to the network 1927, wherein the network 1927 provides service via GSM and UMTS technologies, or via some other combination of technologies. Alternatively, multiple WWAN components 1922 can be utilized to perform such functionality, and/or provide additional functionality to support other non-compatible technologies (i.e., incapable of being supported by a single WWAN component). The WWAN component 1922 can facilitate similar connectivity to multiple networks (e.g., a UMTS network and an LTE network).

The network 1927 can be a WLAN operating in accordance with one or more Institute of Electrical and Electronic Engineers ("IEEE") 802.15 standards, such as IEEE 802.15a, 802.15b, 802.15g, 802.15n, and/or future 802.15 standard (referred to herein collectively as WI-FI). Draft 802.15 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1924 is configured to connect to the network 1927 via the WI-FI access points. Such connections can be secured via various encryption technologies including, but not limited, WI-FI Protected Access ("WPA"), WPA2, Wired Equivalent Privacy ("WEP"), and the like.

The network 1927 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1926 is configured to facilitate communications with other devices, such as peripherals, computers, or other computing entities via the WPAN.

In at least one example, the sensor components 1908 can include a magnetometer 1928, an ambient light sensor 1930, a proximity sensor 1932, an accelerometer 1934, a gyroscope 1936, and a Global Positioning System sensor ("GPS sensor") 1938. Additionally, the sensor components 1908 can include any or all of the sensor(s) 1206 as described above with reference to FIG. 12. It is contemplated that other sensors, such as, but not limited to, temperature sensors or shock detection sensors, strain sensors, moisture sensors also can be incorporated in the computing device architecture 1900.

The magnetometer 1928 is configured to measure the strength and direction of a magnetic field. In some configurations the magnetometer 1928 provides measurements to a compass application program stored within one of the memory components 1904 in order to provide a user with accurate directions in a frame of reference including the cardinal directions, north, south, east, and west. Similar measurements can be provided to a navigation application program that includes a compass component. Other uses of measurements obtained by the magnetometer 1928 are contemplated.

The ambient light sensor 1930 is configured to measure ambient light. In some configurations, the ambient light sensor 1930 provides measurements to an application program stored within one the memory components 1904 in order to automatically adjust the brightness of a display (described below) to compensate for low-light and high-light environments. Other uses of measurements obtained by the ambient light sensor 1930 are contemplated.

The proximity sensor 1932 is configured to detect the presence of an object or thing in proximity to the computing device without direct contact. In some configurations, the proximity sensor 1932 detects the presence of a user's body (e.g., the user's face) and provides this information to an application program stored within one of the memory components 1904 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 1928 are contemplated.

The accelerometer 1934 is configured to measure proper acceleration. In some configurations, output from the accelerometer 1934 is used by an application program as an input mechanism to control some functionality of the application program. For example, the application program can be a video game in which a character, a portion thereof, or an object is moved or otherwise manipulated in response to input received via the accelerometer 1934. In some configurations, output from the accelerometer 1934 is provided to an application program for use in switching between landscape and portrait modes, calculating coordinate acceleration, or detecting a fall. Other uses of the accelerometer 1934 are contemplated.

The gyroscope 1936 is configured to measure and maintain orientation. In some configurations, output from the gyroscope 1936 is used by an application program as an input mechanism to control some functionality of the application program. For example, the gyroscope 1936 can be used for accurate recognition of movement within a 3D environment of a video game application or some other application. In some configurations, an application program utilizes output from the gyroscope 1936 and the accelerometer 1934 to enhance control of some functionality of the application program. Other uses of the gyroscope 1936 are contemplated.

The GPS sensor 1938 is configured to receive signals from GPS satellites for use in calculating a location. The location calculated by the GPS sensor 1938 can be used by any application program that requires or benefits from location information. For example, the location calculated by the GPS sensor 1938 can be used with a navigation application program to provide directions from the location to a destination or directions from the destination to the location. Moreover, the GPS sensor 1938 can be used to provide location information to an external location-based service, such as E1515 service. The GPS sensor 1938 can obtain location information generated via WI-FI, WIMAX, and/or cellular triangulation techniques utilizing one or more of the network connectivity components 1906 to aid the GPS sensor 1938 in obtaining a location fix. The GPS sensor 1938 can also be used in Assisted GPS ("A-GPS") systems.

In at least one example, the I/O components 1910 can correspond to the input interface(s) 1208 and/or output interface(s) 1210, described above with reference to FIG. 12. Additionally and/or alternatively, the I/O components can include a display 1940, a touchscreen 1942, a data I/O interface component ("data I/O") 1944, an audio I/O interface component ("audio I/O") 1946, a video I/O interface component ("video I/O") 1948, and a camera 1950. In some configurations, the display 1940 and the touchscreen 1942 are combined. In some configurations two or more of the data I/O component 1944, the audio I/O component 1946, and the video I/O component 1948 are combined. The I/O components 1910 can include discrete processors configured to support the various interface described below, or can include processing functionality built-in to the processor 1902.

The display 1940 is an output device configured to present information in a visual form. In particular, the display 1940 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1940 is a liquid crystal display ("LCD") utilizing any active or passive matrix technology and any backlighting technology (if used). In some configurations, the display 1940 is an organic light emitting diode ("OLED") display. In some configurations, the display 1940 is a holographic display. Other display types are contemplated.

In at least one example, the display 1940 can correspond to the hardware display surface 1222 and/or hardware display surface 1302. As described above, the hardware display surface 1222 and the hardware display surface 1302 can be configured to graphically associate holographic user interfaces and other graphical elements with an object seen through the hardware display surface or rendered objects displayed on the hardware display surface. Additional features associated with the hardware display device 1222 and the hardware display surface 1302 are described above with reference to FIGS. 12 and 13, respectively.

The touchscreen 1942, also referred to herein as a "touch-enabled screen," is an input device configured to detect the presence and location of a touch. The touchscreen 1942 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 1942 is incorporated on top of the display 1940 as a transparent layer to enable a user to use one or more touches to interact with objects or other information presented on the display 1940. In other configurations, the touchscreen 1942 is a touch pad incorporated on a surface of the computing device that does not include the display 1940. For example, the computing device can have a touchscreen incorporated on top of the display 1940 and a touch pad on a surface opposite the display 1940.

In some configurations, the touchscreen 1942 is a single-touch touchscreen. In other configurations, the touchscreen 1942 is a multi-touch touchscreen. In some configurations, the touchscreen 1942 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1942. As such, a developer can create gestures that are specific to a particular application program.

In some configurations, the touchscreen 1942 supports a tap gesture in which a user taps the touchscreen 1942 once on an item presented on the display 1940. The tap gesture can be used to perform various functions including, but not limited to, opening or launching whatever the user taps. In some configurations, the touchscreen 1942 supports a double tap gesture in which a user taps the touchscreen 1942 twice on an item presented on the display 1940. The double tap gesture can used to perform various functions including, but not limited to, zooming in or zooming out in stages. In some configurations, the touchscreen 1942 supports a tap and hold gesture in which a user taps the touchscreen 1942 and maintains contact for at least a pre-defined time. The tap and hold gesture can be used to perform various functions including, but not limited to, opening a context-specific menu.

In some configurations, the touchscreen 1942 supports a pan gesture in which a user places a finger on the touchscreen 1942 and maintains contact with the touchscreen 1942 while moving the finger on the touchscreen 1942. The pan gesture can be used to perform various functions including, but not limited to, moving through screens, images, or menus at a controlled rate. Multiple finger pan gestures are also contemplated. In some configurations, the touchscreen 1942 supports a flick gesture in which a user swipes a finger in the direction the user wants the screen to move. The flick gesture can be used to perform various functions including, but not limited to, scrolling horizontally or vertically through menus or pages. In some configurations, the touchscreen 1942 supports a pinch and stretch gesture in which a user makes a pinching motion with two fingers (e.g., thumb and forefinger) on the touchscreen 1942 or moves the two fingers apart. The pinch and stretch gesture can be used to perform various functions including, but not limited to, zooming gradually in or out of a website, map, or picture.

Although the above gestures have been described with reference to the use of one or more fingers for performing the gestures, other appendages such as toes or objects such as styluses can be used to interact with the touchscreen 1942. As such, the above gestures should be understood as being illustrative and should not be construed as being limited in any way.

The data I/O interface component 1944 is configured to facilitate input of data to the computing device and output of data from the computing device. In some configurations, the data I/O interface component 1944 includes a connector configured to provide wired connectivity between the computing device and a computer system, for example, for synchronization operation purposes. The connector can be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1946 is configured to provide audio input and/or output capabilities to the computing device. In some configurations, the audio I/O interface component 1946 includes a microphone configured to collect audio signals. In some configurations, the audio I/O interface component 1946 includes a headphone jack configured to provide connectivity for headphones or other external speakers. In some configurations, the audio I/O interface component 1946 includes a speaker for the output of audio signals. In some configurations, the audio I/O interface component 1946 includes an optical audio cable out.

The video I/O interface component 1948 is configured to provide video input and/or output capabilities to the computing device. In some configurations, the video I/O interface component 1948 includes a video connector configured to receive video as input from another device (e.g., a video media player such as a DVD or BLURAY player) or send video as output to another device (e.g., a monitor, a television, or some other external display). In some configurations, the video I/O interface component 1948 includes a High-Definition Multimedia Interface ("HDMI"), mini-HDMI, micro-HDMI, DisplayPort, or proprietary connector to input/output video content. In some configurations, the video I/O interface component 1948 or portions thereof is combined with the audio I/O interface component 1946 or portions thereof.

The camera 1950 can be configured to capture still images and/or video. The camera 1950 can utilize a charge coupled device ("CCD") or a complementary metal oxide semiconductor ("CMOS") image sensor to capture images. In some configurations, the camera 1950 includes a flash to aid in taking pictures in low-light environments. Settings for the camera 1950 can be implemented as hardware or software buttons. Images and/or video captured by camera 1950 may additionally or alternatively be used to detect non-touch gestures, facial expressions, eye movement, or other movements and/or characteristics of the user.

Although not illustrated, one or more hardware buttons can also be included in the computing device architecture 1900. The hardware buttons can be used for controlling some operational aspect of the computing device. The hardware buttons can be dedicated buttons or multi-use buttons. The hardware buttons can be mechanical or sensor-based.

The illustrated power components 1912 include one or more batteries 1952, which can be connected to a battery gauge 1954. The batteries 1952 can be rechargeable or disposable. Rechargeable battery types include, but are not limited to, lithium polymer, lithium ion, nickel cadmium, and nickel metal hydride. Each of the batteries 1952 can be made of one or more cells.

The battery gauge 1954 can be configured to measure battery parameters such as current, voltage, and temperature. In some configurations, the battery gauge 1954 is configured to measure the effect of a battery's discharge rate, temperature, age and other factors to predict remaining life within a certain percentage of error. In some configurations, the battery gauge 1954 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1912 can also include a power connector, which can be combined with one or more of the aforementioned I/O components 1910. The power components 1912 can interface with an external power system or charging equipment via a power I/O component.

Example Gaze-Based Authentication Techniques

Figure 20:
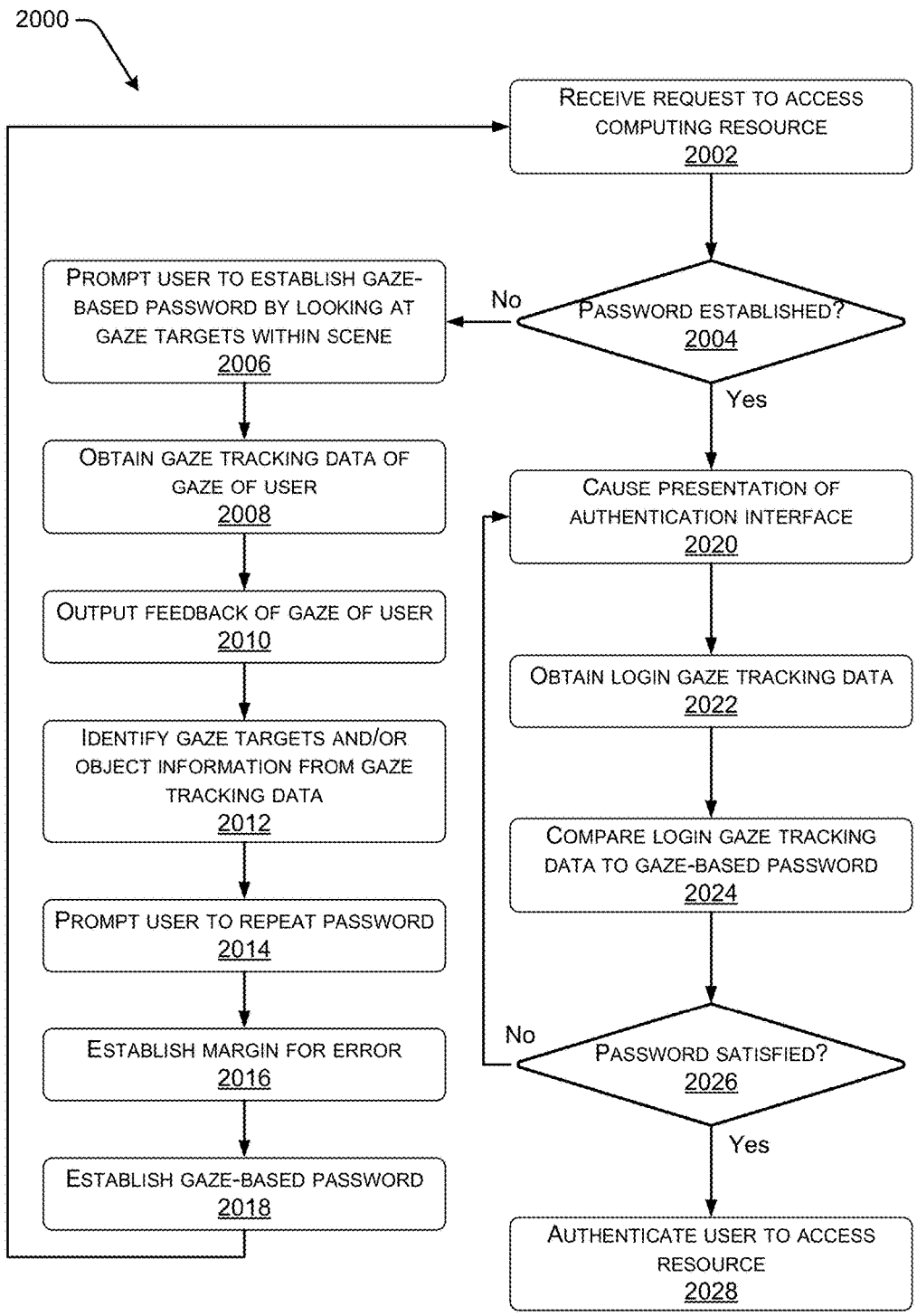
FIG. 20 is a flowchart illustrating aspects of an example process for establishing a gaze-based password and/or authenticating a user to a resource based on a gaze-based password.

FIG. 20 is a flowchart illustrating example gaze-based authentication techniques that can be implemented using one or more of the devices and/or computing architectures described herein. The techniques are described in the context of the environment 100 of FIG. 1 for convenience, but the techniques are not limited to use in the environment or with the devices shown in FIG. 1. Rather the techniques of FIGS. 20 and 21 are applicable to other environments and devices including those shown in FIGS. 12, 13, 17, 18, and 19, as well as other environments and computing devices.

The process described below with reference to FIG. 20 is illustrated as a collection of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 20 illustrates an example process 2000 to implement gaze-based authentication. Block 2002 illustrates receiving a request by a user to access a resource. In some examples, the resource may comprise a computing resource, such as a resource available from a remote service provider (e.g., service provider 102), a local computing resource such as access to a computing device (e.g., one of computing devices 108), or an application or other resource available from a local and/or remote computing device or service. In other examples, the resource may comprise a physical resource such as access to building, room, object, or other physical item. Whether the resource is a computing resource or a physical resource, access to the resource may be controlled at least in part by a computing device. For instance, a user may seek to access a resource of computing devices 108. Alternatively, the user may seek to use one of computing devices 108 to access a resource available from the service provider 102 and/or one or more other computing devices.

At block 2004, the computing device (e.g., one of computing devices 108, a server 110 of the service provider 102, or another computing device) determines whether or not the user has previously established a gaze-based password for accessing the resource. If so, the computing device proceeds to an authentication phase described with reference to blocks 2020-2028 below. If, at block 2004, a gaze-based password has not previously been established for the user to access the resource, the computing device may initiate a password establishment phase described with reference to blocks 2006-2018.

At block 2006, the user may be prompted to establish a gaze-based password for the resource by identifying multiple gaze targets of his or her choosing by looking at the gaze targets within a scene. As discussed above, a gaze target can be a location within a scene, an object or part of an object depicted in a scene, or a geometric feature of the scene itself at which a user looks for a threshold length of time. The computing device may specify the threshold length of time (e.g., 1 second, 3 seconds, etc.) that the user is to look at each gaze target in order to identify the gaze target. The computing device may also specify the number ((or a minimum number) of gaze targets that the user is to identify. The number of gaze targets specified may depend on the level of security required, the complexity of the scene, the accuracy of the gaze tracking camera, or other factors. The scene may be a computer generated scene, a real-world scene, and/or a mixed reality scene. Examples of each of these types of scenes are described in detail with reference to FIGS. 2-11. The prompting may be in the form of a visual instruction presented in a computer generated information pane (e.g., as shown in FIGS. 2, 7, and 9), in the form of audible instructions (e.g., as in the example of FIG. 10), both audible and visual, or by other means.

At block 2008, the computing device obtains gaze tracking data corresponding to gaze of the user responsive to the prompting. The gaze tracking data may be obtained from a gaze tracking camera of the computing device (e.g., sensor(s) 124 or gaze tracking camera 1206A). In some examples, at block 2010, feedback representing the gaze tracking data can be output identify to the user that the multiple gaze targets have been established. In some examples, the feedback may comprise visual feedback output on a display of the computing device, as in the examples of FIGS. 2, 4, 6, and 7. Additionally or alternatively, the feedback may comprise audible, haptic, or other feedback to indicate to the user that the multiple gaze targets have been established.

At block 2012, the computing device can identify the multiple gaze targets within the scene based at least in part on the gaze tracking data. In some examples, the gaze targets may be identified using techniques such as those described with reference to FIGS. 13, 14A-14-F, and 15A-15D. In some examples, such as that described with reference to FIGS. 10 and 11, the gaze tracking data may also identify one or more objects in the scene and may obtain information (e.g., an image, scan, model, or other identifier) about the objects. Identification of the gaze targets and/or obtaining object information may be performed in substantially real time and may be performed before, concurrently with, or after, outputting the feedback to the user (in examples in which feedback is provided).

At block 2014, after identifying the gaze targets, in some examples, the computing device may prompt the user to repeat the identification of the gaze targets one or more times to confirm the gaze-based password and/or to compute an acceptable range or margin of execution error for the gaze-based password. The margin for execution error (m) takes into account slight variations in the user's gaze from one password attempt to the next and may be established by, for example, measuring differences between the gaze tracking data during a first pass when the user first looks at the gaze targets and gaze tracking data during one or more subsequent passes when the users confirms the gaze based password.

At block 2018, the computing device may establish a gaze-based password. The gaze-based password may be established using any of the techniques described herein. In some examples, the gaze-based password may be established based at least in part on the gaze targets. The gaze-based password may or may not also take into account the locations of the gaze targets within the scene and/or the order in which the user identifies the gaze targets. The gaze-based password may additionally or alternatively be based at least in part on the object information about objects in the scene.

Once the gaze-based password has been established, the process returns to block 2002. Now, since a password has been established, the process proceeds to the authentication phase at block 2020. At block 2020, the computing device causes presentation of an authentication interface including the scene. Causing presentation of the authentication interface may comprise displaying the authentication interface of a display of the computing device. Alternatively, causing presentation of the authentication interface may comprise outputting or transmitting the authentication interface to another device for presentation, such as in the case of a server 110 of the service provider 102 transmitting the authentication interface to one of the client devices 108 for presentation to the user (e.g., by a browser or other application of the client device 108). In some examples, the authentication interface may simply be the computer generated scene, real world scene, or mixed-reality scene. The authentication interface may additionally or alternatively include an audible, visual, or other prompt accompanying the scene, instructing the user to perform his or her gaze-based password. By way of example and not limitation, an authentication interface including a visual prompt is shown in FIGS. 3, 5, and 8. In the example of FIG. 11, in which the scene comprises a real world scene, the authentication interface may be omitted entirely or may consist of an audible or other non-visual prompt.

At block 2022, the user's gaze may be tracked as they perform their gaze-based password to obtain login gaze tracking data representing gaze of the user viewing the scene. Again, the gaze tracking data may be generated using techniques such as those described with reference to FIGS. 13, 14A-14-F, and 15A-15D, for example. At block 2024, the computing device may compare the login gaze tracking data to the gaze-based password. The comparison may be performed using any of the comparison techniques (e.g., spatial comparison, statistical comparison, etc.) described herein.

At block 2026, the computing device can determine, based at least in part on the comparison, whether the login gaze tracking data satisfies the gaze-based password. If the login gaze tracking data does not satisfy the gaze-based password, the user may be returned to the authentication interface to try their gaze-based password again. If login gaze tracking data does satisfy the gaze-based password, the computing device proceeds, at block 2028 to authenticate the user to access the resource. The authentication may include one or more other conventional authentication operations, such as handshakes, sharing of certificates, keys, or other credentials, or the like.

Example Clauses

The disclosure presented herein can be considered in view of the following clauses.

A. In some examples, a computing device comprises: one or more processors; and memory having computer-executable instructions stored thereupon. When executed by the one or more processors, the instructions cause the computing device to perform operations comprising: prompting a user to select, by looking at, multiple gaze targets within a scene; obtaining, from a gaze tracking camera, gaze tracking data corresponding to gaze of the user responsive to the prompting; identifying the multiple gaze targets within the scene based at least in part on the gaze tracking data; and establishing, based at least in part on the multiple gaze targets, a gaze-based password usable to access a resource.

B. The computing device of paragraph A, the operations further comprising outputting feedback to visually identify the multiple gaze targets on a display.

C. The computing device of paragraph A or B, the operations further comprising: prompting the user to visually confirm selection of the multiple gaze targets; obtaining, from the gaze tracking camera, confirmation gaze tracking data visually confirming selection of the multiple gaze targets; and establishing a margin for execution error based at least in part differences between the gaze tracking data and the confirmation gaze tracking data; wherein the establishing the gaze-based password is further based at least in part on the margin for execution error.

D. The computing device of any one of paragraphs A-C, wherein the gaze-based password comprises a gaze glyph composed of the multiple gaze targets and one or more gaze paths between the multiple gaze targets.

E. The computing device of any one of paragraphs A-D, wherein the scene comprises a static image, and the multiple gaze targets correspond to objects depicted in the static image.

F. The computing device of any one of paragraphs A-E, wherein the scene comprises a computer generated scene, and the multiple gaze targets correspond to objects depicted in the computer generated scene.

G. The computing device of any one of paragraphs A-D and F, wherein the objects are movable within the computer generated scene.

H. The computing device of any one of paragraphs A-G, wherein the scene comprises a two-dimensional computer generated scene.

I. The computing device of any one of paragraphs A-G, wherein the scene comprises a three-dimensional (3D) computer generated scene.

J. The computing device of any one of paragraphs A-I, wherein the scene comprises multiple tiled images, and at least some of the multiple gaze targets comprise individual images of the multiple tiled images.

K. The computing device of any one of paragraphs A-J, wherein the multiple gaze targets further comprising multiple objects depicted within an individual image of the multiple tiled images.

L. The computing device of any one of paragraphs A-E and G, wherein the scene comprises a real-world surrounding of the user, and the multiple gaze targets comprise physical objects in the real-world surrounding of the user.

M. The computing device of any one of paragraphs A-E and G, wherein the scene comprises a real-world surrounding of the user, and the multiple gaze targets comprise computer generated objects depicted in the real-world scene.

N. The computing device of any one of paragraphs A-M, the operations further comprising: receiving a request to access the resource; causing presentation of an authentication interface including the scene; obtaining login gaze tracking data representing gaze of the user viewing the scene of the authentication interface; comparing the login gaze tracking data to the gaze-based password usable to access the resource; determining, based at least in part on the comparing, that the login gaze tracking data satisfies the gaze-based password; and authenticating the user to access the resource based at least in part on the determining that the login gaze tracking data satisfies the gaze-based password.

O. The computing device of any one of paragraphs A-N, the operations further comprising updating the gaze-based password based at least in part on the login gaze tracking data.

P. In some examples, a computing device comprises: one or more processors; and memory having computer-executable instructions stored thereupon. When executed by the one or more processors, the instructions cause the computing device to perform operations comprising: causing presentation of multiple images on a display; obtaining login gaze tracking data representing gaze of a user viewing the multiple images; comparing the login gaze tracking data to a gaze-based password associated with an account; determining, based at least in part on the comparing, that the login gaze tracking data satisfies the gaze-based password; and authenticating the user to access the account based at least in part on the determining that the login gaze tracking data satisfies the gaze-based password.

Q. The computing device of paragraph P, wherein determining that the login gaze tracking data satisfies the gaze-based password comprises: determining, for each of multiple gaze targets of the gaze-based password, a probability that the user gazed at the respective gaze target; calculating, based at least in part on the determined probabilities that the user gazed at each of the multiple gaze targets, a similarity of the login gaze tracking data to the gaze-based password; and determining that the login gaze tracking data satisfies the gaze-based password based on the similarity of the login gaze tracking data to the gaze-based password being above a threshold similarity.

R. The computing device of any one of paragraphs P or Q, wherein: the causing presentation of the multiple images comprises causing the multiple images to be presented concurrently in a tiled arrangement; and the obtaining login gaze tracking data comprises obtaining gaze tracking data representing gaze of the user viewing at least a first gaze target in a first image of the multiple images and a second gaze target in a second image of the multiple images.

S. The computing device of any one of paragraphs P-R, wherein the obtaining login gaze tracking data further comprises obtaining gaze tracking data representing gaze of the user viewing at least a third gaze target in at least one of the first image of the multiple images or the second image of the multiple images.

T. The computing device of any one of paragraphs P-S, wherein the multiple images are randomly arranged within the tiled arrangement.

U. The computing device of any one of paragraphs P-T, wherein: the causing presentation of the multiple images comprises causing the multiple images to be presented concurrently within a scene; and the obtaining login gaze tracking data comprises obtaining gaze tracking data representing gaze of the user viewing at least a first image of the multiple images and a second image of the multiple images.

V. The computing device of any one of paragraphs P-U, wherein the multiple images are randomly arranged within the scene.

W. The computing device of any one of paragraphs P-V, wherein the multiple images include at least one salient image that is part of the gaze-based password, and at least one filler image that is not part of the gaze-based password.

X. The computing device of any one of paragraphs P-V, wherein: the multiple images include multiple salient images that are part of the gaze-based password, and multiple filler images that are not part of the gaze-based password; and the obtaining login gaze tracking data comprises performing: a first scan while the user locates salient images from among the tiled arrangement; and a second scan while the user intentionally gazes at the first gaze target and the second gaze target.

Y. The computing device of paragraphs P, wherein: the causing presentation of the multiple images comprises: causing presentation of a first image; and causing presentation of a second image; and the obtaining login gaze tracking data comprises: obtaining gaze tracking data representing gaze of the user viewing the first image; and obtaining gaze tracking data representing gaze of the user viewing the second image.

Z. The computing device of any one of paragraphs P or Y, wherein: the first image and the second image comprise salient images that are part of the gaze-based password; and the causing presentation of the multiple images further comprises causing presentation of one or more filler images that are not part of the gaze-based password.

AA. The computing device of any one of paragraphs P-Z, the operations further comprising updating the gaze-based password based at least in part on the login gaze tracking data.

BB. The computing device of any one of paragraphs A-Z or AA, wherein the computing device comprises a head-mounted computing device, a personal computer, a tablet computer, or a game console.

CC. The computing device of any one of paragraphs A-Z, AA, or BB, wherein the display is integral with the computing device.

DD. The computing device of any one of paragraphs A-Z or AA-CC, wherein the gaze tracking camera is integral with the computing device.

EE. In some examples, a computer-implemented method comprises: obtaining, from an environmental camera, an image of a real-world scene; obtaining, from a gaze tracking camera, gaze tracking data indicating multiple gaze targets, within the real-world scene, at which the user has gazed; obtaining information about objects in the real-world scene corresponding to the multiple gaze targets; and establishing, based at least in part on the information about the objects corresponding to the multiple gaze targets, a gaze-based password usable to access a resource.

FF. The method of paragraph EE, wherein the information about the objects in the real-world scene comprise identifiers of the objects.

GG. The method of any one of paragraphs EE or FF, further comprising: receiving a request to access the resource; obtaining login gaze tracking data representing gaze of the user during login; comparing the login gaze tracking data to the gaze-based password usable to access the resource; determining, based at least in part on the comparing, that the login gaze tracking data satisfies the gaze-based password; and authenticating the user to access the resource based at least in part on the determining that the login gaze tracking data satisfies the gaze-based password.

HH. The method of any one of paragraphs EE-GG, wherein: the login gaze tracking data comprises information about objects in the real-world scene at which the user looked during login; and the determining that the login gaze tracking data satisfies the gaze-based password comprises: comparing the information about objects in the real-world scene at which the user looked during login with the information about the objects corresponding to the gaze targets; and determining that the objects in the real-world scene at which the user looked during login are substantially the same as the objects corresponding to the gaze targets.

II. The method of any one of paragraphs wherein the determining that the login gaze tracking data satisfies the gaze-based password is independent of locations of the objects in the real-world scene at which the user looked during login.

JJ. The method of any one of paragraphs EE-II, implemented by a computing device comprising a head-mounted computing device, a personal computer, a tablet computer, or a game console.

KK. The method of any one of paragraphs EE-JJ, wherein the environmental camera is integral with a computing device performing the method.

LL. The method of any one of paragraphs EE-KK, wherein the gaze tracking camera is integral with a computing device performing the method.

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A computing device comprising:
one or more processors; and
memory having computer-executable instructions stored thereupon which, when executed by the one or more processors, cause the computing device to perform operations comprising:
prompting a user to select, by looking at, multiple gaze targets within a scene;
obtaining, from a gaze tracking camera, gaze tracking data corresponding to gaze of the user responsive to the prompting;
identifying the multiple gaze targets within the scene based at least in part on the gaze tracking data;
prompting the user to visually confirm selection of the multiple gaze targets;
obtaining, from the gaze tracking camera, confirmation gaze tracking data visually confirming selection of the multiple gaze targets;
establishing a margin for execution error based at least in part differences between the gaze tracking data and the confirmation gaze tracking data, the margin for execution error defining a gaze path area between the multiple gaze targets for the user; and
establishing, based at least in part on the multiple gaze targets and the margin for execution error, a gaze-based password usable to access a resource, wherein a width of the gaze path area varies over a length of a gaze path associated with the gaze-based password.

2. The computing device of claim 1, the operations further comprising outputting feedback to visually identify the multiple gaze targets on a display.

3. The computing device of claim 1, wherein the gaze-based password comprises a gaze glyph composed of the multiple gaze targets and the gaze path between the multiple gaze targets.

4. The computing device of claim 1, wherein the scene comprises a static image, and the multiple gaze targets correspond to objects depicted in the static image.

5. The computing device of claim 1, wherein the scene comprises a computer generated scene, and the multiple gaze targets correspond to objects depicted in the computer generated scene.

6. The computing device of claim 1, wherein the scene comprises multiple tiled images, and at least some of the multiple gaze targets comprise individual images of the multiple tiled images.

7. The computing device of claim 1, wherein the scene comprises a real-world surrounding of the user, and the multiple gaze targets comprise physical objects in the real-world surrounding of the user.

8. The computing device of claim 1, wherein the scene comprises a real-world surrounding of the user, and the multiple gaze targets comprise computer generated objects depicted in the real-world scene.

9. The computing device of claim 1, the operations further comprising:
receiving a request to access the resource;
causing presentation of an authentication interface including the scene;
obtaining login gaze tracking data representing gaze of the user viewing the scene of the authentication interface;
comparing the login gaze tracking data to the gaze-based password usable to access the resource;
determining, based at least in part on the comparing, that the login gaze tracking data satisfies the gaze-based password; and
authenticating the user to access the resource based at least in part on the determining that the login gaze tracking data satisfies the gaze-based password.

10. A computing device comprising:
one or more processors; and
memory having computer-executable instructions stored thereupon which, when executed by the one or more processors, cause the computing device to perform operations comprising:
causing presentation of multiple images on a display;
obtaining login gaze tracking data representing gaze of a user viewing the multiple images;
comparing the login gaze tracking data to a gaze-based password associated with an account, the gaze-based password including a margin for execution error defining a gaze path area that accounts for variations in a gaze of a user as the user attempts to satisfy the gaze-based password, wherein a width of the gaze path area varies over a length of a gaze path associated with the gaze-based password;
determining, based at least in part on the comparing, that the login gaze tracking data satisfies the gaze-based password; and authenticating the user to access the account based at least in part on the determining that the login gaze tracking data satisfies the gaze-based password.

11. The computing device of claim 10, wherein:
the causing presentation of the multiple images comprises causing the multiple images to be presented concurrently in a tiled arrangement; and
the obtaining login gaze tracking data comprises obtaining gaze tracking data representing gaze of the user viewing at least a first gaze target in a first image of the multiple images and a second gaze target in a second image of the multiple images.

12. The computing device of claim 11, wherein the obtaining login gaze tracking data further comprises obtaining gaze tracking data representing gaze of the user viewing at least a third gaze target in at least one of the first image of the multiple images or the second image of the multiple images.

13. The computing device of claim 10, wherein:
the causing presentation of the multiple images comprises causing the multiple images to be presented concurrently within a scene; and
the obtaining login gaze tracking data comprises obtaining gaze tracking data representing gaze of the user viewing at least a first image of the multiple images and a second image of the multiple images.

14. The computing device of claim 10, wherein:
the causing presentation of the multiple images comprises:
causing presentation of a first image; and
causing presentation of a second image; and
the obtaining login gaze tracking data comprises:
obtaining gaze tracking data representing gaze of the user viewing the first image; and
obtaining gaze tracking data representing gaze of the user viewing the second image.

15. A computer-implemented method comprising:
obtaining, from an environmental camera, an image of a real-world scene;
obtaining, from a gaze tracking camera, gaze tracking data indicating multiple gaze targets, within the real-world scene, at which a user has gazed;
obtaining information about objects in the real-world scene corresponding to the multiple gaze targets;
prompting the user to visually confirm selection of the multiple gaze targets;
obtaining, from the gaze tracking camera, confirmation gaze tracking data visually confirming selection of the multiple gaze targets;
establishing a margin for execution error based at least in part differences between the gaze tracking data and the confirmation gaze tracking data, the margin for execution error defining a gaze path area between the multiple gaze targets for the user; and
establishing, based at least in part on the information about the objects corresponding to the multiple gaze targets and the margin for execution error, a gaze-based password usable to access a resource, wherein a width of the gaze path area varies over a length of a gaze path associated with the gaze-based password.

16. The computer-implemented method of claim 15, wherein the information about the objects in the real-world scene comprise identifiers of the objects.

17. The computer-implemented method of claim 15, further comprising:
receiving a request to access the resource;
obtaining login gaze tracking data representing gaze of the user during login;
comparing the login gaze tracking data to the gaze-based password usable to access the resource;
determining, based at least in part on the comparing, that the login gaze tracking data satisfies the gaze-based password; and
authenticating the user to access the resource based at least in part on the determining that the login gaze tracking data satisfies the gaze-based password.

18. The computer-implemented method of claim 17, wherein:
the login gaze tracking data comprises information about objects in the real-world scene at which the user looked during login; and
the determining that the login gaze tracking data satisfies the gaze-based password comprises:
comparing the information about objects in the real-world scene at which the user looked during login with the information about the objects corresponding to the multiple gaze targets; and
determining that the objects in the real-world scene at which the user looked during login are substantially the same as the objects corresponding to the multiple gaze targets.

19. The computer-implemented method of claim 18, wherein the determining that the login gaze tracking data satisfies the gaze-based password is independent of locations of the objects in the real-world scene at which the user looked during login.

* * * * *